US008169484B2

(12) United States Patent  
Silberstein

(10) Patent No.: US 8,169,484 B2  
(45) Date of Patent: May 1, 2012

(54) PHOTOGRAPHY-SPECIFIC DIGITAL CAMERA APPARATUS AND METHODS USEFUL IN CONJUNCTION THEREWITH

(76) Inventor: Shai Silberstein, Rishon Le Zion (IL)

( * ) Notice: Subject to any disclaimer, the term of this patent is extended or adjusted under 35 U.S.C. 154(b) by 777 days.

(21) Appl. No.: 11/175,791

(22) Filed: Jul. 5, 2005

(65) Prior Publication Data

US 2007/0019094 A1  Jan. 25, 2007

(51) Int. Cl.
  *H04N 5/225* (2006.01)
  *H04N 7/18* (2006.01)
  *G06K 9/00* (2006.01)
(52) U.S. Cl. ............... 348/207.99; 348/169; 348/157; 382/118
(58) Field of Classification Search ........... 348/207.99, 348/222.1, 169, 157, 333.02; 382/118
See application file for complete search history.

(56) References Cited

U.S. PATENT DOCUMENTS

| 5,774,591 | A | 6/1998 | Black et al. | |
|---|---|---|---|---|
| 6,545,705 | B1 * | 4/2003 | Sigel et al. | 348/169 |
| 6,591,068 | B1 * | 7/2003 | Dietz | 396/429 |
| 7,652,695 | B2 * | 1/2010 | Halpern | 348/169 |
| 2002/0149681 | A1 * | 10/2002 | Kahn et al. | 348/211.2 |
| 2004/0239776 | A1 * | 12/2004 | Shinohara et al. | 348/239 |
| 2005/0078201 | A1 * | 4/2005 | Sakaguchi | 348/234 |
| 2005/0207648 | A1 * | 9/2005 | Iguchi et al. | 382/190 |

OTHER PUBLICATIONS

Zitova, Barbara, et al., "Image registration methods: a survey", Image and Vision Computing, 2003, vol. 21, pp. 977-1000.
Sako, Hiroshi, et al., "Real-Time Facial Expression Recognition Based on Features' Positions and Dimensions", Proceedings of the 13th International Conference on Pattern Recognition, Aug. 25-29, 1996, vol. 3, pp. 643-648.
Matsugu, Masakazu, et al., "Facial Expression Recogntion Combined with Robust Face Detection in a Convolutional Neural Network", Proceedings of the International Joint Conference on Neural Networks, Jul. 20-24, 2003, vol. 3, pp. 2243-2246.
Ma, L., et al., "Facial Expression Recognition Using Constructive Feedforward Neural Networks", IEEE Transactions on Systems, Man, and Cybernetics Part B, Jun. 2004, vol. 34, No. 3, pp. 1588-1595.
Sony DSC-T7, a digital camera, User's Guide/Troubleshooting, Japan 2005.

* cited by examiner

*Primary Examiner* — Nhan T Tran
(74) *Attorney, Agent, or Firm* — Fish & Richardson P.C.

(57) ABSTRACT

A multi-mode digital photography method including generating an output image of a location L at a specific time t which is identified as a function of a user-selected photography task. the method including generating an output image of a particular scene which is built up from a plurality of images thereof, as another function of a user-selected photography task.

18 Claims, 56 Drawing Sheets

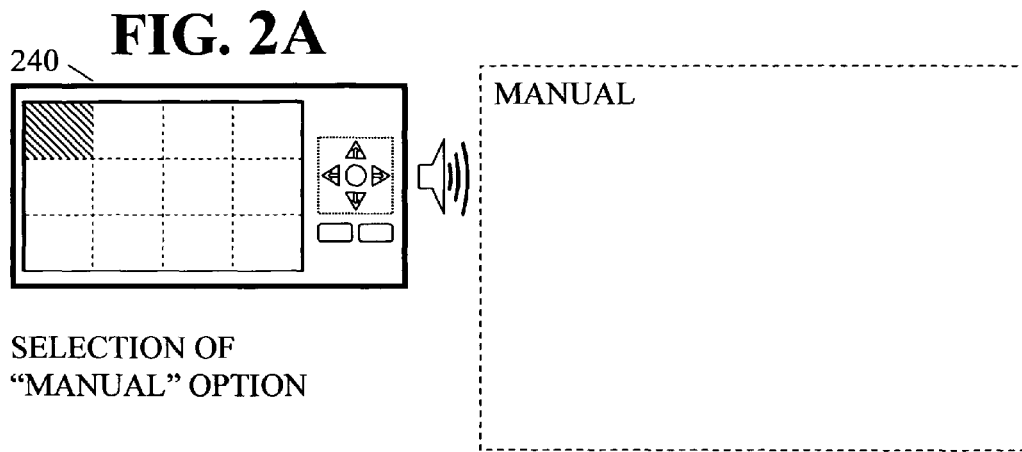

FIG. 2A

SELECTION OF "MANUAL" OPTION

MANUAL

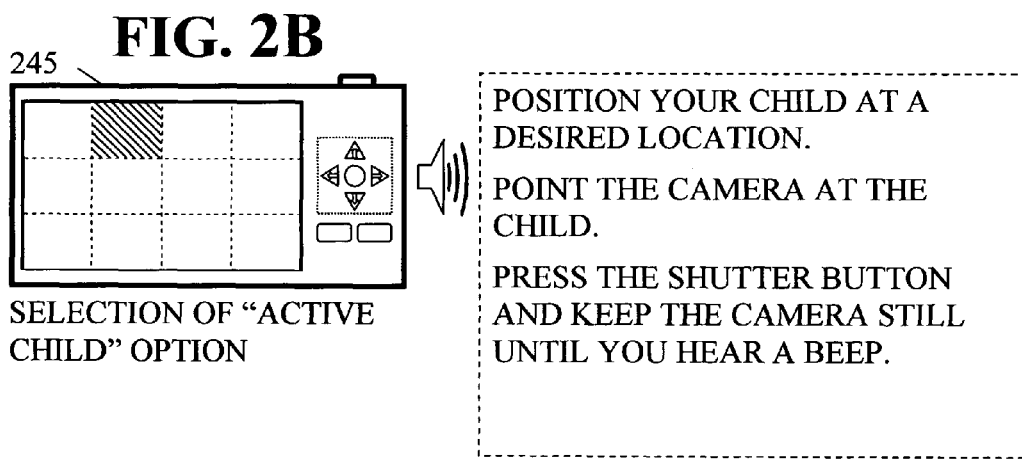

FIG. 2B

SELECTION OF "ACTIVE CHILD" OPTION

POSITION YOUR CHILD AT A DESIRED LOCATION.

POINT THE CAMERA AT THE CHILD.

PRESS THE SHUTTER BUTTON AND KEEP THE CAMERA STILL UNTIL YOU HEAR A BEEP.

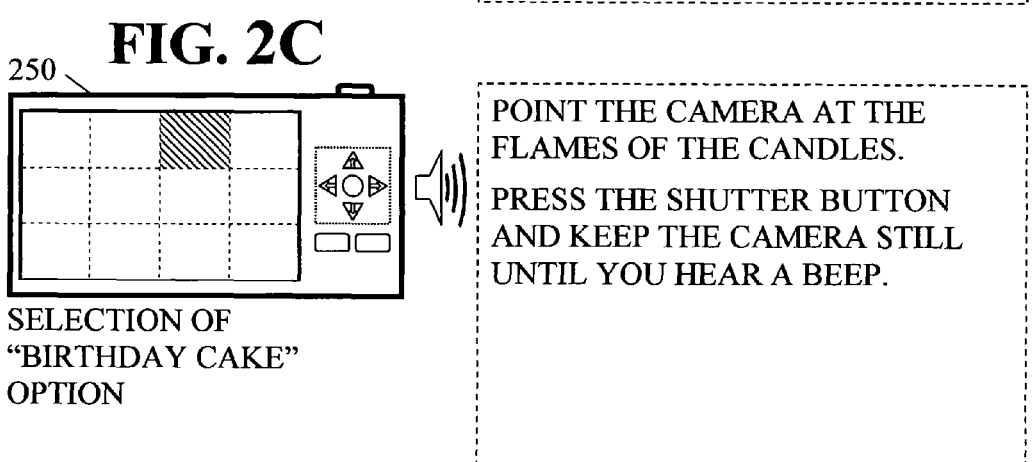

FIG. 2C

SELECTION OF "BIRTHDAY CAKE" OPTION

POINT THE CAMERA AT THE FLAMES OF THE CANDLES.

PRESS THE SHUTTER BUTTON AND KEEP THE CAMERA STILL UNTIL YOU HEAR A BEEP.

FIG. 2D

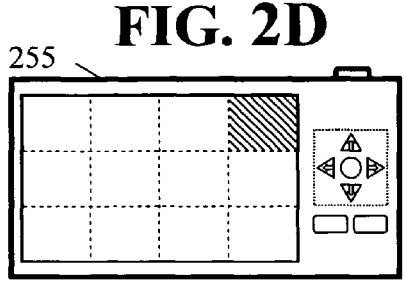

SELECTION OF "DON'T BLINK" OPTION

POINT THE CAMERA AT YOUR SUBJECT'S FACE.

PRESS THE SHUTTER BUTTON AND KEEP THE CAMERA STILL UNTIL YOU HEAR A BEEP.

FIG. 2E

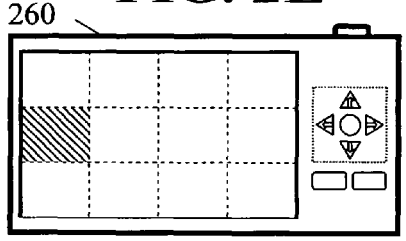

SELECTION OF "DIVE" OPTION

POINT THE CAMERA AT THE AIRSPACE IN FRONT OF THE DIVING BOARD OR AT THE WATER BENEATH THE DIVING BOARD.

PRESS THE SHUTTER BUTTON AND KEEP THE CAMERA STILL UNTIL YOU HEAR A BEEP.

FIG. 2F

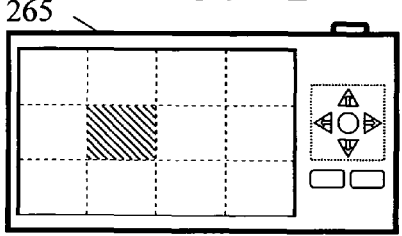

SELECTION OF "URBAN" OPTION

POINT THE CAMERA AT YOUR URBAN SCENE. DON'T WORRY ABOUT PEOPLE OR CARS OBSTRUCTING THE SCENE. YOUR CAMERA WILL ERASE THEM FOR YOU. PRESS THE SHUTTER BUTTON AND KEEP THE CAMERA STILL UNTIL YOU HEAR A BEEP. BE PATIENT - THIS MAY TAKE A WHILE.

FIG. 2G

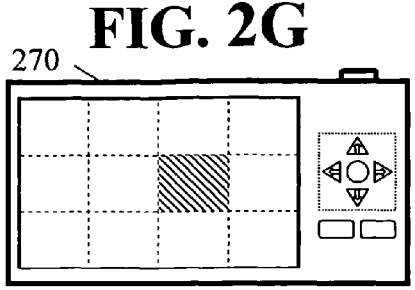

SELECTION OF "NIGHT" OPTION

POINT THE CAMERA AT YOUR NIGHT SCENE.

PRESS THE SHUTTER BUTTON AND KEEP THE CAMERA STILL UNTIL YOU HEAR A BEEP.

BE PATIENT - THIS MAY TAKE A WHILE.

FIG. 2H

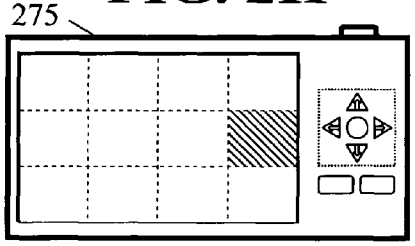

SELECTION OF "RACE" OPTION

POINT THE CAMERA AT THE FINISH LINE.

PRESS THE SHUTTER BUTTON AND KEEP THE CAMERA STILL UNTIL THE RACE IS OVER AND YOU HAVE HEARD A CONFIRMING BEEP.

FIG. 2I

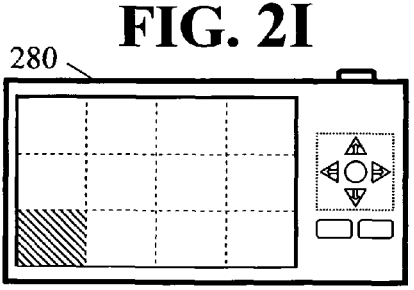

SELECTION OF "CHILD / PET RUNNING" OPTION

CHOOSE A LOCATION.

THE CAMERA WILL PHOTOGRAPH YOUR SUBJECT AS IT RUNS BY THIS LOCATION.

POINT THE CAMERA AT THIS LOCATION, PRESS THE SHUTTER BUTTON AND KEEP THE CAMERA STILL UNTIL YOU HEAR A BEEP.

FIG. 2J

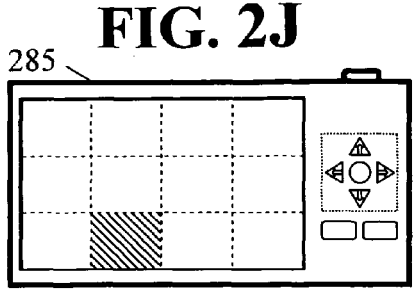

SELECTION OF "SMILE" OPTION

POINT THE CAMERA AT YOUR SUBJECT'S FACE.

PRESS THE SHUTTER BUTTON AND KEEP THE CAMERA STILL UNTIL YOU HEAR A BEEP.

FIG. 2K

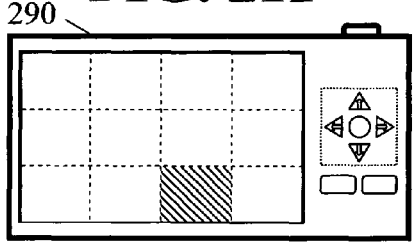

SELECTION OF "SURPRISE" OPTION

POINT THE CAMERA AT YOUR SUBJECT'S FACE.

PRESS THE SHUTTER BUTTON AND KEEP THE CAMERA STILL UNTIL YOU HEAR A BEEP.

FIG. 2L

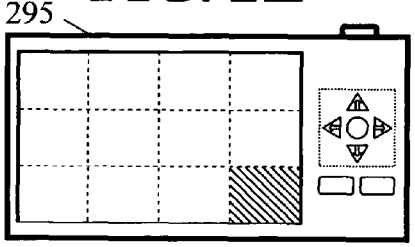

SELECTION OF "SELF-PHOTO" OPTION

CHOOSE A LOCATION. POINT THE CAMERA AT YOUR LOCATION AND PRESS THE SHUTTER BUTTON.

WALK TO YOUR LOCATION, STAND STILL (OPTIONAL: AND SMILE) UNTIL YOU HEAR A BEEP.

FIG. 17

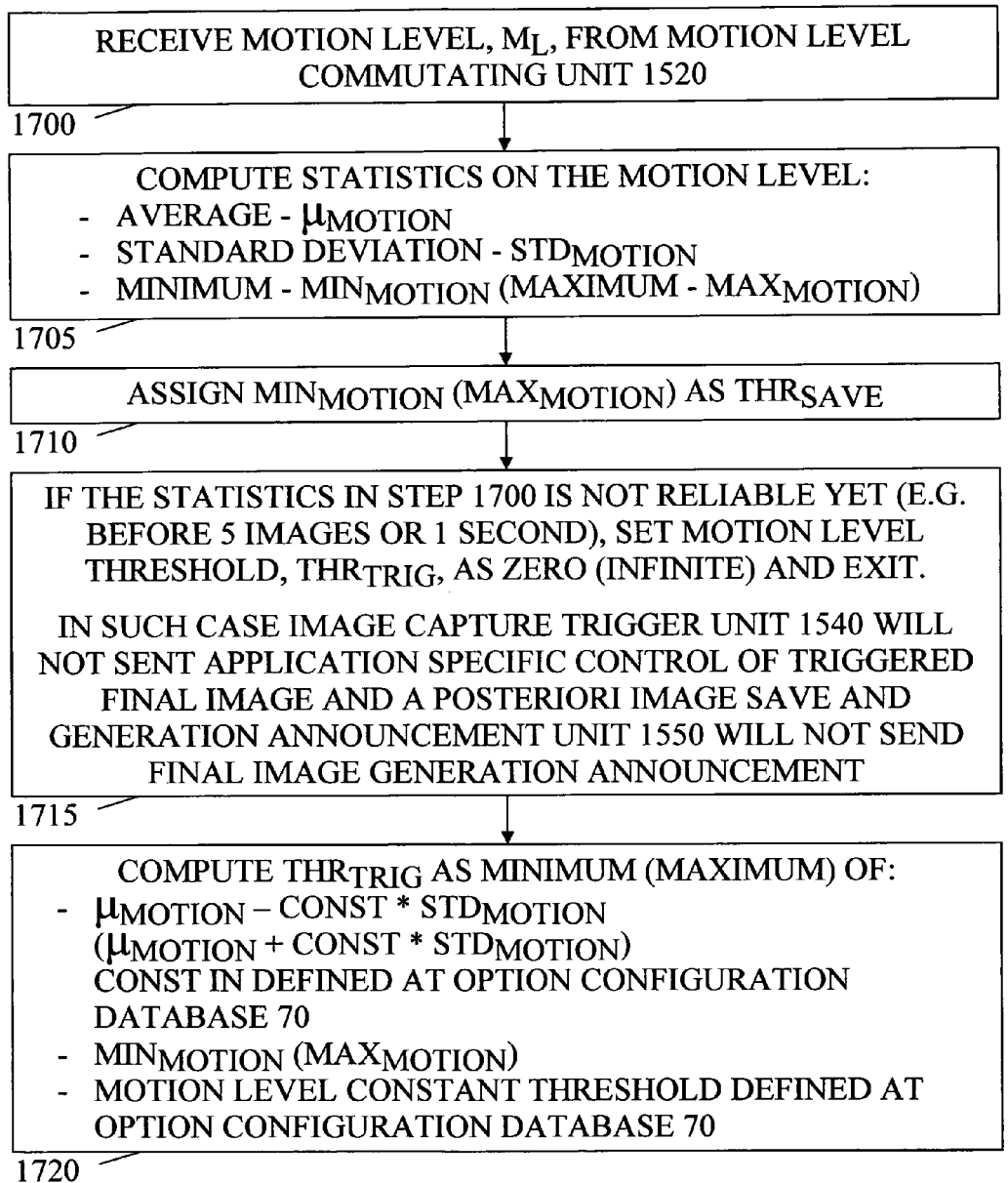

1700 — RECEIVE MOTION LEVEL, $M_L$, FROM MOTION LEVEL COMMUTATING UNIT 1520

1705 — COMPUTE STATISTICS ON THE MOTION LEVEL:
- AVERAGE - $\mu_{MOTION}$
- STANDARD DEVIATION - $STD_{MOTION}$
- MINIMUM - $MIN_{MOTION}$ (MAXIMUM - $MAX_{MOTION}$)

1710 — ASSIGN $MIN_{MOTION}$ ($MAX_{MOTION}$) AS $THR_{SAVE}$

1715 — IF THE STATISTICS IN STEP 1700 IS NOT RELIABLE YET (E.G. BEFORE 5 IMAGES OR 1 SECOND), SET MOTION LEVEL THRESHOLD, $THR_{TRIG}$, AS ZERO (INFINITE) AND EXIT.

IN SUCH CASE IMAGE CAPTURE TRIGGER UNIT 1540 WILL NOT SENT APPLICATION SPECIFIC CONTROL OF TRIGGERED FINAL IMAGE AND A POSTERIORI IMAGE SAVE AND GENERATION ANNOUNCEMENT UNIT 1550 WILL NOT SEND FINAL IMAGE GENERATION ANNOUNCEMENT

1720 — COMPUTE $THR_{TRIG}$ AS MINIMUM (MAXIMUM) OF:
- $\mu_{MOTION}$ – CONST * $STD_{MOTION}$
  ($\mu_{MOTION}$ + CONST * $STD_{MOTION}$)
  CONST IN DEFINED AT OPTION CONFIGURATION DATABASE 70
- $MIN_{MOTION}$ ($MAX_{MOTION}$)
- MOTION LEVEL CONSTANT THRESHOLD DEFINED AT OPTION CONFIGURATION DATABASE 70

FIG. 33
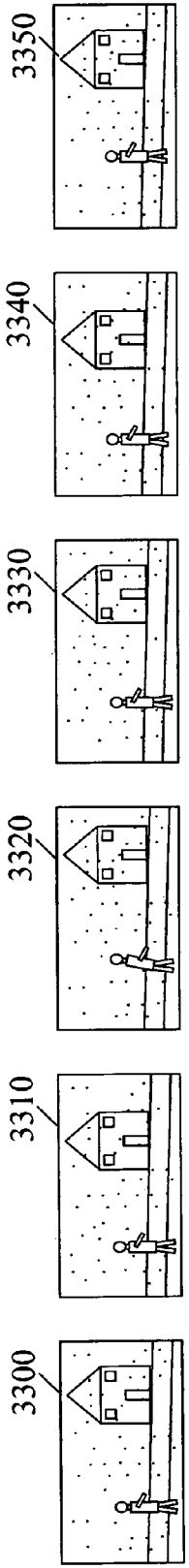
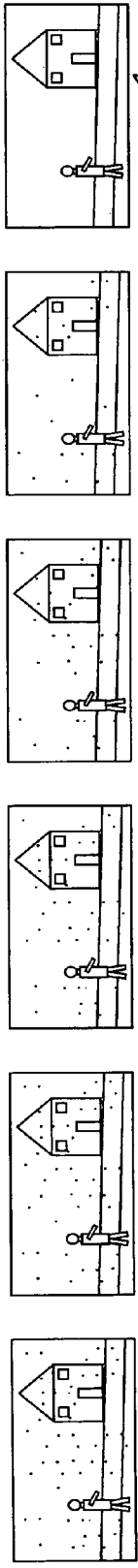
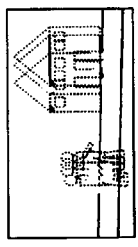

PHOTOGRAPHY-SPECIFIC DIGITAL CAMERA APPARATUS AND METHODS USEFUL IN CONJUNCTION THEREWITH

FIELD OF THE INVENTION

The present invention relates to apparatus and methods for digital photography.

BACKGROUND OF THE INVENTION

A wide variety of digital cameras is currently available. Conventional digital photography options and methods are described e.g. in the manual of the Sony DSC-T7 digital camera.

U.S. Pat. No. 5,774,591 to Black et al describes an apparatus and method for recognizing facial expressions and applications therefor.

The disclosures of all publications mentioned in the specification and of the publications cited therein are hereby incorporated by reference.

SUMMARY OF THE INVENTION

The present invention seeks to provide an application-specific digital camera and methods useful therefor.

There is thus provided, in accordance with a preferred embodiment of the present invention, a digital photography method comprising receiving a definition of a moment at which an anticipated event is to photographed, using a digital imaging device residing in a digital camera to generate a stream of digital images of a location at which tile event is anticipated to occur; and inspecting the stream of digital images, to anticipate the moment in the stream, and to generate a trigger timed and constructed to trigger generation of an image of the location at the moment.

Also provided, in accordance with a preferred embodiment of the present invention, is a digital photography system operative in conjunction with a digital imaging device, the system comprising a moment definition input device defining a moment at which an anticipated event is to photographed, a stream of digital images, generated by the digital imaging device, of a location at which the event is anticipated to occur, and a moment anticipator operative to inspect the stream of digital images, to anticipate the moment in the stream, and to trigger generation of an image of the location at the moment.

Further in accordance with a preferred embodiment of the present invention, the moment anticipator resides on an integrated circuit, the system also comprising a digital imaging device operative to generate the stream and operative in conjunction with the integrated circuit.

Also provided, in accordance with another preferred embodiment of the present invention, is a digital photography method comprising receiving a definition of a moment at which an anticipated event is to photographed, using a digital imaging device residing in a digital camera to generate a stream of digital images of a location at which the event is anticipated to occur; and inspecting the stream of digital images, to detect, in the stream. a digital image which has captured the moment and selectively storing the digital image which has captured the moment. Also provided, in accordance with a preferred embodiment of the present invention, is a digital photography system operative in conjunction with a digital imaging device, the system comprising a moment definition input device defining a moment at which an anticipated event is to photographed, a stream of digital images of a location at which the event is anticipated to occur; and a moment-catching image selector operative to inspect the stream of digital images, to detect. in the stream, a digital image which has captured the moment and to selectively store the digital image which has captured the moment.

Further in accordance with a preferred embodiment of the present invention, the moment-catching image selector resides on an integrated circuit, the system also comprising a digital imaging device operative to generate the stream and operative in conjunction with the integrated circuit.

Further in accordance with a preferred embodiment of the present invention, the definition of the moment comprises a definition of at least one target state of at least one corresponding target object and wherein the moment comprises a moment at which at least one target object is in the at least one target state.

Still further in accordance with a preferred embodiment of the present invention, the target state comprises a target location and wherein the moment comprises a moment at which the target object has reached the target location.

Further in accordance with a preferred embodiment of the present invention, the target object comprises a race participant and the target location comprises a finish line.

Still further in accordance with a preferred embodiment of the present invention the target object comprises an animal or human subject and the target location comprises a user-selected location.

Further in accordance with a preferred embodiment of the present invention, the target object comprises a diver and the target location comprises a location along an expected trajectory of a dive.

Still further in accordance with a preferred embodiment of the present invention, the definition of the moment comprises a definition of a target state of a target object and wherein the moment comprises a moment at which the target object is in the target state.

Further in accordance with a preferred embodiment of the present invention, the target state comprises a target location and wherein the moment comprises a moment at which the target object has reached the target location.

Additionally in accordance with a preferred embodiment of the present invention, the target object comprises a race participant and the target location comprises a finish line.

Still further in accordance with a preferred embodiment of the present invention, the target object comprises an animal or human subject and the target location comprises a user-selected location.

Further in accordance with a preferred embodiment of the present invention, the target object comprises a diver and the target location comprises a location along an expected trajectory of a dive.

Still further in accordance with a preferred embodiment of the present invention, the target state comprises a state at which the target object's level of motion is locally maximal.

Additionally in accordance with a preferred embodiment of the present invention, the target state comprises a state at which the target object's level of motion is locally minimal.

Still further in accordance with a preferred embodiment of the present invention, the step of receiving a definition of a moment comprises receiving an indication that a user wishes to photograph candles being blown out and wherein the target object comprises candle flames.

Further in accordance with a preferred embodiment of the present invention, the target object comprises an active subject.

Still further in accordance with a preferred embodiment of the present invention, the target state comprises a state at which the target object's level of motion is locally maximal.

Further in accordance with a preferred embodiment of the present invention, the target state comprises a state at which the target object's level of motion is locally minimal.

Further in accordance with a preferred embodiment of the present invention, the step of receiving a definition of a moment comprises receiving an indication that a user wishes to photograph candles being blown out and wherein the target object comprises candle flames.

Additionally in accordance with a preferred embodiment of the present invention, the target object comprises a subject with moving limbs.

Further in accordance with a preferred embodiment of the present invention, the target object comprises a face and the target state comprises a facial expression.

Further in accordance with a preferred embodiment of the present invention, the facial expression comprises a non-blinking expression in which the subject is not blinking.

Still further in accordance with a preferred embodiment of the present invention, the step of inspecting comprises anticipating a non-blinking expression and ensuring generation of a non-blinking image by generating the trigger upon detection of a blink so as to generate the non-blinking image before a subsequent blink.

Additionally in accordance with a preferred embodiment of the present invention, the facial expression comprises a smile.

Further in accordance with a preferred embodiment of the present invention, the facial expression comprises a surprised expression.

Still further in accordance with a preferred embodiment of the present invention, the target object comprises a face and the target state comprises a facial expression.

Further in accordance with a preferred embodiment of the present invention, the facial expression comprises a non-blinking expression in which the subject is not blinking.

Still further in accordance with a preferred embodiment of the present invention, the facial expression comprises a smile.

Additionally in accordance with a preferred embodiment of the present invention, the facial expression comprises a surprised expression.

Also provided, in accordance with a preferred embodiment of the present invention, is a digital photography method comprising analyzing a stream of digital images of a scene and generating an output image of the scene by performing a local image processing operation selectively on a portion of an image of the scene, the portion comprising an image of less than the entirety of the scene.

Further in accordance with a preferred embodiment of the present invention, the scene includes moving objects and a background and wherein the local image processing operation comprises an operation of replacing images of moving objects with images of the background the objects are obscuring.

Still further in accordance with a preferred embodiment of the present invention, the generating step comprises inspecting a plurality of candidate images of a portion of the scene and selecting an individual candidate image from among the plurality of candidate images which is likely to represent the background.

Further in accordance with a preferred embodiment of the present invention, the selecting step employs at least one of the following selection criteria: the duration of occurrence of an individual candidate image, and the extent to which the individual candidate image matches adjacent candidate images.

Still further in accordance with a preferred embodiment of the present invention, the local image processing operation comprises a noise reduction operation.

Still further in accordance with a preferred embodiment of the present invention, the noise reduction operation is performed differentially on portions of the image such that the extent of noise reduction is a decreasing function of the level of change within the portions.

Additionally in accordance with a preferred embodiment of the present invention, the noise reduction operation is performed selectively, only on portions of the image in which there is only a minimal level of change.

Also provided, in accordance with a preferred embodiment of the present invention, is digital camera apparatus comprising a digital imaging device operative to generate a plurality of preliminary digital images of a scene defining a plane; a noise reduction processor operative to generate from the plurality of preliminary digital images, an output image of the scene with a reduced amount of noise, the noise reduction processor comprising an image aligner which uses image processing to generate a plurality of aligned digital images from the plurality of preliminary digital images by laterally and rotationally aligning the plurality of preliminary digital images about an axis of rotation disposed perpendicular to the plane of the scene.

Additionally provided, in accordance with a preferred embodiment of the present invention, is self-photography apparatus comprising: a digital imaging device generating a stream of images of a location; and a self-photography analysis and control unit operative to perform image processing on at least a portion of the stream of images of a location in order to identify a moment at which an image of the location will comprise a successful self-photograph of a photographer's self at that location.

Further in accordance with a preferred embodiment of the present invention, the self-photography analysis and control unit is operative initially, to identify a photographer's arrival at the location and subsequently, to identify that the photographer is now motionless at the location.

Further provided, in accordance with a preferred embodiment of the present invention. is a digital photography system comprising: a digital image stream analyzer operative to analyze a stream of digital images of a scene; and a local image processing output image generator operative to generate an output image of the scene by performing a local image processing operation selectively on a portion of an image of the scene, the portion comprising an image of less than the entirety of the scene.

Additionally provided, in accordance with a preferred embodiment of the present invention, is a digital photography method comprising: generating a plurality of preliminary digital images of a scene defining a plane; generating from the plurality of preliminary digital images, an output image of the scene with a reduced amount of noise, including use of image processing to generate a plurality of aligned digital images from the plurality of preliminary digital images by rotationally aligning the plurality of preliminary digital images about an axis of rotation disposed perpendicular to the plane of the scene.

Further provided, in accordance with a preferred embodiment of the present invention, is a method for self photography comprising generating a stream of images of a location; and performing image processing on at least a portion of the stream of images of a location in order to identify a moment at which an image of the location will comprise a successful self-photograph of a photographer's self at that location.

Additionally provided, in accordance with a preferred embodiment of the present invention, is a multi-mode digital camera apparatus comprising digital imaging apparatus operative to generate an output image of a location L at a time t; and a time identifier operative to identify time t as a function of a user-selected photography task.

Further in accordance with a preferred embodiment of the present invention, the time identifier is operative to anticipate time t and to trigger operation of the digital imaging apparatus at time t.

Still further in accordance with a preferred embodiment of the present invention, the time identifier is operative to select, within a stream of digital images generated by the digital imaging apparatus, an image generated at time t.

Further provided, in accordance with a preferred embodiment of the present invention, is a multi-mode digital photography method comprising generating an output image of a location L at a time t, and identifying time t as a function of a user-selected photography task.

Still further in accordance with a preferred embodiment of the present invention, the image processing identifies a moment at which the photographer has completed at least one of the following actions:
a. has reached location L;
b. has become generally motionless; and
c. has smiled.

Additionally in accordance with a preferred embodiment of the present invention, the moment definition input device generates a definition of the moment which comprises a definition of at least one target state of at least one corresponding target object and wherein the moment comprises a moment at which at least one target object is in the at least one target state.

Further in accordance with a preferred embodiment of the present invention, the moment definition input device generates a definition of the moment which comprises a definition of a target state of a target object and wherein the moment comprises a moment at which the target object is in the target state.

Still further in accordance with a preferred embodiment of the present invention, the scene includes moving objects and a background and wherein the local image processing operation comprises an operation of replacing images of moving objects with images of the background the objects are obscuring.

According to a preferred embodiment of the present invention, a photography option is provided in which only the background of a scene appears in a final photography product, without people or vehicles or other moving identities which temporarily obscure portions of the scene.

According to another preferred embodiment of the present invention, a night or low illumination photography option is provided in which noise due to long exposure time, is reduced. This is preferably done by image averaging with factoring out of camera motion and moving objects which occur in the course of the various images which are generated during the long exposure time and combined.

Also provided is image generation apparatus for use in conjunction with a digital imaging device, the apparatus comprising any of the above embodiments, minus the digital imaging device and/or minus functionalities such as memory provided within a conventional digital imaging device. Each of the above embodiments may be coupled to or associated with or used in conjunction with, a conventional digital camera or other digital imaging device.

The term "digital imaging device" or "digital camera" is intended to include any imaging device which generates, inter alia, a digital representation of a scene such as but not limited to a digital camera, a CCD array and associated digitizer, a CMOS detector, and any personal device that includes a digital camera such as a cellular phone or hand-held device which has digital-photographic functionality.

BRIEF DESCRIPTION OF THE DRAWINGS

The present invention will be understood and appreciated from the following detailed description, taken in conjunction with the drawings in which:

FIGS. 2A-2L are simplified pictorial illustrations of the camera system of FIG. 1 after selection of an individual option by the user;

FIG. 17 forms a simplified flowchart illustration of a preferred method of operation for the apparatus of the motion level threshold unit 1530 of FIG. 15;

FIG. 33 is a pictorial and time-line diagram illustrating an example of the operation of the noise reduction analysis and control unit 350 of FIG. 3, according to a preferred embodiment of the present invention;

DETAILED DESCRIPTION OF PREFERRED EMBODIMENTS

Figure 1:
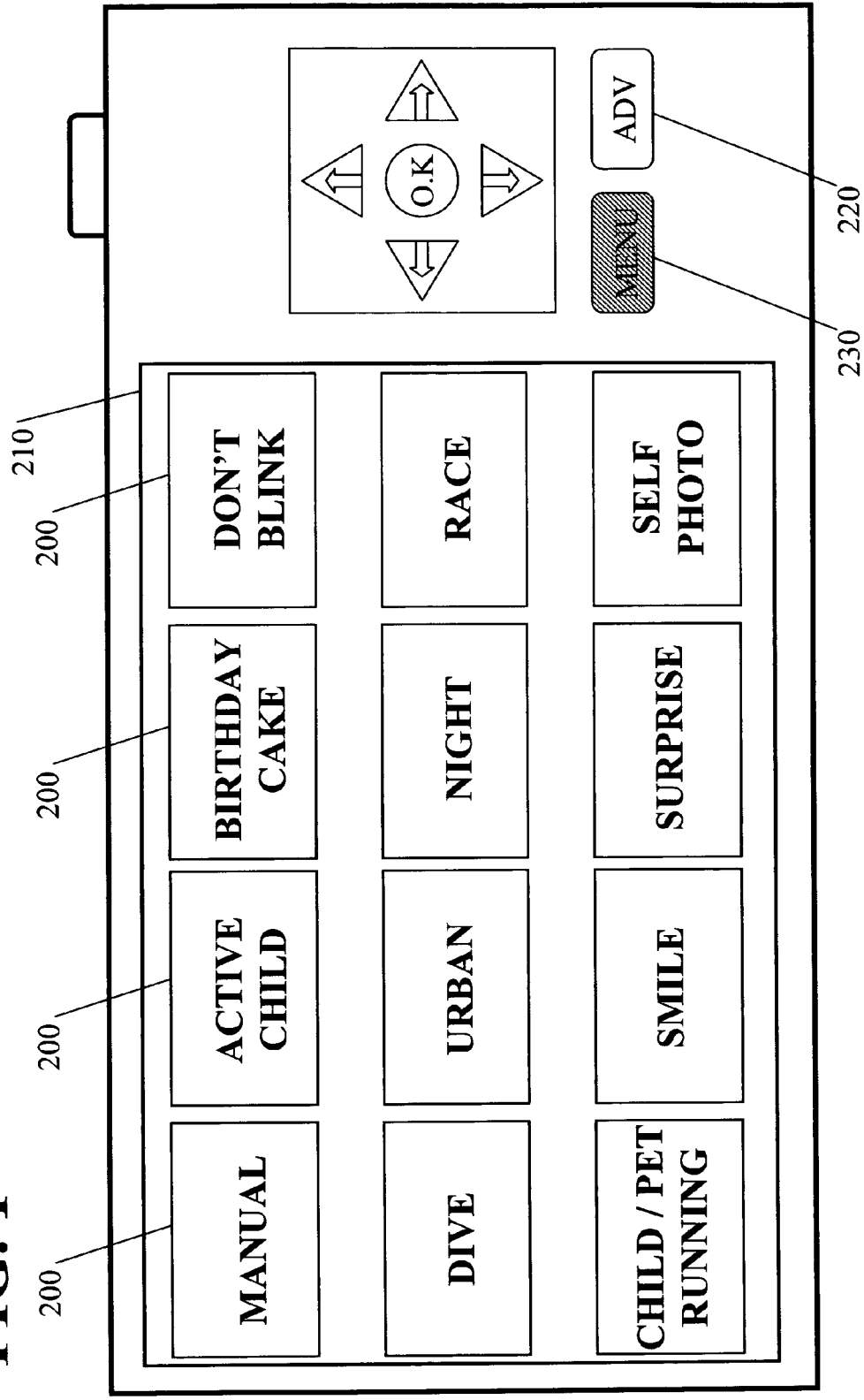
FIG. 1 is a simplified pictorial illustration of a digital camera system constructed and operative in accordance with a preferred embodiment of the present invention.

FIG. 1 is a simplified pictorial illustration of a digital camera system constructed and operative in accordance with a preferred embodiment of the present invention including a display of a plurality of photography options 200 which the digital camera system of FIG. 1 provides for a user when s/he presses on menu button 230. As shown, a manual option is provided which, if selected, enables the user to photograph as is conventional using state of the art digital camera systems. The remainder of the options 200 guide the user in his photography efforts in a plurality of different situations, such as photographing an active child, photographing an individual blowing out candles on a birthday cake, photographing a portrait of a person while s/he is not blinking, photographing a dive e.g. into a body of water, photographing an urban scene including moving people, cars and other objects which are not of interest, photographing a night scene without allowing the low level of illumination to generate a high noise level, photographing the winning moment of a race, photographing a child or pet running up to a given point, photographing a person while s/he is smiling, photographing a person as s/he is surprised, and photographing ones self. It is appreciated that option selection may be effected via any desirable user interface device such as a menu or special button and the display of FIG. 1 is provided merely by way of example.

The system of the present invention is operative generally to provide a plurality of modes within which the imaging device is guided to operate. The modes are operative to automatically shape the imaging process so as to provide the optimal photography product for each situation or option. For example, if the "active child" option is selected, the imaging device is guided to image an active child when his level of activity diminishes to a level low enough to allow an unblurred image. If the "birthday cake" option is selected, the imaging device is guided to image the child at the moment s/he extinguishes the candles e.g. by analyzing previous images to detect flame motion. If the "don't blink" option is selected, the imaging device is guided to image the subject at a moment in which s/he is not blinking e.g. by detecting facial indications that the subject is about to blink and trigger imaging accordingly. If the "dive" option is selected, the imaging device may be guided to image a diver or jumper as s/he hits the water.

If the "urban" option is selected, the imaging device may be guided to image scenery unobscured by moving cars, people or other objects, by digitally "erasing" the cars and/or people and/or objects. If the "night" option is selected, the imaging device is guided to automatically reduce noise resulting from the long exposure time required for night photography. If the "race" option is selected, the imaging device is guided to image at the moment when it is detected, or anticipated, that an object (the winner) is crossing the finish line. If the "child/pet running" option is selected, the imaging device is guided to image at the moment when it is detected, or anticipated, that an object (the child or pet) is arriving at a location at which the user has pointed his or her camera. If the "smile" or "surprise" option is selected, the imaging device is guided to image at the moment when a smile or surprised expression is detected or anticipated to occur. If the "self-photography" option is selected, the imaging device is guided to image only after the self-photographer has reached a target location, has settled herself motionless at that location and, optionally, has smiled.

It is appreciated that the system of the present invention need not provide a separate mode for each option. Instead, it is possible to provide a single mode serving or supporting several options, wherein that mode is parameterized to allow each separate option to be implemented as appropriate.

For example, an "object at location" mode may be provided to operationalize each of the following options: dive, race, child/pet running and self-photo. The "object at location" mode is constructed and operative to image a location when an object arrives thereat. A "high/low motion" mode may be provided to operationalize each of the following options: active child, birthday cake, and self-photo. This mode is constructed and operative to image a subject when the level of motion is appropriate (low or high: low for an active child, to prevent blurring; high for birthday cake candles, to identify the moment at which the candle flames are flickering out, and low for self-photo, to identify the moment at which the self-photographer has settled himself at the photography location). A "facial recognition" mode may be provided to operationalize each of the following options: don't blink, smile, surprise and optionally self-photography. This mode is constructed and operative to image a subject when his facial expression is appropriate for imaging i.e. in the "don't blink", smile and surprise options respectively, when the subject is not blinking, or smiling, or has assumed a surprised expression.

A "noise reduction" mode may be provided to operationalize the night photography option. This mode is constructed and operative, under the "night" option described herein, to combine several images of a poorly illuminated scene, while idenitifying and discarding noise. A "background" mode may be provided to operationalize the urban option. This mode is constructed and operative, under the "urban" option described herein, to combine several images of a scene, characterized in that each portion of the scene is visible in at least one of the images but typically not in all of them.

It is appreciated that more than one mode of operation may be used to operationalize a single option. For example, self-photo tasks may be operationalized by using the system's "object at location" mode to identify that the self-photographer has reached the photography location and by subsequently using the system's "low motion" mode to identify that the self-photographer has arranged himself and is now sitting still. Optionally, the self-photo task may subsequently use the system's "smile" option ("facial recognition" mode) to identify that the self-photographer is smiling.

Preferably, the user is entitled to select or define a logical combination of the options provided by the system of FIG. 1, for example, the user might define Active Child AND Don't Blink if s/he wishes to photograph an active child while s/he is not blinking. Another example is that the user might define Urban OR Race if s/he wishes, via a single process of definition on his part, to generate two pictures of a race scene including a picture of the winner reaching the finish line and a picture of the backdrop of the race in which the runners and other moving objects have been filtered out. Typically, these logical combinations are implemented, in the system, simply by defining each specific logical combination as a separate option to be supported by the system.

Preferably, the user is entitled to select or define a logical combination of different configurations for a single mode provided by the system of FIG. 1, for example the user might define to photograph the first object arriving at a location such as a finish line OR the second object arriving at the location OR the third object arriving at the location if s/he wishes to photograph all three medal-winning athletes finishing an official race.

Preferably, the user is able to select some modes with a simple logic relation between them like 'and', 'or' and 'not'. For example, photograph an active child when s/he is not blinking; or generate two images of the same scene: the urban background thereof and an image of a car that crosses a line in the viewed scene.

Different modes of operation need not be constructed and operative independently of one another. Instead, preferably, the system of the present invention includes a "catch the moment" function and a "scene building" function and the modes described above are constructed and operative within one or another of these functions.

The "catch the moment" function is a group of functionalities relevant to applications in which a particular scene is to be imaged at a particular time. The group of functionalities may for example include a moment anticipator functionality, operative to predict the time at which an application-specific change will occur in the scene. This functionality is useful for many applications in which a scene is to be imaged at a particular time. Another functionality useful for many applications in which a scene is to be imaged at a particular time is a moment selection functionality operative to identify an image within an existing stream of images, with predetermined characteristics. Typically, the object at location, high/low motion and facial recognition modes are each constructed and operative within the "catch the moment" function.

The "scene building" function is a group of functionalities relevant to applications in which a particular scene is to be built up from a plurality of images thereof. Typically, the noise reduction and background modes are each constructed and operative within the "scene building" function. The "scene building" group of functionalities may for example include a sub-image separator functionality, a sub-image analyzer functionality, a scene image generator functionality and a scene analyzer functioniality.

It is appreciated that the above photography options are merely exemplary of the essentially limitless number of special photography situations which may be defined and supported by suitable programming which adapts the operation of the camera, automatically, to the particular characteristics of the particular photography situation. Categories of such photography situations may be defined to include a number of photography options which have similar characteristics. For example, a photography system of the present invention may include "catch the moment" photography options, such as but not limited to the active child, birthday cake, blink, dive, race, child/pet running, smile, surprise and self-photo options, in each of which it is desired to photograph a specific moment having known image characteristics which can either be anticipated, in which case the operation of the camera is timed accordingly, or selected, in which case a sequence of images may be discarded, but for a single image selected at the appropriate time.

As another example, a photography system of the present invention may include "scene building" photography options, such as but not limited to the urban and night options, described herein, in each of which it is desired to build an image of a scene using local image processing methods applied to the images arriving from the digital imaging device 10.

FIG. 2A-2L are simplified pictorial illustrations of the camera system of FIG. 1 after selection of an individual option by the user, at which point the system typically provides the user with instructions as to how to photograph within the selected option. It is appreciated that the particular messages shown and described herein are merely examples. In addition to or instead of the voice, a text message can appear on the screen or any other mode of message presentation may be employed including presentation within a user manual.

If the "manual" option is selected, as shown in FIG. 2A, there is no message or a minimal message to the user who then proceeds to photograph without intervention or special set-up by the camera system of FIG. 1 other than as is known in the art.

If the "active child" option is selected, as shown in FIG. 2B, the message to the photographer may be: "Position your child at a desired location, point the camera at the child, press the shutter button and keep the camera still until you hear a beep".

If the "birthday cake" option is selected, as shown in FIG. 2C, the message may be: "Point the camera at the flames of the candles, press the shutter button and keep the camera still until you hear a beep".

If the "don't blink" option is selected, as shown in FIG. 2D, the message may be: Point the camera at your subject's face, press the shutter button and keep the camera still until you hear a beep".

If the "dive" option is selected, as shown in FIG. 2E, the message may be: "Point the camera at the airspace in front of the diving board or at the water beneath the diving board. Press the shutter button and keep the camera still until you hear a beep".

If the "urban" option is selected, as shown in FIG. 2F, the message may be: "Point the camera at your urban scene. Don't worry about people or cars obstructing the scene. Your camera will erase them for you. Press the shutter button and keep the camera still until you hear a beep. Be patient-this may take a while."

If the "night" option is selected, as shown in FIG. 2G, the message may be: "Point the camera at your night scene. Press the shutter button and keep the camera still until you hear a beep. Be patient-this may take a while."

If the "race" option is selected, as shown in FIG. 2H, the message may be: "Point the camera at the finish line. Press the shutter button and keep the camera still until the race is over and you have heard a confirming beep."

If the "child/pet running" option is selected, as shown in FIG. 2I, the message mav be: "Choose a location. The camera will photograph your subject as it runs by this location. Point the camera at this location, Press the shutter button and keep the camera still until you hear a beep".

If the "smile" option is selected, as shown in FIG. 2J, the message may be: "Point the camera at your subject's face. Press the shutter button and keep the camera still until you hear a beep".

If the "surprise" option is selected, as shown in FIG. 2K, the message may be: "Point the camera at your subject's face. Press the shutter button and keep the camera still until you hear a beep".

If the "self-photo" option is selected, as shown in FIG. 2L, the message may be: "Choose a location. Point the camera at your location and press the shutter button. Walk to your location, stand still (optional, and smile) until you hear a beep."

Figure 3:
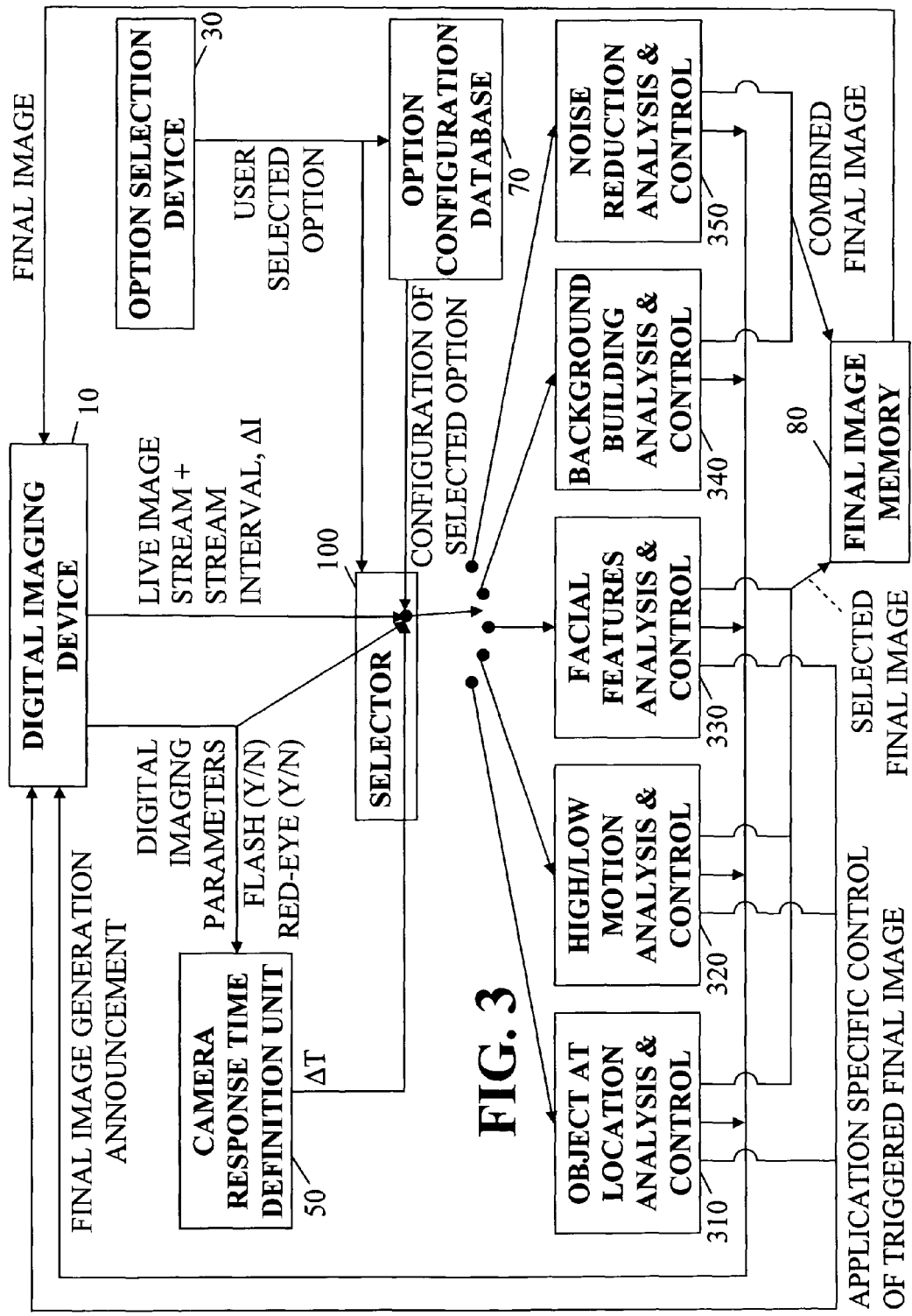
FIG. 3 is a simplified functional block diagram illustration of the digital photography system of FIG. 1, constructed and operative in accordance with a preferred embodiment of the present invention.

FIG. 3 is a simplified functional block diagram illustration of the digital photography system of FIG. 1, constructed and operative in accordance with a preferred embodiment of the present invention. The digital imaging device 10 may comprise digital imaging apparatus similar or identical to that provided within any suitable digital camera such as the following state of the art digital camera: SONY DSC-T7, Olympus C-8080 or Canon PowerShot SD500.

As shown, a plurality of imaging analysis and control units 310, 320, 330, 340 and 350 are preferably provided to carry out a corresponding plurality of photography task types differentially, as a function of the known characteristics of each photography task type e.g. each of the example options shown in FIG. 1. A selector 100 selects one of these as a function of a user selected option, as shown in FIG. 1, and optionally, other input data as shown. Each option preferably is associated with a configuration stored in configuration database 70. The configuration determines e.g., definition of camera response time, at unit 50.

According to a preferred embodiment of the present invention, a scene imaging, analysis, creation and control functionality is provided which is operative to carry out photography tasks in which it is desirable to combine a plurality of images into a single final image e.g. as in night photography and as in urban scene photography in which moving objects obscure various portions of a backdrop in various different scenes. A moment anticipation functionality may be provided to carry out photography tasks in which it is necessary and possible to anticipate a particular moment at which imaging should take place, long enough before that moment to enable activation of the imaging process. e.g. 0.1-5 seconds before the imaging process is to be activated. An example of such a task is photographing the winning moment in a race. A moment selection imaging analysis and control functionality may be provided to carry out photography tasks in which it is desired to select an image from a stream of images, immediately but retroactively. If flash is used, for example, the moment selection functionality is typically not appropriate whereas the moment anticipation functionality is appropriate because it enables the flash to be activated at the exact moment at which imaging is supposed to occur. If a baby randomly waving her arms and legs is imaged, for example, the moment selection functionality may be appropriate because the child's movements are not easily predictable such that the moment anticipation functionality may not be able to operate effectively.

As shown, selector 100 selects the appropriate one of the imaging, analysis and control units depending on the photography task. Typically, digital imaging parameters provided by the digital imaging device 10 parameterize each photography task to allow the selector 100 to perform its selection function appropriately. It is appreciated that the specific imaging analysis and control units shown are merely exemplary of the possible different units which may be provided in any suitable combination.

The live image stream generated by the digital imaging device need not be at conventional video sampling rate and may, for example, be within the range of 2-120 images per second.

If the only imaging analysis and control device provided is based on moment anticipation functionality, a lower resolution stream may be employed such as a stream of half the requested photo resolution since digital imaging device 10 is the unit which feeds the final image into memory. If moment selection functionality is used, full resolution (as set by the user via digital imaging device 10) is typically provided since the analysis and control unit feeds the final image into memory 80.

If the bandwidth from digital imaging device 10 to selector 100 is limited, the resolution may be reduced in anticipation, while increasing the stream rate.

It is appreciated that at least one of the units 30, 50, 70, 80, 100, 310, 320, 330, 340 and 350 may reside on an integrated circuit or a chip constructed and operative to reside within digital camera housing. Alternatively, these may be provided within a small external device e.g. card which may be operatively associated with a digital camera. Another alternative is that at least one of the functional units (30, 50, 70, 80, 100, 310, 320, 330, 340 and 350) may be retrofit onto an existing integrated circuit or chip, such as a programmable CPU, forming part of an existing digital camera system.

According to another preferred embodiment of the present invention, an external device such as a personal computer is provided, that may receive the images and the option type from an input device such as the input device of FIG. 1. The camera may save only the option type to its memory, and an external device may read the option type along with images arriving from the memory of digital imaging device 10 and may perform the image selection or scene creation functions. The results may be saved in the external computer or in the memory of the digital imaging device 10, and the images which are not required or were not selected may be, but need not be, erased or allowed to be overridden The units 310, 320, 330, 340 and 350 can each be a separate integrated circuit or a chip or alternatively, some or all of these may be implemented on one chip or integrated circuit.

If moment selection functionality or scene building functionality are selected and units 310 or 320 or 330 or 340 or 350 operate relatively slowly, e.g. for "heavy" applications, the stream generated by digital imaging device 10 may be a delayed stream. For example, the digital imaging device 10 may save some images and then recall them from memory and transmit them as a stream to the selected unit.

It is appreciated that the final image memory of FIG. 3, which stores the output photograph, need not be separate from the memory of digital imaging device 10 and instead may be integral therewith. It is appreciated that, when the moment selection functionality of the present invention is employed, memory 80 may save not only a final image but rather substantially all images from the live image stream generated by digital imaging device 10. A final image may then be selected by means of a keep command issued by a selected one of the analysis and control units. For all images other than the final image, the selected analysis and control unit typically issues an override command rather than a keep command.

The selector 100 simply stores the relevant unit 310, 320, 330, 340 or 350 for each of the options supported e.g. each of the options illustrated in FIG. 1.

It is appreciated that more than one level of photography situations may be defined by the photography task-specific camera system of the present invention. For example, the display 210 of FIG. 1 may include an "advanced" button 220 which, if selected, opens a menu. e.g. on display 210, as shown in FIG. 1. The user may be invited to select one of a plurality of modes such as object at location, high/low motion, facial recognition, noise reduction, and background. The modes may include any or all of the following:

Object at location: Photographing a defined object as it reaches a defined location, or photographing the first or n'th object to reach that location.

High/low motion: Photographing a moving object at a moment of zero or locally minimal motion, or at a moment of locally maximal motion.

Facial recognition: Photographing a subject at a moment at which his facial expression corresponds to a predefined description.

Noise reduction: Reducing noise resulting from long exposure time e.g. for night photography situations, even for photography situations in which substantial camera motion and/or motion of objects within the scene are present.

Background: Photographing a background obscured by moving objects, including filtering the moving objects out of the eventual image.

It is appreciated that the apparatus and methods shown and described herein are useful not only in a conventional digital camera system but also in systems which include a digital photography component such as cellular telephones, personal digital assistants, and other hand-held and personal devices having digital photography capabilities.

A camera response time determination unit 50 is operative to receive information on the operation mode of the digital imaging device 10 from that device. For example, the digital imaging device 10 may provide unit 50 which indications of whether or not its flash is operative, whether or not its red-eye function is operative, and generally information regarding any aspect of the digital imaging device 10's operation mode which affects response time $\Delta T$ seconds.

Selector 100 receives $\Delta T$ from camera response time determination unit 50 and sends it to the selected analysis and control units (310, 320, 330, 340 or 350).

Typically, only analysis and control units that may carry out moment anticipation functionality (e.g. units 310, 320 or 330) use $\Delta T$. These units, when carrying out moment anticipation functionality, generate a trigger message indicating that the scene should be imaged $\Delta T$ seconds from the present time. The trigger message actuates the digital imaging device 10, at $\Delta T$ seconds from when the trigger is sent, e.g. as shown in FIG. 4.

Figure 4:
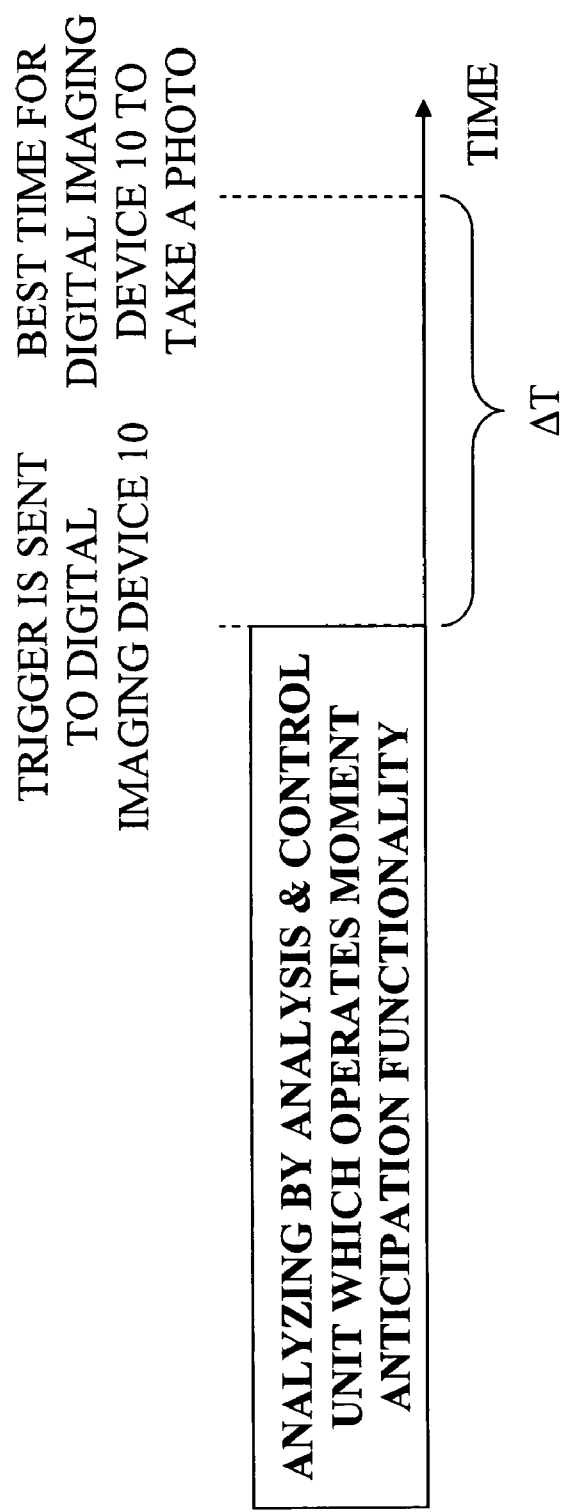
FIG. 4 is a simplified pictorial illustration of a timeline suitable for any of the "catch the moment" applications in which moment anticipation functionality described herein is operational.

FIG. 4 is a simplified pictorial illustration of a timeline suitable for any of the "catch the moment" applications which employ moment anticipation functionality described herein. As shown, a selected one of the analysis and control units 310, 320 or 330 may generate a trigger which activates the imaging device 10 to take picture at a best time e.g. at a moment at which a predetermined amount of time has elapsed from the moment of triggering.

Figure 5A:
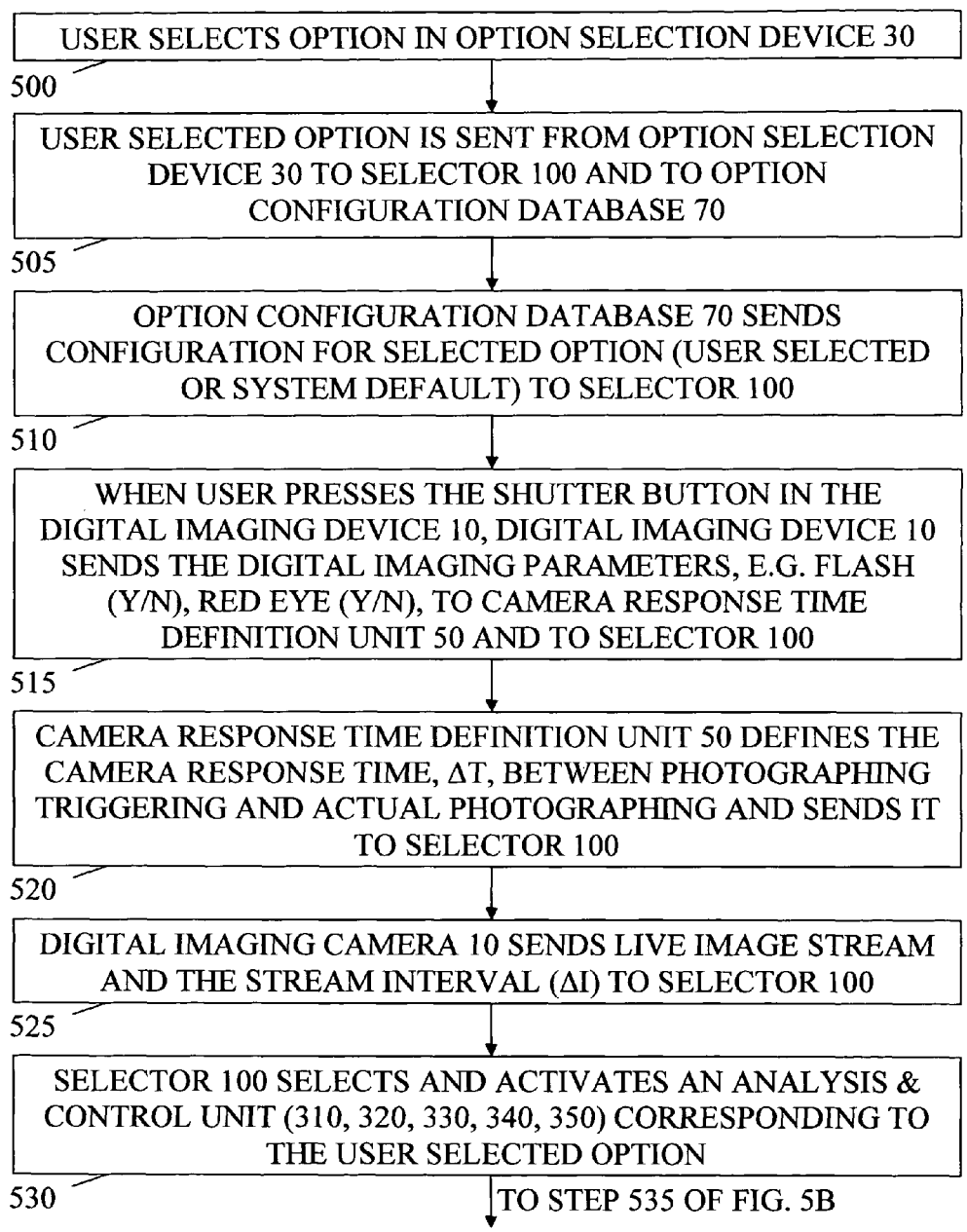
FIGS. 5A and 5B, taken together, form a simplified flowchart illustration of a preferred method of operation for the apparatus of FIG. 3.
Figure 5B:
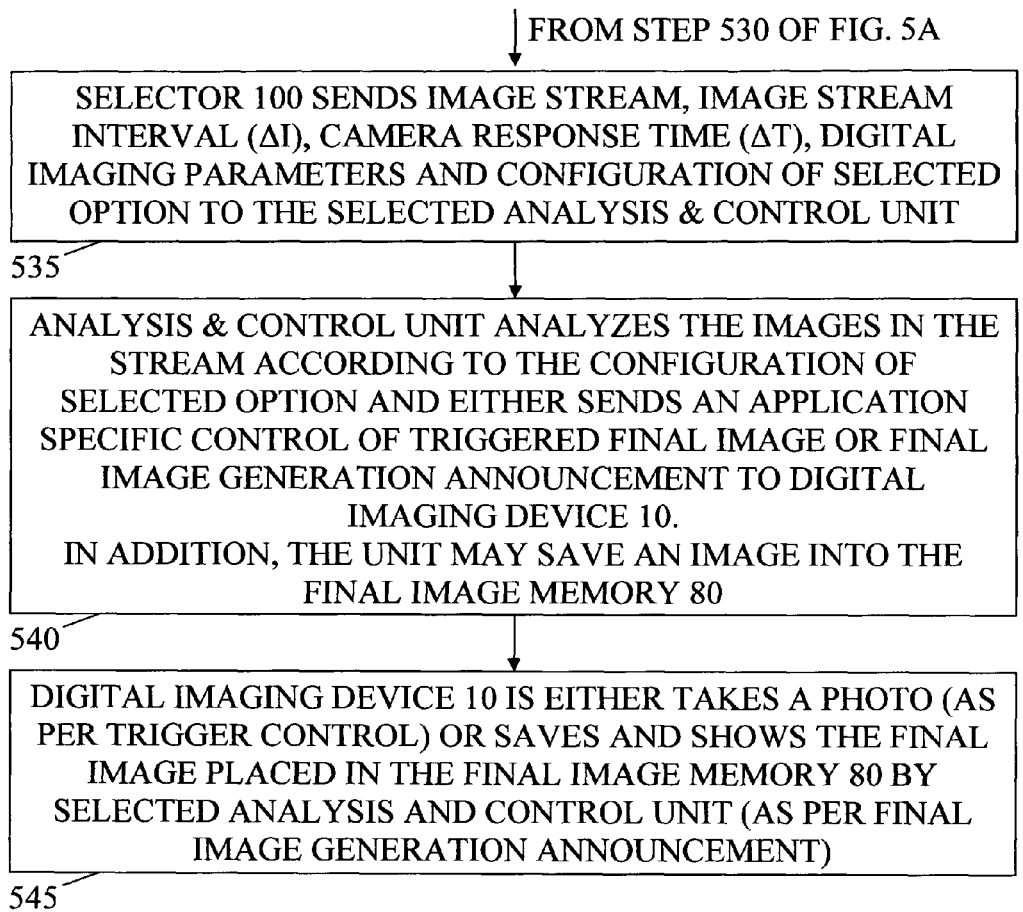

FIGS. 5A and 5B, taken together, form a simplified flowchart illustration of a preferred method of operation for the apparatus of FIG. 3. In step 520, $\Delta T$ typically depends on flash, flash+red eye, and electronic response time. Steps 535-540 in FIGS. 5A-5B form a stream loop which continues, including performance of all relevant computations, until one or more of the following events occur:

Trigger is sent (anticipation).
Final image generation announcement (selection+scene).
User intervention (such as another press on the shutter button).

Figure 8A:
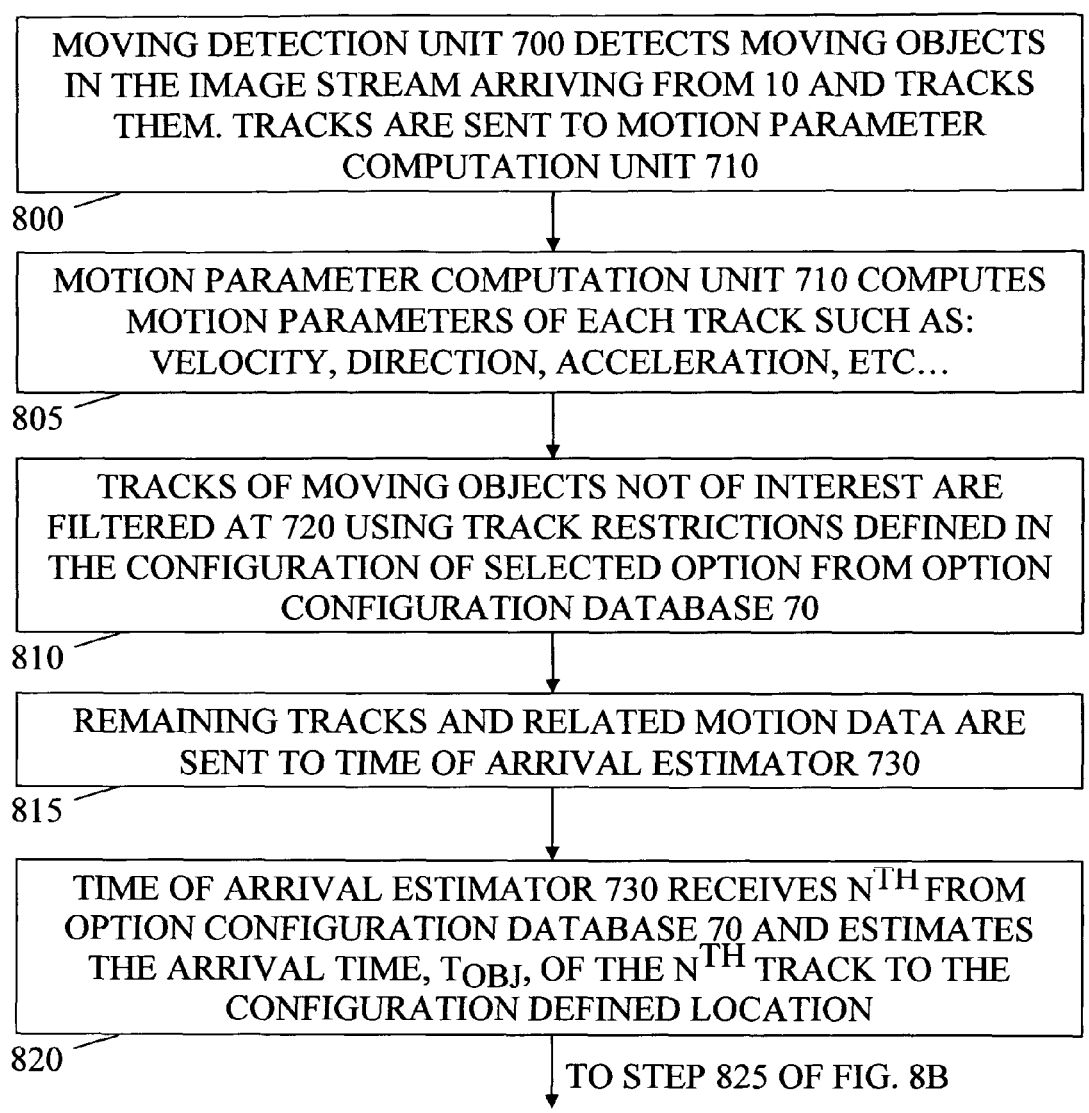
FIGS. 8A and 8B, taken together, form a simplified flowchart illustration of a preferred method of operation for the apparatus of FIG. 7.
Figure 8B:
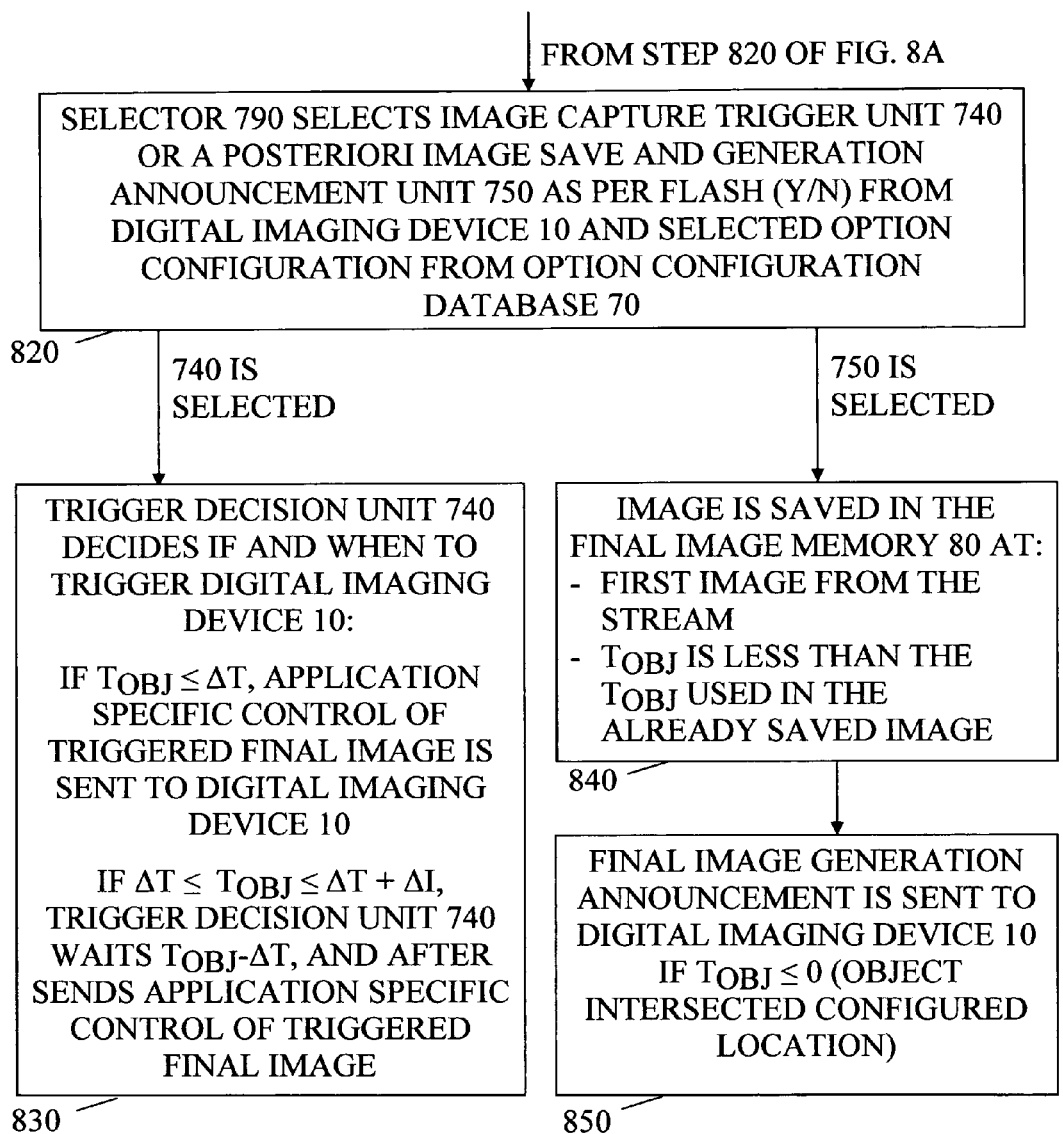
Figure 16A:
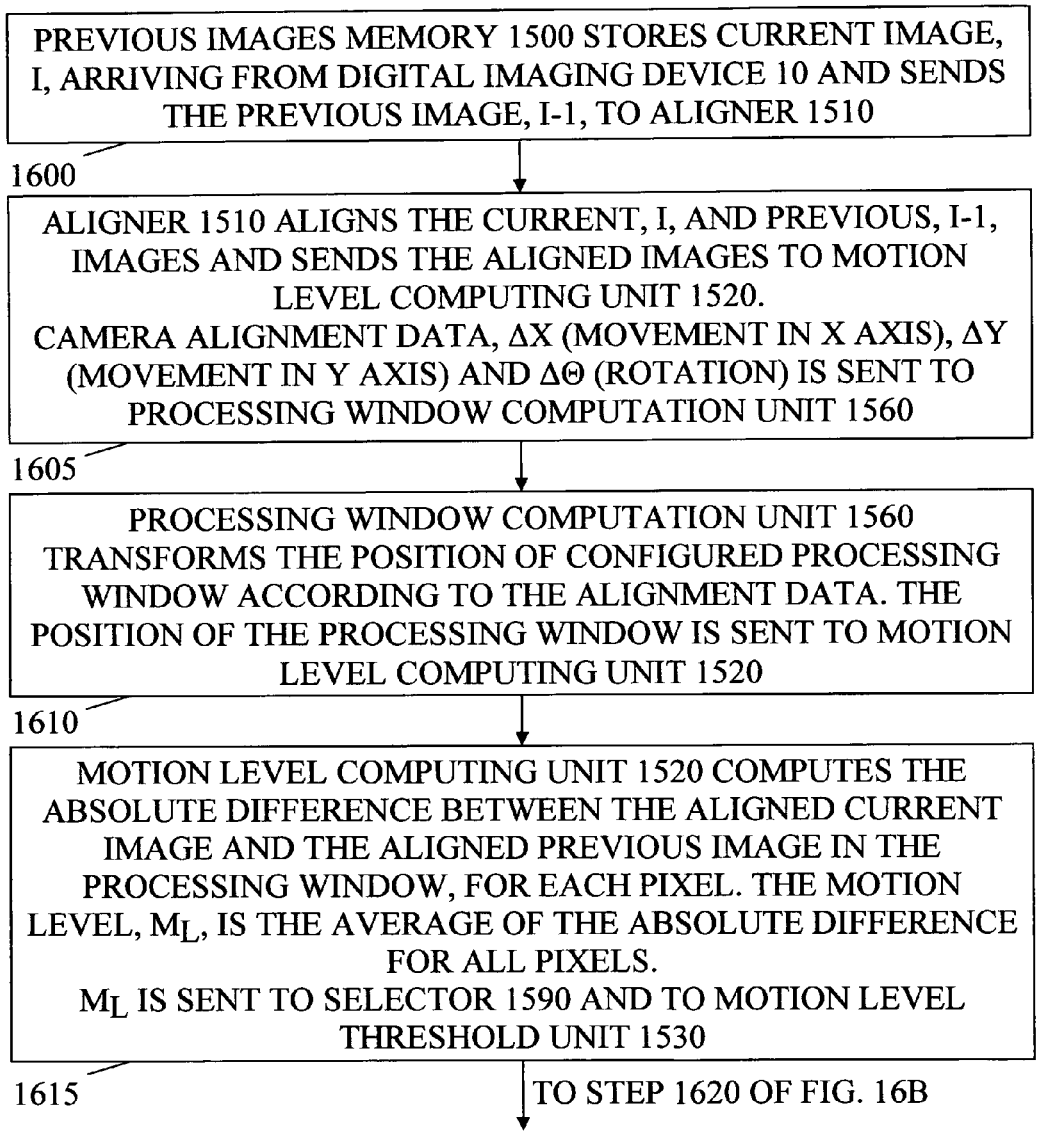
FIGS. 16A and 16B, taken together, form a simplified flowchart illustration of a preferred method of operation for the apparatus of FIG. 15.
Figure 16B:
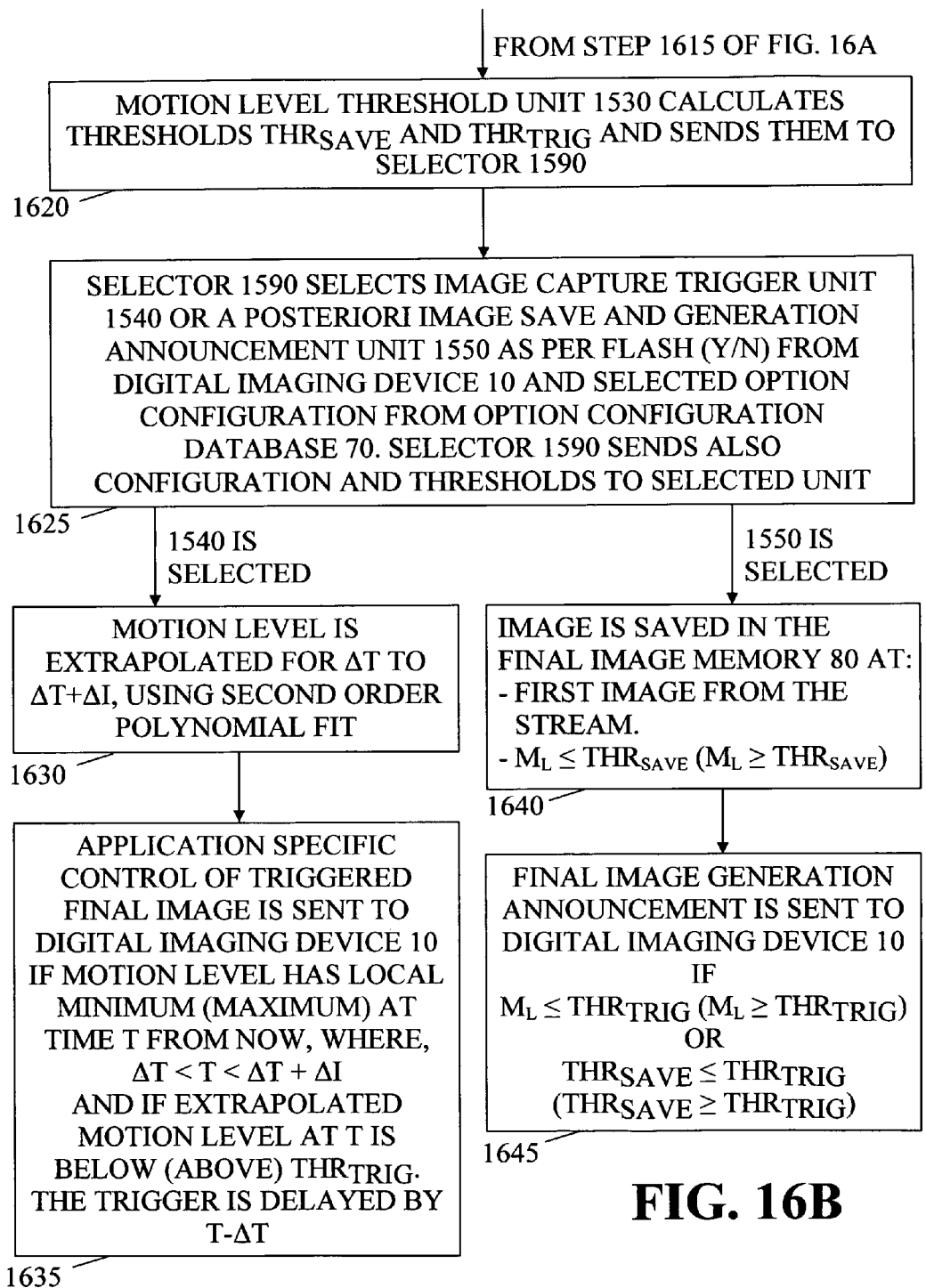
Figure 21:
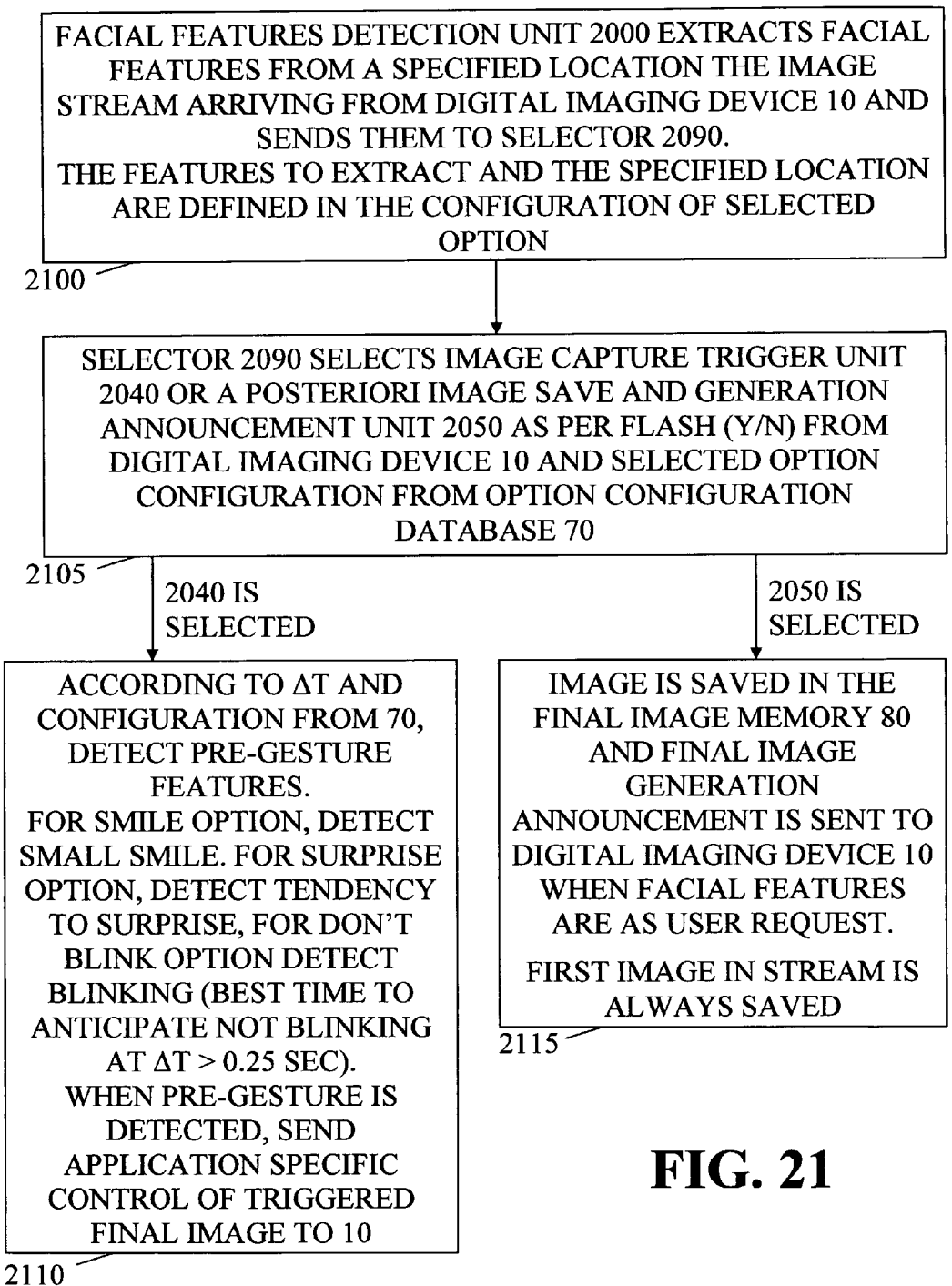
FIG. 21 forms a simplified flowchart illustration of a preferred method of operation for the apparatus of FIG. 20.

As optional setup, the system may be operative to continue the computations of moment selection functionality or scene building functionality described in steps 800-820, 840 and 850 of FIGS. 8A and 8B; steps 1600-1625, 1640 and 1645 of FIGS. 16A and 16B; steps 2100, 2105, 2115 of FIG. 21; FIGS. 23A and 23B and FIGS. 35A and 35B, for as long as the user continues to press on the shutter button even after a final image generation announcement has been made (step 540).

Figure 6:
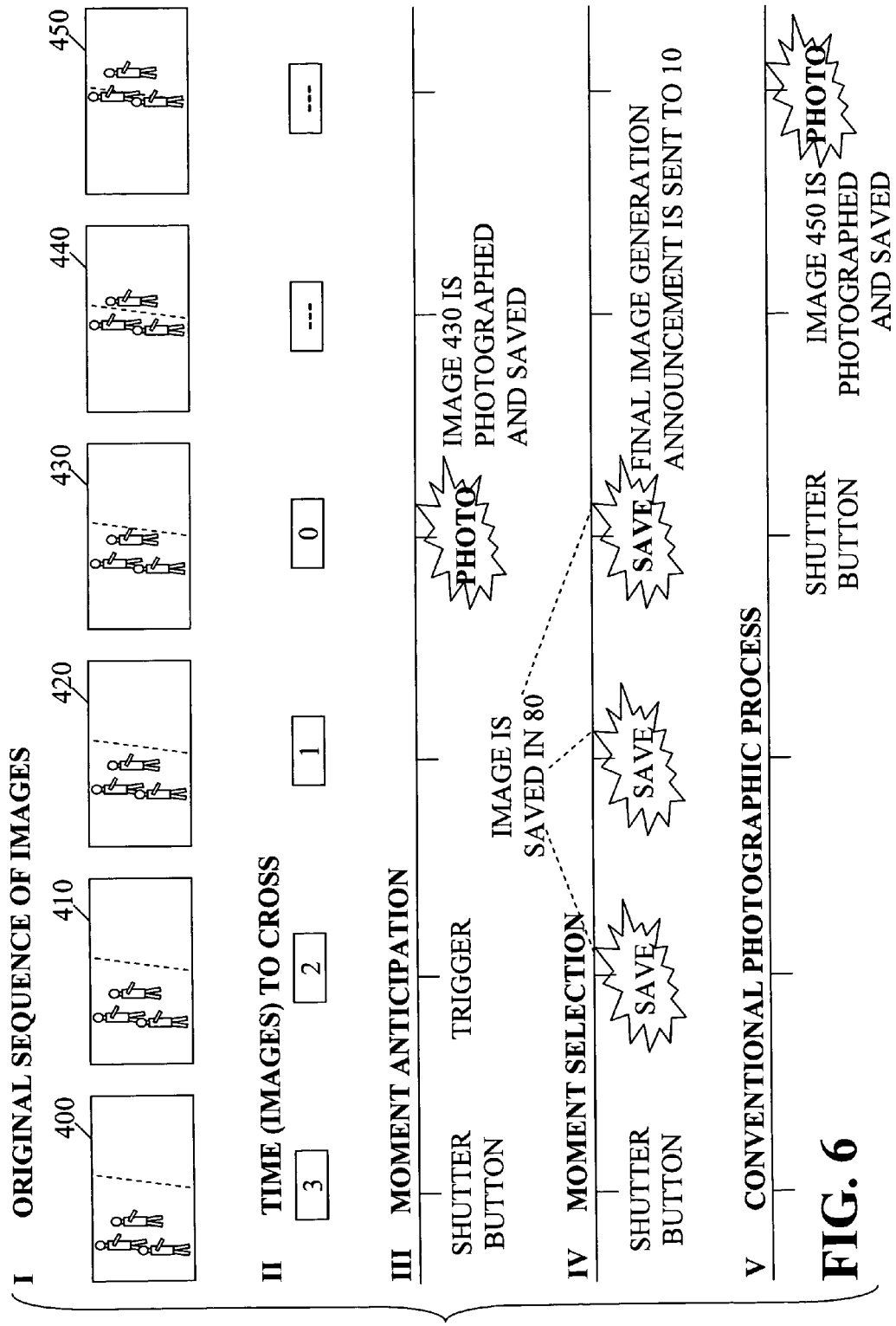
FIG. 6 is a pictorial and time-line diagram illustrating an example of the operation of the object-at-location analysis and control unit 310 of FIG. 3, according to a preferred embodiment of the present invention.

FIG. 6 is a pictorial and time-line diagram illustrating an example of the operation of the object-at-location analysis and control unit 310 of FIG. 3, according to a preferred embodiment of the present invention. FIG. 6 compares the operations of the moment anticipation functionality of the present invention, the moment selection functionality of the present invention and conventional photography functionality, all for an "object at location" type application such as a race situation. A time-lined cartoon of the race is shown in row I. Row II shows the number of time units (images) which remain until the subject crosses the finish-line. In the illustrated embodiment, it is assumed that two time units are required to activate the imaging process. The imaging process may be activated either by conventional shutter button pressing or by an internal application specific imaging control message or "trigger" provided by a preferred embodiment of the present invention. As shown, conventional photography (row V) may result in post-facto imaging, after the race has already ended, imaging which uses moment anticipation functionality (row III) results in a single photo being generated at the right moment, and imaging which uses moment selection functionality (row IV) results in saving images 410, 420 and 430 from among a stream of such images, numbered respectively 400, 410, 420, 430, 440, 450, . . . . Each latter image may override each former image in memory. A final image generation announcement is sent to digital imaging device 10 re image 430.

Figure 7:
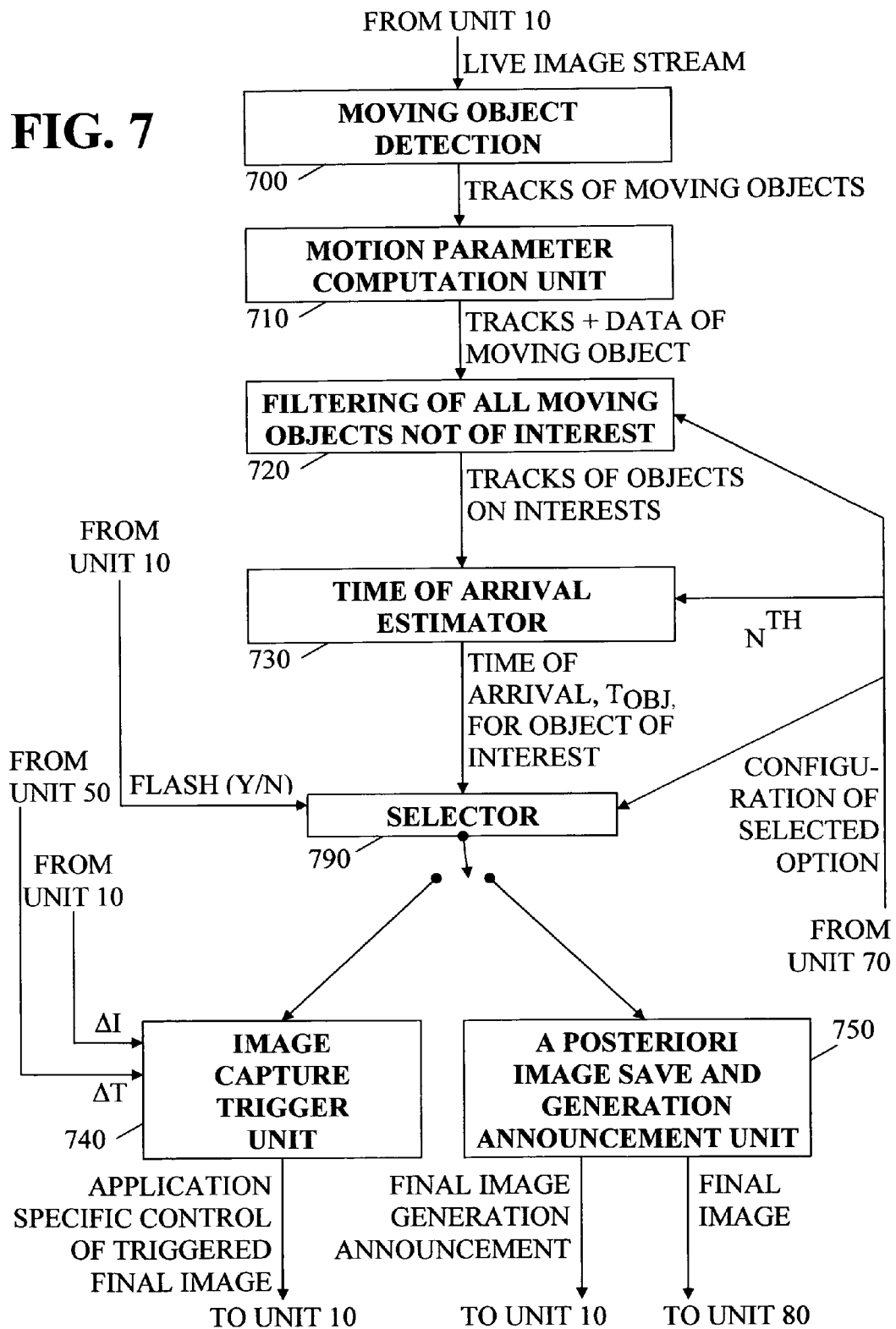
FIG. 7 is a simplified functional block diagram illustration of the object-at-location analysis and control unit 310 of FIG. 3, constructed and operative in accordance with a preferred embodiment of the present invention.

FIG. 7 is a simplified functional block diagram illustration of the object-at-location analysis and control unit 310 of FIG. 3, constructed and operative in accordance with a preferred embodiment of the present invention. In FIG. 7, preferably, the user can set a "location mode" defining when an object of interest is to be imaged, as comprising any of the following:

Reaching a specified area.
Crossing a specified line.
Comes closest to a given point.
Strays farthest from a given point.

It is appreciated that a user setting is not limited to the above location modes but can be any other location based functions, e.g. it may be desired to image an object when it strays maximally from a specified line instead of when one of the above criteria occurs. The location mode may also exist in the database 70.

It is appreciated that detection of an object in a specified location or in compliance with any suitable location criteria such as the above four criteria, need not be based on motion detection algorithm and instead may be based on other suitable methods such as tracking, segmentation or recognition.

It is appreciated that an "object at location unit" need not photograph an image using location data only and instead may be based on any location related object function, including velocity, direction, acceleration, trajectory type and more. Examples: photographing the object at the maximum velocity imaging the object only When it is found to be moving in a specified direction, or photographing the object at its minimal acceleration.

It is appreciated that an "object at location unit" need not photograph based only on location-related functions and alternatively or in addition may be partly or wholly based on any object data function other than location-related characteristics, Such as photographing the object of the maximum viewed size, maximum brightness, or photographing the object whose color is closest to a predefined color such as red.

It is appreciated that an "object at location unit" need not use only a single event for "triggerin" or "selection" but may use a pre-defined set or sequence or logical combination of events, such as arrival at two points in sequential order, or the following sequence of events: moving to the right, arriving at a point and then moving at highest velocity.

FIGS. 8A and 8B, taken together, form a simplified flowchart illustration of a preferred method of operation for the apparatus of FIG. 7. Regarding unit 840, it is appreciated that the saving decision need not use time-based criteria and instead may be based on other criteria such as distance to specified location.

Figure 9A:
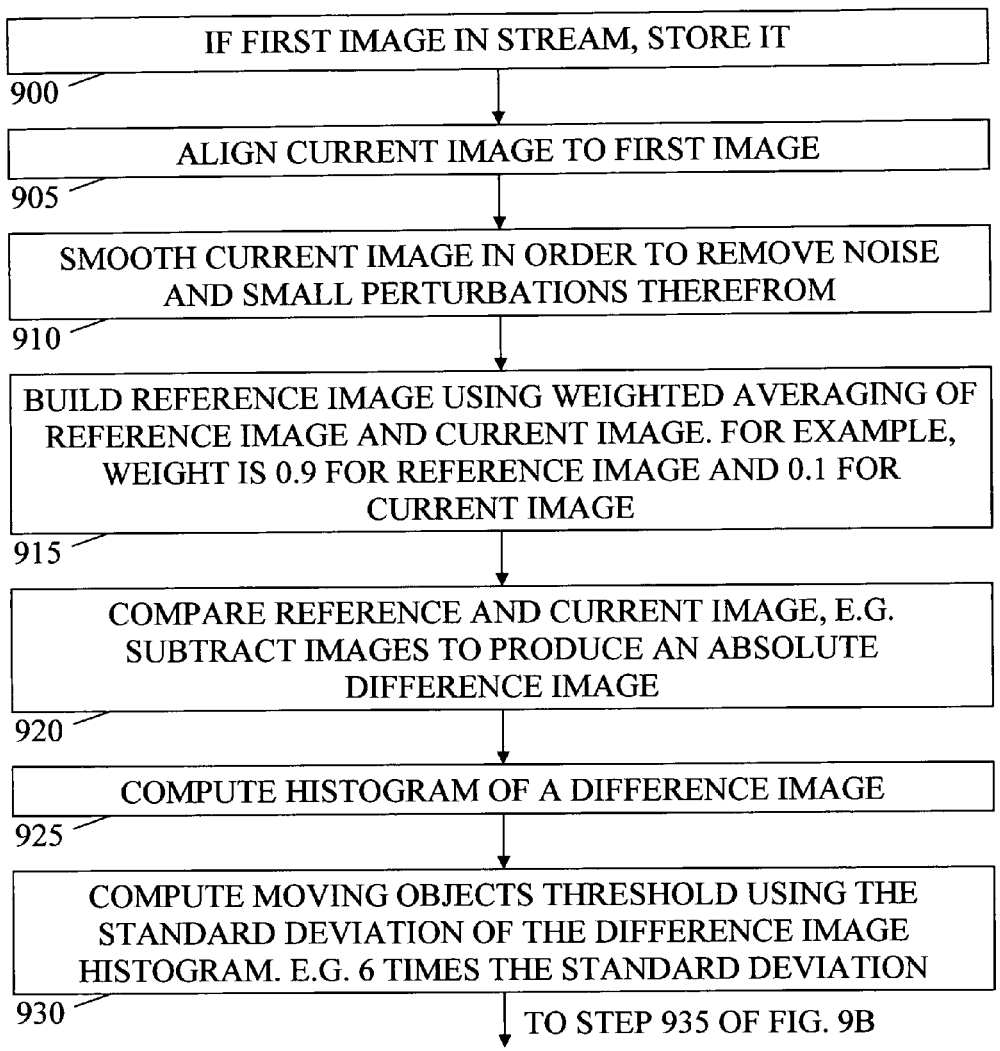
FIGS. 9A and 9B, taken together, form a simplified flowchart illustration of a preferred method of operation for the apparatus of the moving object detection 700 of FIG. 7.
Figure 9B:
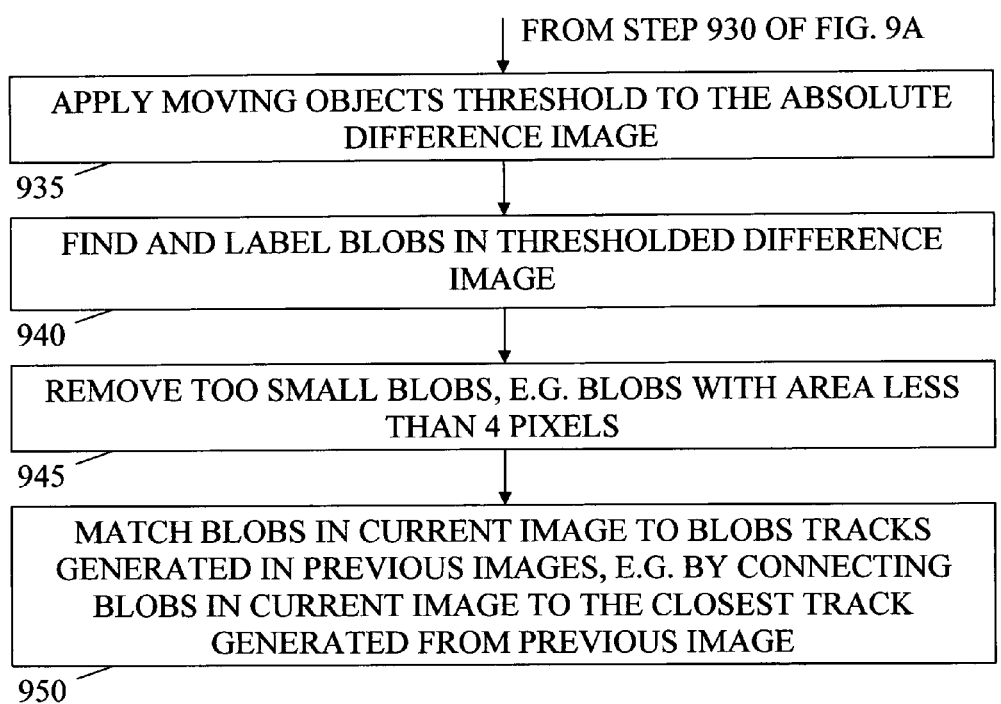

FIGS. 9A and 9B, taken together, form a simplified flowchart illustration of a preferred method of operation for the apparatus of the moving object detection 700 of FIG. 7. Alignment may be performed using registration which is based on template matching techniques, where the displacement of each template is determined by normalized correlation, and the alignment is determined by fitting a camera motion model to template results. Alternatively, alignment may be based on the registration methods described in "Image Registration Methods: A Survey", Barbara Zitova, Jan Flusser. Imaging and Vision Computing 21 (2003), pp. 977-1000 and publications referenced therein. All of the above publications are hereby incorporated by reference. The image warping may use nearest neighbor interpolation, bilinear interpolation and other suitable interpolation methods. Regarding step 905, the alignment in the current embodiment is carried out in displacement ($\Delta X$, $\Delta Y$) and in rotation ($\Delta \theta$).

In step 905, it is appreciated that the alignment need not be based on displacement and rotation, instead it may be based on less, more or other parameters, such as affine alignment.

In step 915, it is appreciated that the reference image creation need not use a weighted average and instead may be based on any other image operators and measures of central tendency such as a median between images. In step 930, it is appreciated that the threshold computation need not be based on histogram's standard deviation and instead may be constant, based on any other histogram related function such as local minimum in the histogram, or an image related function. In step 945, it is appreciated that blob filtering need not filter only small blobs and instead may filter any other non-interesting blobs, such as blobs with non-interesting shape, color or brightness. In step 950, it is appreciated that the extraction of tracks from blobs need not use distance-based blob matching and instead may be based on other methods.

It is appreciated that motion detection need not use difference based algorithms and instead may be based on other methods such as image flow.

Figure 10:
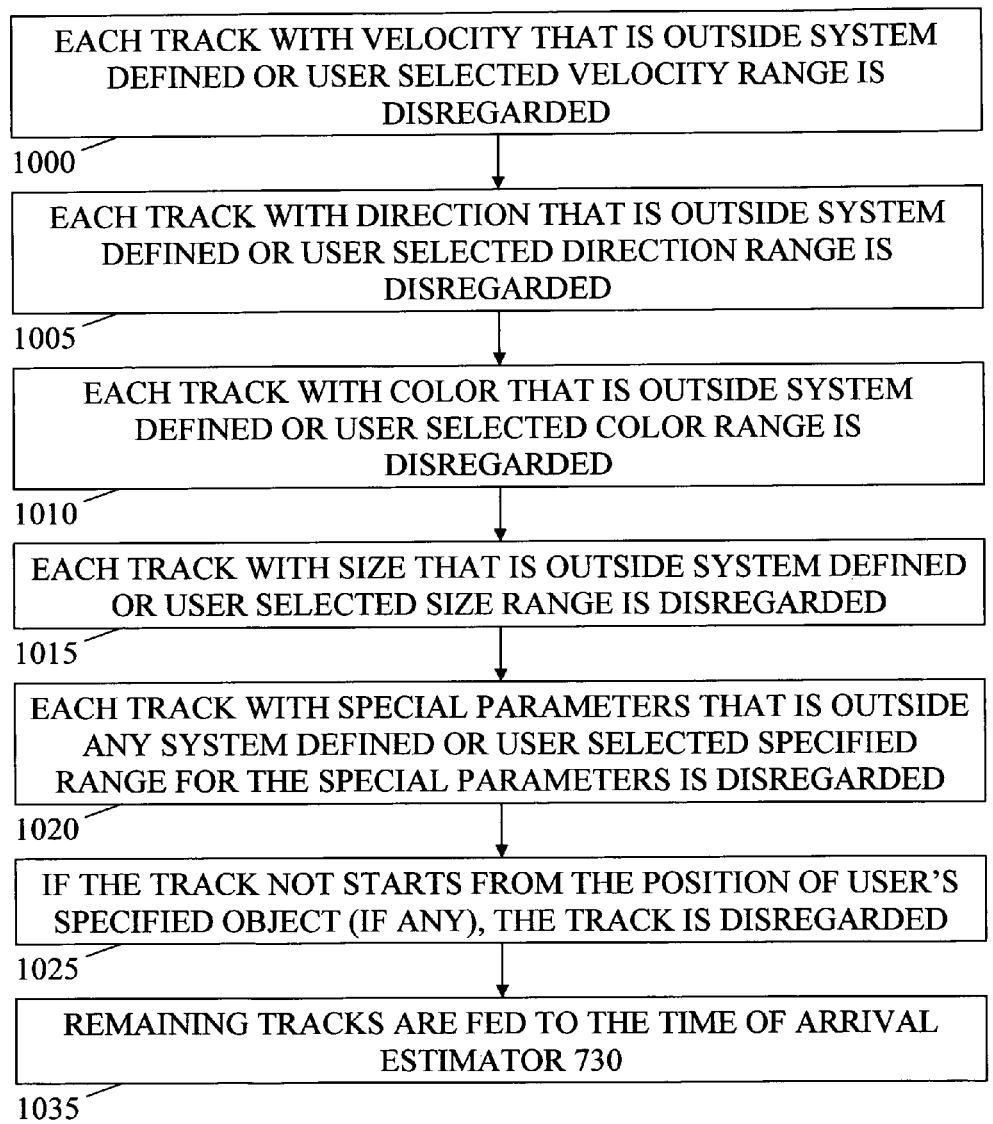
FIG. 10 forms a simplified flowchart illustration of a preferred method of operation for the filtering unit 720 of FIG. 7, which is operative to filter out all moving objects not of interest.

FIG. 10 forms a simplified flowchart illustration of a preferred method of operation for the filtering unit 720 of FIG. 7, which is operative to filter out all moving objects not of interest.

Figure 11:
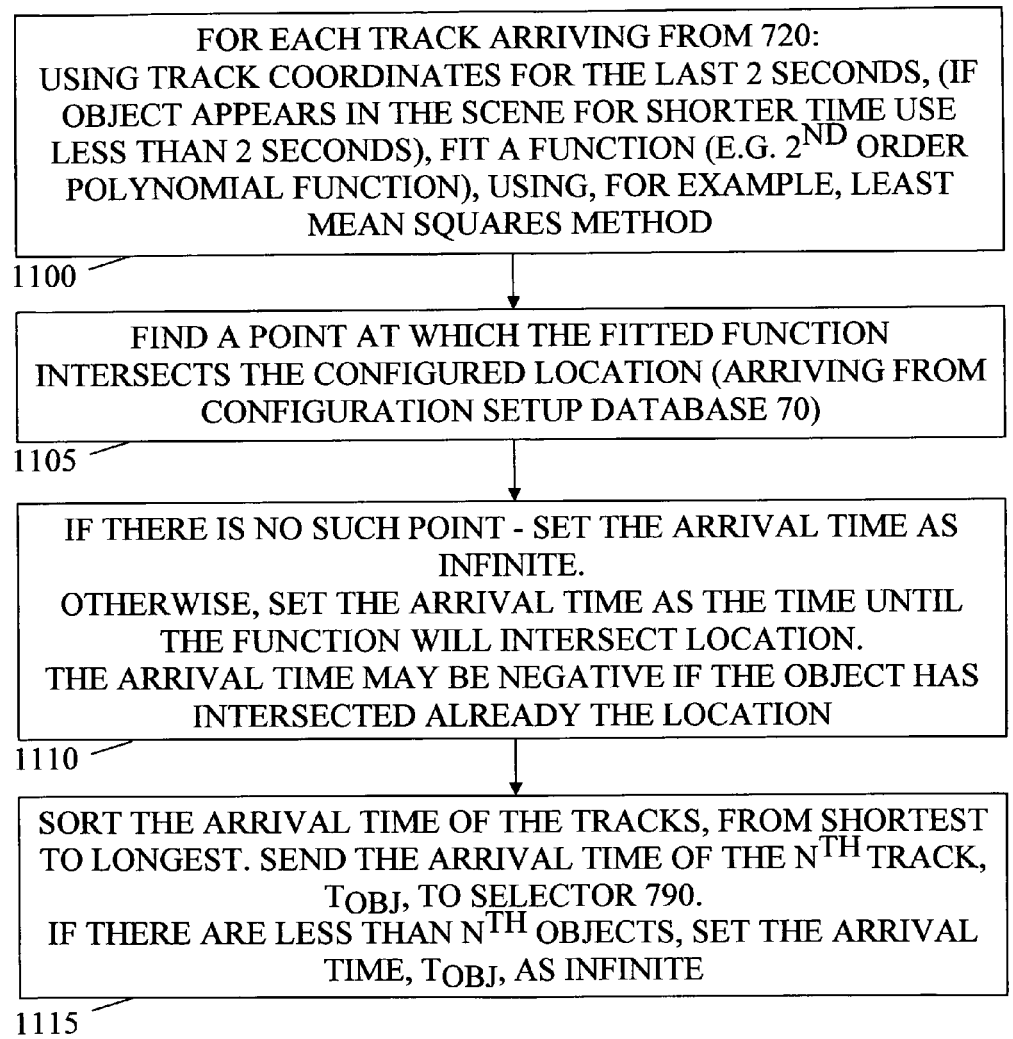
FIG. 11 forms a simplified flowchart illustration of a preferred method of operation for the apparatus of the time of arrival estimator 730 of FIG. 7.

FIG. 11 forms a simplified flowchart illustration of a preferred method of operation for the apparatus of the time of arrival estimator 730 of FIG. 7. Regarding step 1100, it is appreciated that the estimation need not use polynomial or function fit and instead may be based on other methods. Also, the fit need not use least mean square method and instead may be based on other methods, such as minimum of maximal error.

Figure 12:
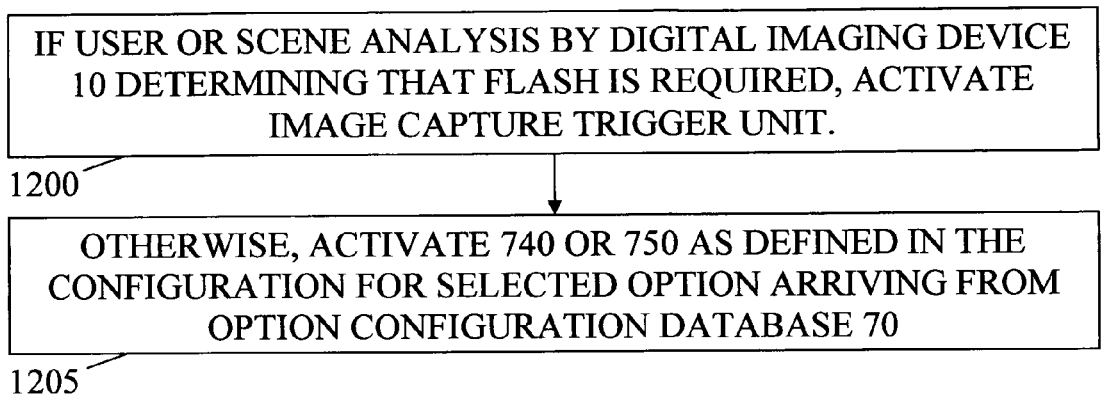
FIG. 12 forms a simplified flowchart illustration of a preferred method of operation for the apparatus of the selector 790 of FIG. 7.

FIG. 12 forms a simplified flowchart illustration of a preferred method of operation for the apparatus of the selector 790 of FIG. 7. The selector implementation is typically the same for all analysis and control units that have selectors.

Figure 13:
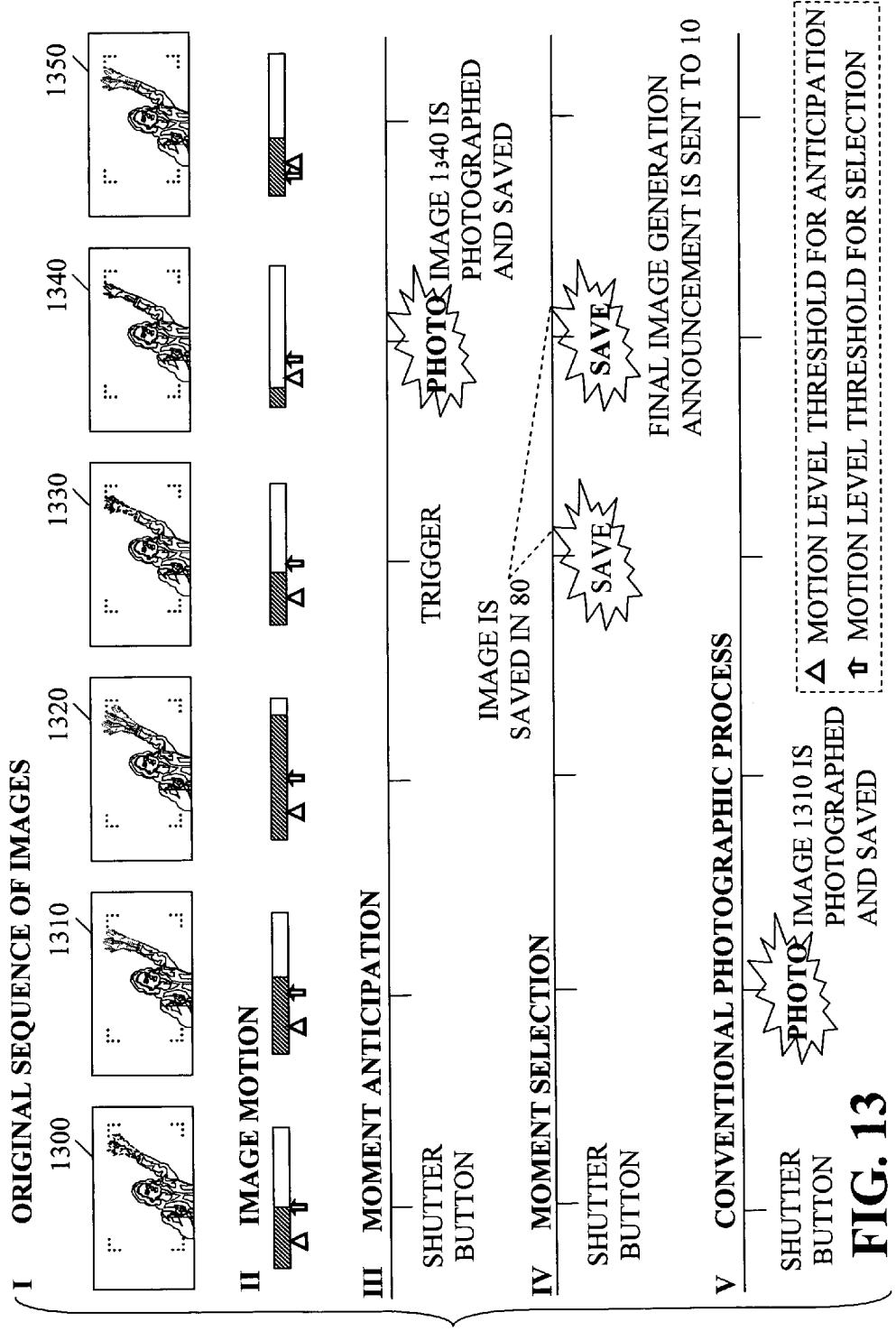
FIG. 13 is a pictorial and time-line diagram illustrating an example of the operation of the high/low motion analysis and control unit 320 of FIG. 3, according to a preferred embodiment of the present invention.

FIG. 13 is a pictorial and time-line diagram illustrating an example of the operation of the high/low motion analysis and control unit 320 of FIG. 3, according to a preferred embodiment of the present invention in which the unit is operating in low motion detection mode. The motion level threshold for anticipation and for selection is shown to be constant, however in fact it may be changed during processing.

FIG. 13 compares the operations of the moment anticipation functionality of the present invention, the moment selection functionality of the present invention and conventional photography functionality, all for "high/low motion" type applications operative to detect low motion specifically, such as in an image of a hand-waving subject. A time-lined cartoon of the scene is shown in Row I. Row II shows the motion level of the image caused mainly by the waving hand, the motion level threshold for anticipation and the motion level threshold for image selection. In the illustrated embodiment, it is assumed that one time unit is required to activate the imaging process. The imaging process may be activated either by conventional shutter button pressing or by an internal application-specific imaging control message or "trigger" provided in accordance with a preferred embodiment of the present invention. As shown, conventional photography (row V) may result in a smeared image caused by the waving (1310). In contrast, imaging which uses moment anticipation functionality (row III) results in a single photo being generated at the moment at which the hand wave is temporarily arrested, and imaging which uses moment selection functionality (row IV) results in saving of images 1330 and 1340 from among a stream of such images, numbered respectively 1300, 1310, 1320, 1330, 1340, 1350, . . . , wherein each later image overrides its predecessors. A final image generation announcement is sent to digital imaging device 10 at (for) image 1340.

Figure 14:
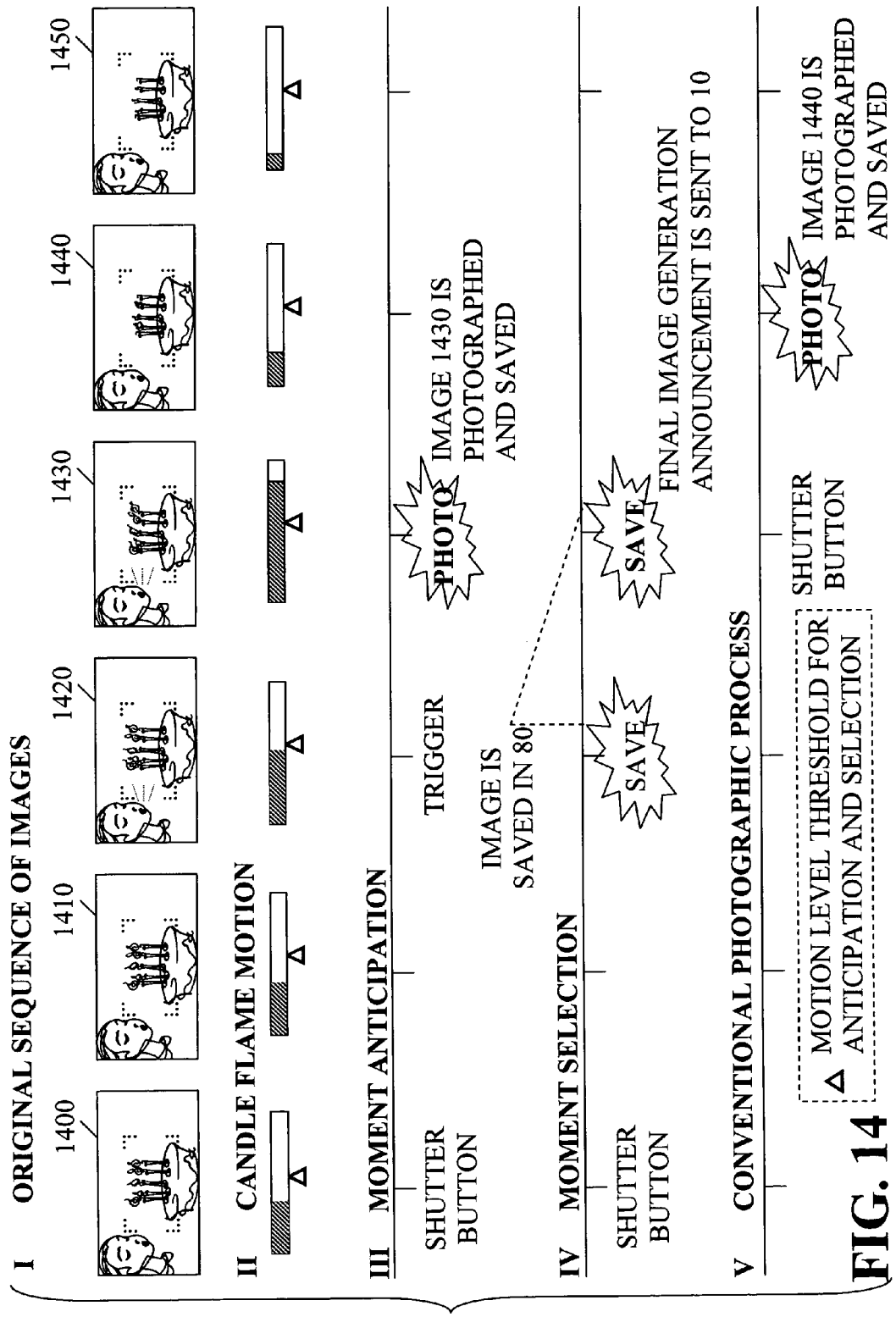
FIG. 14 is another pictorial and time-line diagram illustrating an example of the operation of the high/low motion analysis and control unit 320 of FIG. 3, according to a preferred embodiment of the present invention.

FIG. 14 is another pictorial and time-line diagram illustrating an example of the operation of the high/low motion analysis and control unit 320 of FIG. 3, according to a preferred embodiment of the present invention in which the unit is operating in high motion detection mode. The motion level threshold for anticipation is typically the same as the motion level from selection. The motion level threshold is shown constant however in fact it may be changed during processing.

FIG. 14 compares the operations of the moment anticipation functionality of the present invention, the moment selection functionality of the present invention and conventional photography functionality, all for "high/low motion" type application operative to detect high motion such as blowing out candles in a birthday cake scene. A time-lined cartoon of the scene is shown in row I. Row II shows the motion level of the image caused mainly by the flickering candle flames and the motion level thresholds, combined for anticipation and selection. In the illustrated embodiment, it is assumed that one time unit is required to activate the imaging process. The imaging process may be activated either by conventional shutter button pressing or by an internal application-specific imaging control message or "trigger" provided by a preferred embodiment of the present invention. As shown, conventional photography (row V) may result in post-facto imaging, i.e. an image after the candles have already been extinguished (1440). Imaging which uses moment anticipation functionality (row III) results in a single photo being generated at the precise moment at which the candles are blown out, and imaging which uses moment selection functionality (row IV) results in saving of images 1420 and 1430 from among a stream of such images, numbered respectively 1400, 1410, 1420, 1430, 1440, 1450, . . . , wherein each later image overrides its predecessors. A final image generation announcement is sent to digital imaging device 10 at (for) image 1430.

Figure 15:
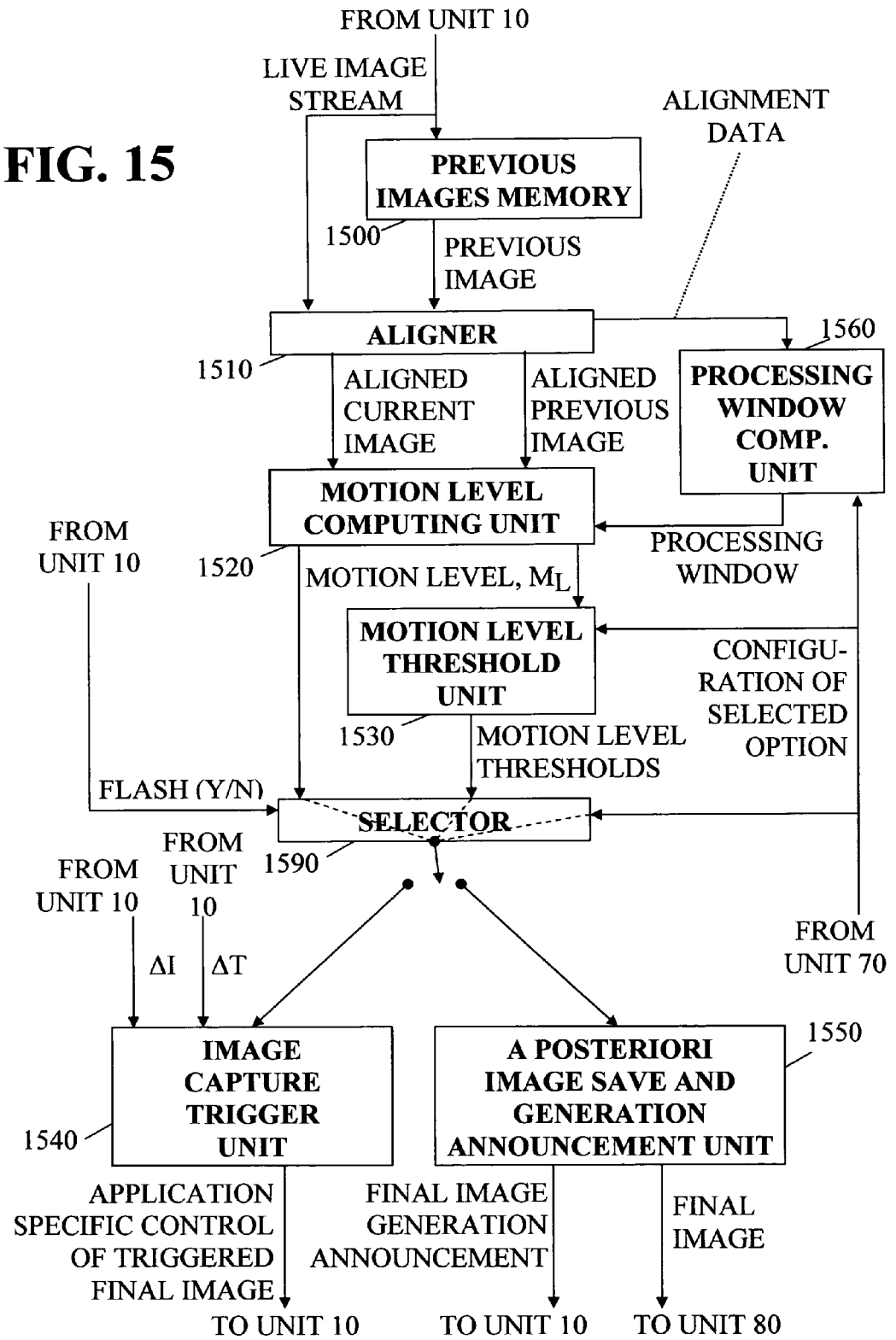
FIG. 15 is a simplified functional block diagram illustration of the high/low motion analysis and control un it 320 of FIG. 3, constructed and operative in accordance with a preferred embodiment of the present invention.

FIG. 15 is a simplified functional block diagram illustration of the high/low motion analysis and control unit 320 of FIG. 3, constructed and operative in accordance with a preferred embodiment of the present invention. In unit 1510, alignment may be based on the registration methods described in "Image Registration Methods: A Survey", Barbara Zitova, Jan Flusser, Imaging and Vision Computing 21 (2003), pp. 977-1000 and publications referenced therein. All of the above publications are hereby incorporated by reference.

FIGS. 16A and 16B, taken together, form a simplified flowchart illustration of a preferred method of operation for the apparatus of FIG. 15. In the following description, a low motion detection application is assumed. Modification of the methods for high motion detection appears in (parentheses). The aligner 1510, as described in step 1605 of FIG. 16A, may be operative in accordance with the principles of operation described above with reference to FIG. 9. In step 1610, the coordinates of the processing window may be transformed using the alignment data in order to process the same area even if the camera is not exactly still.

In step 1635, the test of the local minimum (maximum) is for assuring the photo has the minimal (maximal) motion level. If the minimum (maximum) is at $\Delta T$, which is the start of the extrapolated data, the motion level would be lower (higher) before the actual photo. If the minimum (maximum) is at $\Delta T+\Delta I$, which is the end of the extrapolated data, the motion level would be lower (higher) after the actual photo. In this case the photo is preferably taken of subsequent images.

In step 1645, If $THR_{save}<=THR_{trig}$ ($THR_{save}>=THR_{trig}$), this typically means that an image with motion level of $THR_{trig}$ or less (more) was already saved.

In step 1600, the previous image memory may not store the previous image only but instead may store other previous images or a combined reference image to be used for motion level computation.

In step 1615, the motion level need not be based on image differencing but instead may be based on other methods, such as image flow, or histogram difference. It is appreciated that the motion level need not be computed from two images but instead may use more images or alternatively only a single image. In the latter case, motion level can be computed from the image smear, which may be computed, for example, by means of local contrast (e.g. measuring the average edge intensity in a computed window).

In step 1630, the motion level extrapolation need not use second order polynomial fit, but instead may be based on other methods, such as fit to a general function.

It is appreciated that the aligner 1510 may be disabled to compute the combined motion level of the camera and of the object within the entire processing area. In such a case the image is selected or triggered when the combined motion of the camera and the object is relatively low (high). This option is preferably also used to reduce or eliminate image smear caused by the camera motion.

FIG. 17 forms a simplified flowchart illustration of a preferred method of operation for the apparatus of the motion level threshold unit 1530 of FIG. 15. The first threshold $THR_{SAVE}$ is typically the minimum (maximum) motion level until current time. Image should typically be saved if its motion level is below (above) this value. For triggering and announcement, the method of FIG. 17 may estimate if there is high probability that the current motion level will be minimal (maximal) until maximum processing time. Therefore, it is based on statistics from the previous images.

It is appreciated that the thresholds need not use such statistics, and instead may be constant, or based on other methods such as direct computation of the expected minimum (maximum) motion level until the maximal computation time.

Figure 18:
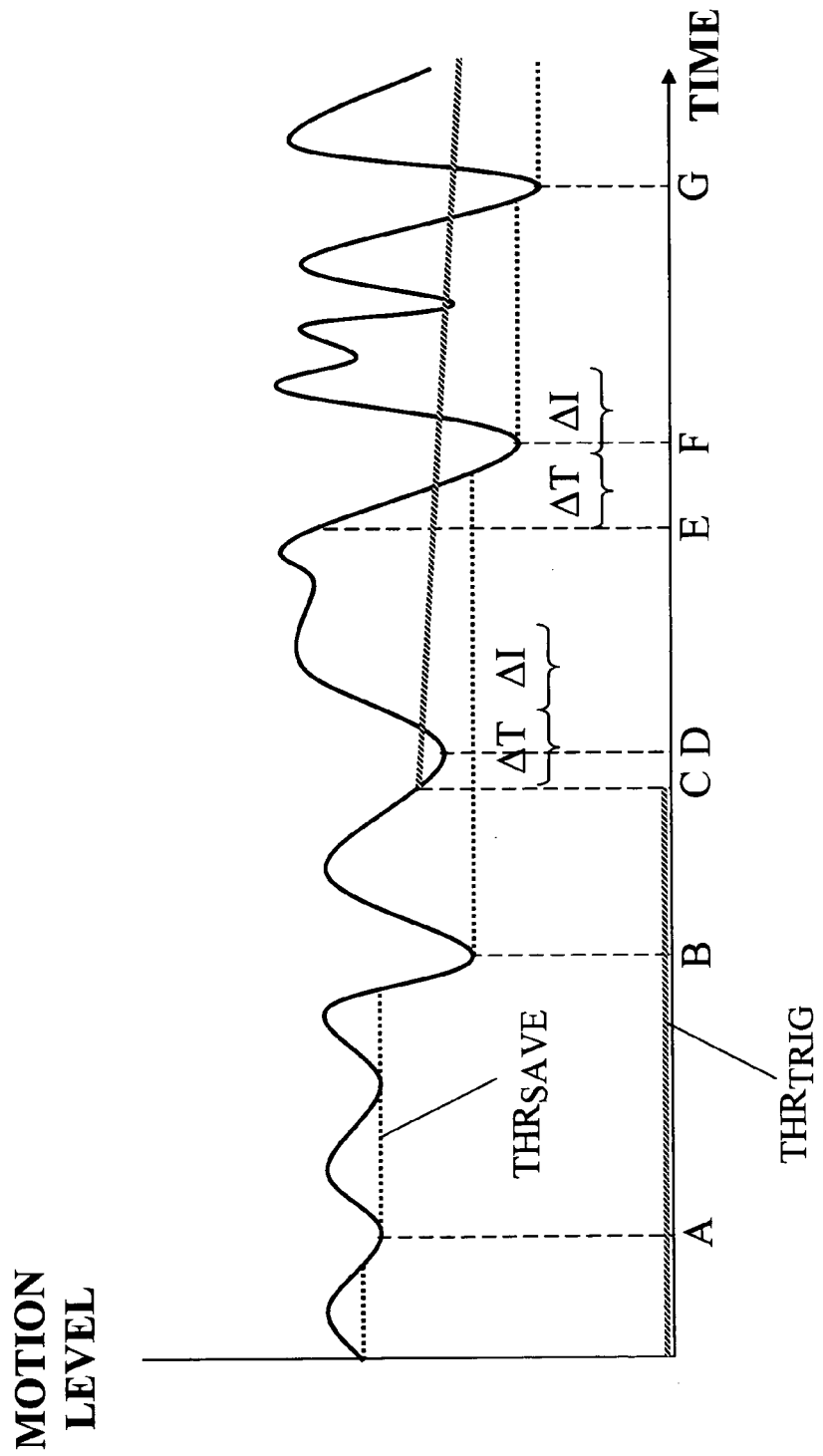
FIG. 18 is a graph of motion level vs. time, useful in determining an appropriate time at which to trigger imaging and/or save an image, in low motion detection applications.

FIG. 18 is a graph of motion level vs. time, useful in determining an appropriate time at which to trigger imaging and/or save an image, in low motion detection applications. The curve represents the motion level as it changes over time. The diagonal patterned line represents the motion level threshold, $THR_{TRIG}$. It typically has a non-zero value starting from point C, after there are enough frames for a statistic. Tile dotted line represents $THR_{SAVE}$. In some periods, it is same as the motion level.

At point A, the motion level is the minimum achieved until this point. Therefore, during the saving process an image will be saved in the final image memory 80. A final image generation announcement will not be sent since it is the motion level is higher than the $THR_{TRIG}$ (which is zero). For the same reason, no trigger will be sent in for the anticipation process. Similarly, for point B, saving is typically carried out but no announcement or trigger is generated. At point C, $THR_{TRIG}$ has a non-zero value. In the saving process, a final image generation announcement is typically sent since the motion level of the saved image is lower than the threshold. In triggering, a trigger is typically not sent, since in the time region $\Delta T$ until $\Delta T+\Delta I$ there is no local minima. At point E, the image capture trigger unit typically decides to send application specific control of triggered final image, since there is local minima (F), that is below $THR_{TRIG}$ in the time region $\Delta T$ until $\Delta T+\Delta I$. The trigger is typically sent slightly after E, at time F–$\Delta T$. In the saving process, if user keeps clicking on the shutter button, the image is typically saved in the final memory at point F, and final image generation announcement is typically resent. At the triggering process, application specific control of triggered final image is typically not sent since one was sent already. At point G, the same occurs as at point F.

Figure 19:
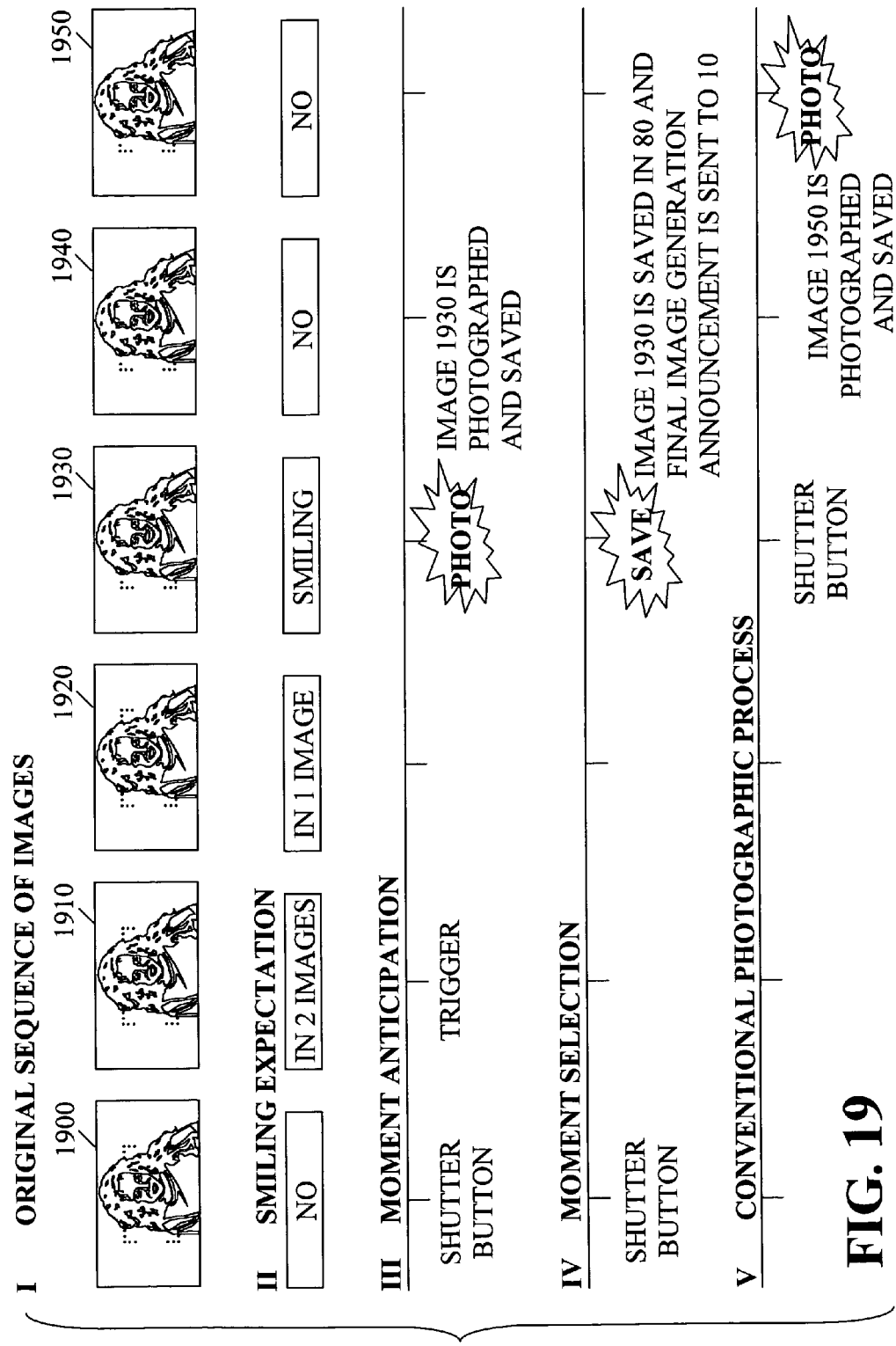
FIG. 19 is a pictorial and time-line diagram illustrating an example of the operation of the facial features analysis and control unit 330 of FIG. 3, according to a preferred embodiment of the present invention.

FIG. 19 is a pictorial and time-line diagram illustrating an example of the operation of the facial features analysis and control unit 330 of FIG. 3, according to a preferred embodiment of the present invention. In this case $\Delta T$ is 2 stream-images long. Typically, when a feature extraction functionality, based on conventional image processing and/or facial feature detection methods, first detects a small smile, application specific control of triggered final image is sent.

FIG. 19 compares the operations of the moment anticipation functionality of the present invention, the moment selection functionality of the present invention and conventional photography functionality, all for "facial features" type application, such as a smiling person situation. A time-lined cartoon of the scene is shown in Row I. Row II shows the number of time units (images) which remain until the person smiles. In the illustrated embodiment, it is assumed that two time units are required to activate the imaging process. The imaging process may be activated either by conventional shutter button pressing or by an internal application specific imaging control message or "trigger" provided by a preferred embodiment of the present invention. As shown, conventional photography (row V) may result in post-facto imaging, after the person has stopped smiling (1950). Imaging which uses moment anticipation functionality (row III) results in a single photo being generated at the right moment (i.e. during the smile), and imaging which uses moment selection functionality (row IV) results in a single smile-containing photo or image 1930 being saved from among a stream of such images, numbered respectively 1900, 1910, 1920, 1930, 1940, 1950, . . . .

Figure 20:
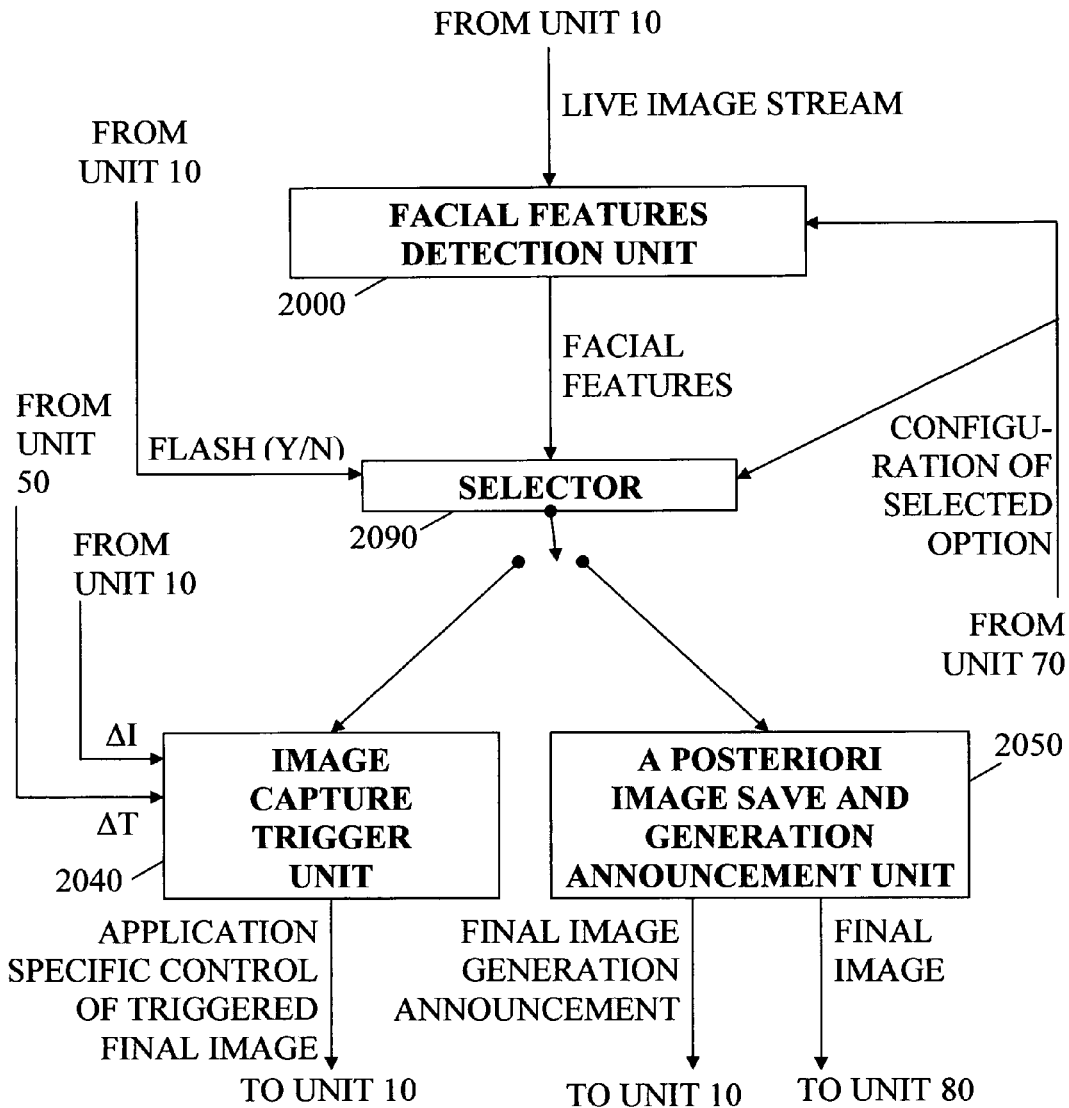
FIG. 20 is a simplified functional block diagram illustration of the facial features analysis and control unit 330 of FIG. 3, constructed and operative in accordance with a preferred embodiment of the present invention.

FIG. 20 is a simplified functional block diagram illustration of the facial features analysis and control unit 330 of FIG. 3, constructed and operative in accordance with a preferred embodiment of the present invention.

FIG. 21 forms a simplified flowchart illustration of a preferred method of operation for the apparatus of FIG. 20.

Detection of facial features at steps 2110 and 2115 may be carried out using state of the art facial feature detection methods such as those described in the following publications, the disclosures of which are hereby incorporated by reference:

"Real-Time Facial Expression Recognition Based on Features' Positions and Dimensions". Hiroshi Sako and Anthony V. W. Smith, Proceedings of the 13th International Conference on Pattern Recognition, 1996, Volume 3, 25-29 Aug. 1996 Page(s):643-648.

"Facial Expression Recognition Combined with Robust Face Detection in A Convolutional Neural Network", Masakazu Matsugu, Katsuhiko Mori, Yusuke Mitari and Yuiji Kaneda. Proceedings of the International Joint Conference on Neural Networks, 2003. Volume 3, 20-24 July 2003 Page(s): 2243-2246

"Facial Expression Recognition Using Constructive Feed-forward Neural Networks", L. Ma and K. Khorasami, IEEE Transactions on Systems, Man and Cybernetics Part B. Volume 34. Issue 3, June 2004 Page(s):1588-1595.

Detection of blinking at steps 2110 and 2115 may be performed using state of the art facial feature detection methods such as those described in the above-referenced Sako and Smith publication. In Sako and Smith, the eye is located using detection of eyebrow and pupil. If only the eyebrow is detected the eye is assumed to be blinking. Another method is to check if the color below the eyebrow is same as the skin color, in which case a blink is assumed to be occurring since the eyelid is apparently visible, or different, in which case a blink is assumed not to be occurring since the eye's pupil is apparently visible.

Since blinking is hard to anticipate at step 2110, especially when $\Delta T$ is above ¼ second, a preferred selected moment to trigger the digital imaging device is upon detection of blinking. At this time there is the highest probability that the subject to be photographed will not blink within a time interval of $\Delta T$ from the detected blink.

Figure 22:
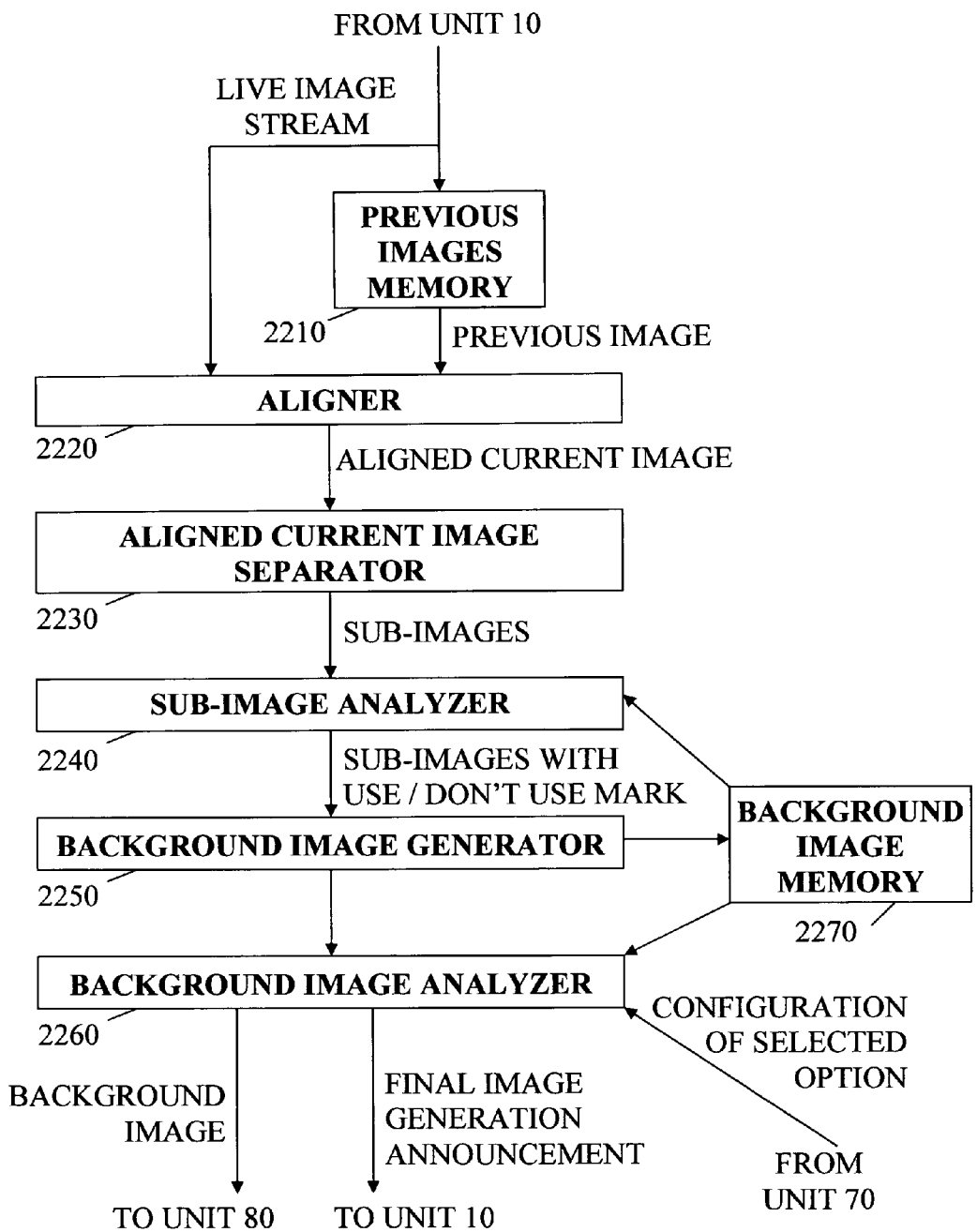
FIG. 22 is a simplified functional block diagram illustration of the background building analysis and control unit 340 of FIG. 3, constructed and operative in accordance with a preferred embodiment of the present invention.
Figure 23A:
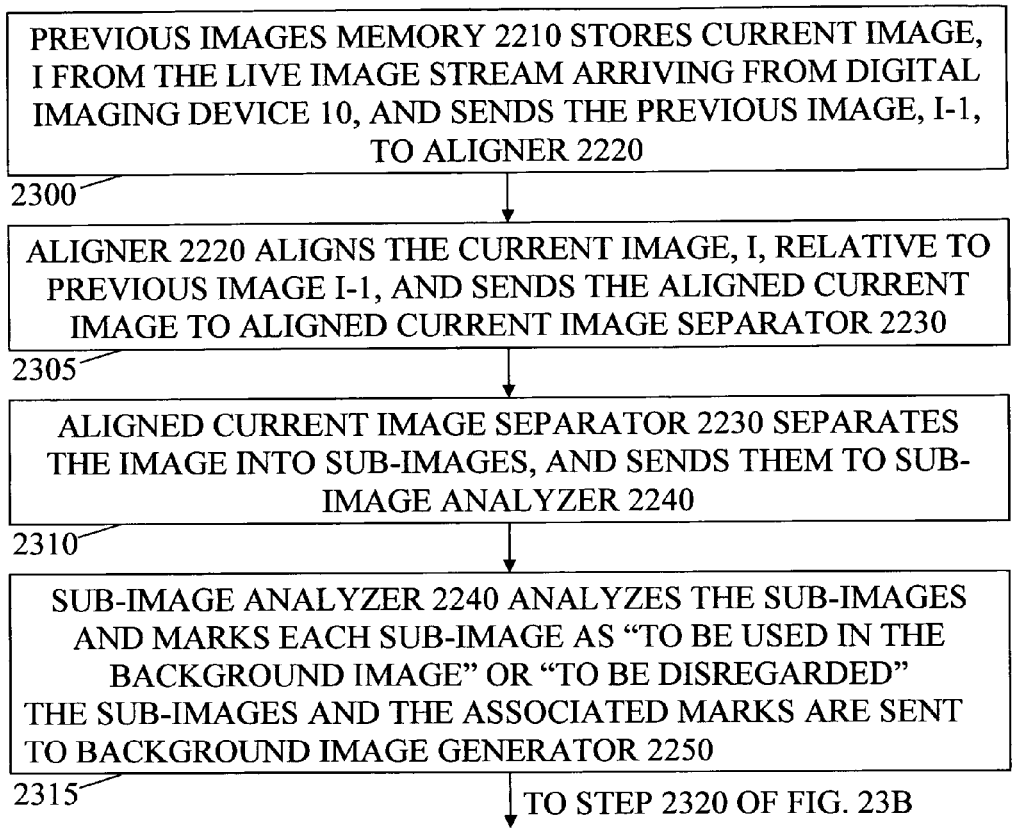
FIGS. 23A and 23B, taken together, form a simplified flowchart illustration of a preferred method of operation for the apparatus of FIG. 22.
Figure 23B:
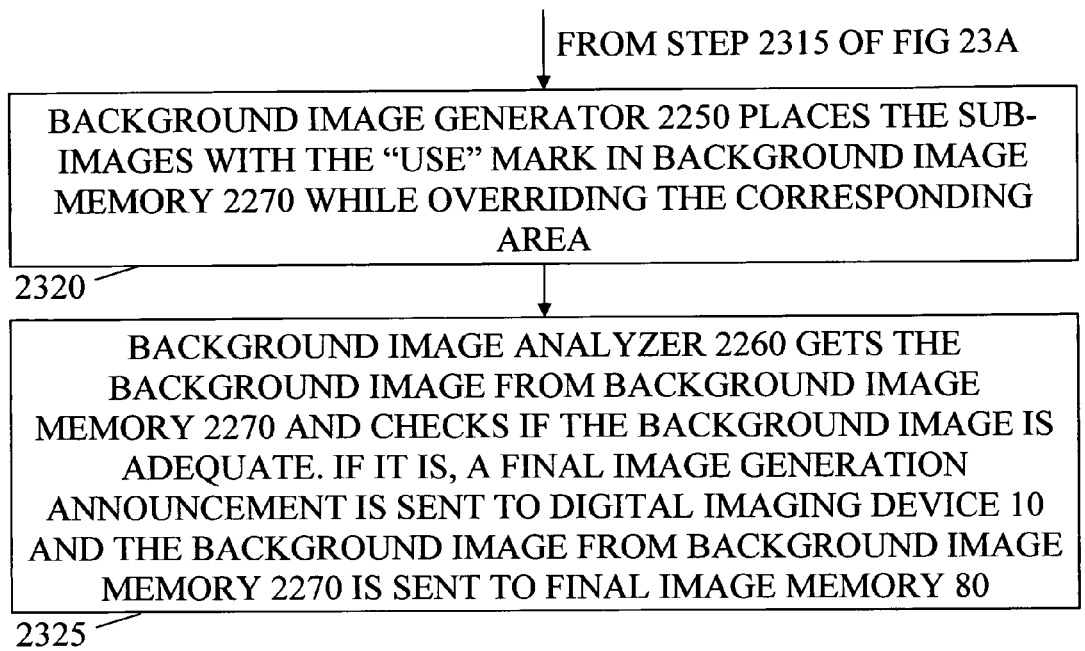

FIG. 22 is a simplified functional block diagram illustration of the background building analysis and control unit 340 of FIG. 3, constructed and operative in accordance with a preferred embodiment of the present invention. FIGS. 23A and 23B, taken together, form a simplified flowchart illustration of a preferred method of operation for the apparatus of FIG. 22. The aligner 2220, as described in step 2305 of FIG. 23A, may be operative in accordance with the principles of operation described above with reference to FIG. 9.

Background image creation may be based on the following steps:

a. For each portion of the scene, there is a list of candidates, i.e. sub-images to be considered for use as the background image of this portion. For example, in a scene portion having a lawn in the background and a moving red car in the foreground, candidates may include green sub-images (corresponding to moments in which the red car is not present), red sub-images (corresponding to moments in which the red car is present) and other sub-images containing a mixture of green and red (corresponding to moments in which the red car is either in a state of arrival or in a state of departure). Each candidate comprises a sub-image and related data.

b. The method first fills in the candidate list using the data in the input stream (from digital imaging device 10 of FIG. 3) and then selects the best candidate for each portion.

c. A candidate contains a sub-image that was extracted from an image in the scene portion.

d. For each candidate, the occurrence is computed, e.g. the number of images containing the sub-image similar to the candidate sub-image is counted. If the candidate has a high occurrence rate, it is more apt to be used in the background image for the corresponding portion.

e. Another test for each candidate is the fit to the surrounding background. If a candidate matches the background (its borders are similar to the tangent pixels in the background image) it is more apt to be used in the background image for the corresponding portion.

Alignment in step 2305 may be based on the methods described above with reference to FIG. 9. In step 2310, a sub-image may be a portion of the image, for example 8*8 pixels, the whole image or even only a single pixel. In a preferred embodiment, the sub-images are arranged as a grid. However, alternatively, sub-images may be arranged in any suitable arrangement which may or may not overlap. Regarding step 2310, according to a preferred embodiment, the sub-images are square. However, alternatively, they may be any shape and may comprise a set of connected or even unconnected pixels.

Regarding step 2300, the previous image memory need not store the previous image only but instead may store other previous images or a combined reference image to be used for the alignment process.

In step 2320, the background image generator need not use image placement but instead may be based on other methods, such as image averaging.

Figure 24:
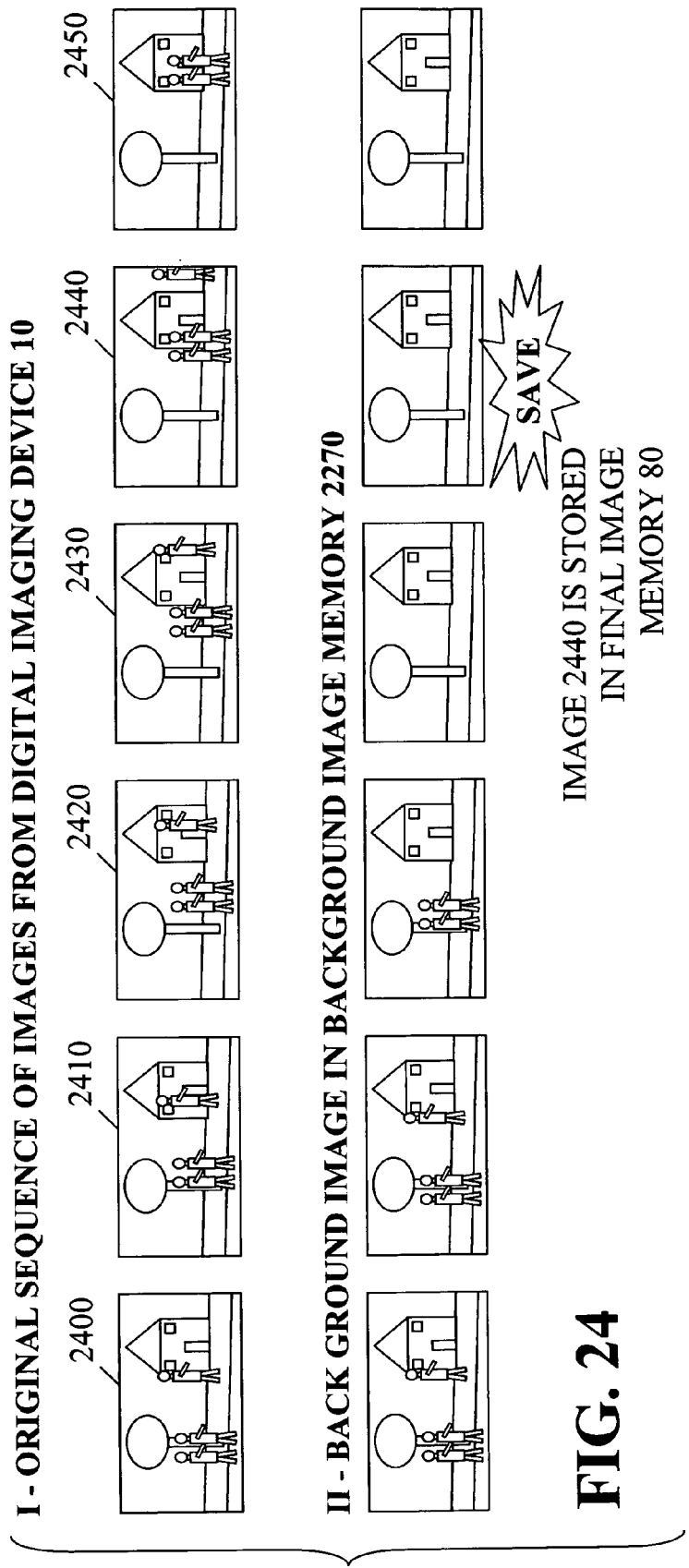
FIG. 24 is a pictorial and time-line diagram illustrating an example of the operation of the background building analysis and control unit 340 of FIG. 3, according to a preferred embodiment of the present invention.

FIG. 24 is a pictorial and time-line diagram illustrating an example of the operation of the background building analysis and control unit 340 of FIG. 3, according to a preferred embodiment of the present invention.

FIG. 24 describes background image building for a scene with a house, a road and a tree, while three moving persons obscure, at various times, various parts of the scene. A time-lined cartoon of the scene is shown in Row I, Row II shows the temporary background image in the background image memory 2270. As time goes on, the background image contains fewer and fewer moving objects until it eventually contains only the background scene. At image 2440, background image analyzer 2260 concludes that the background image is adequate and sends it to the final image memory 80 while sending a final image generation announcement to the digital imaging device 10.

Figure 25:
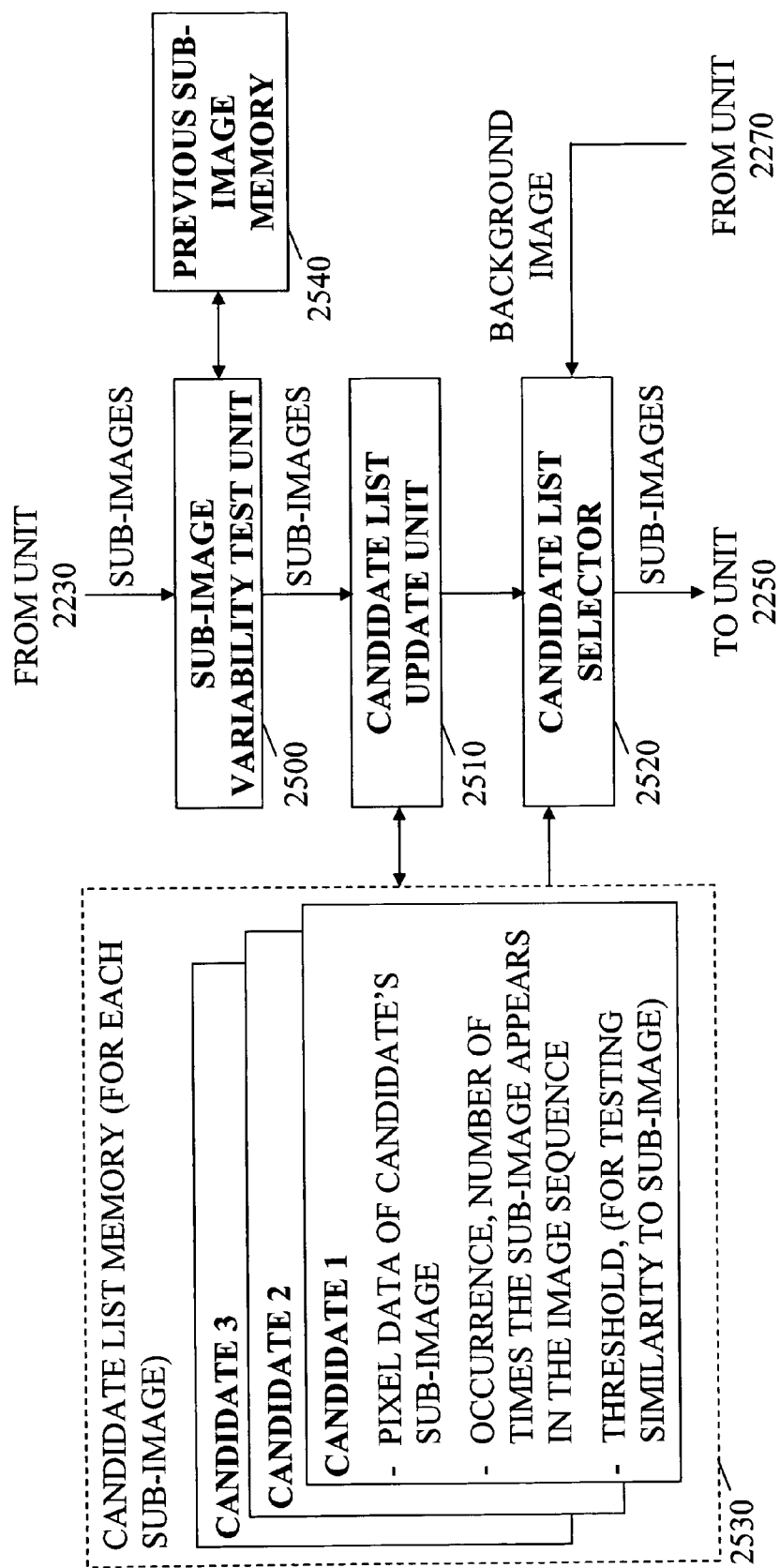
FIG. 25 is a simplified functional block diagram illustration of the sub-image analyzer 2240 of FIG. 22, constructed and operative in accordance with a preferred embodiment of the present invention.

FIG. 25 is a simplified functional block diagram illustration of the sub-image analyzer 2240 of FIG. 22, constructed and operative in accordance with a preferred embodiment of the present invention. In the current embodiment 3 candidates are assumed, by way of example, for each sub-image. It is appreciated that the number of candidates may be 2 to infinite.

Figure 26:
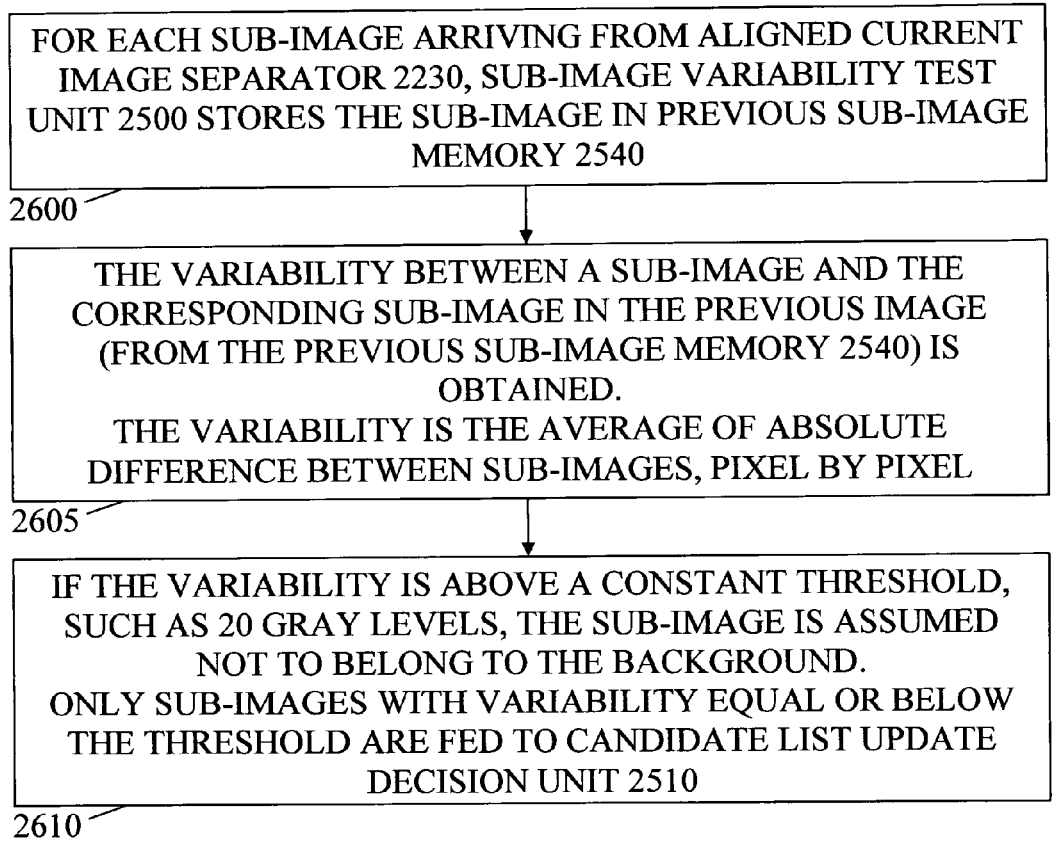
FIG. 26 forms a simplified flowchart illustration of a preferred method of operation for the apparatus of the sub-image variability test unit 2500 of FIG. 25.

FIG. 26 forms a simplified flowchart illustration of a preferred method of operation for the apparatus of the sub-image variability test unit 2500 of FIG. 25. Regarding step 2605, the variability need not use image differencing but instead may be based on other methods such as image flow or histogram difference. Regarding step 2605, the variability need not use operation on the raw data of the images but instead may apply filters, such as smoothing filter, or transforms, such as Fourier transform, on the images before computing the variability. Regarding step 2610, the threshold may not be constant but instead may be user configured or adaptive based on image content, such as proportional to the average of the variability difference for all sub-images.

Figure 27:
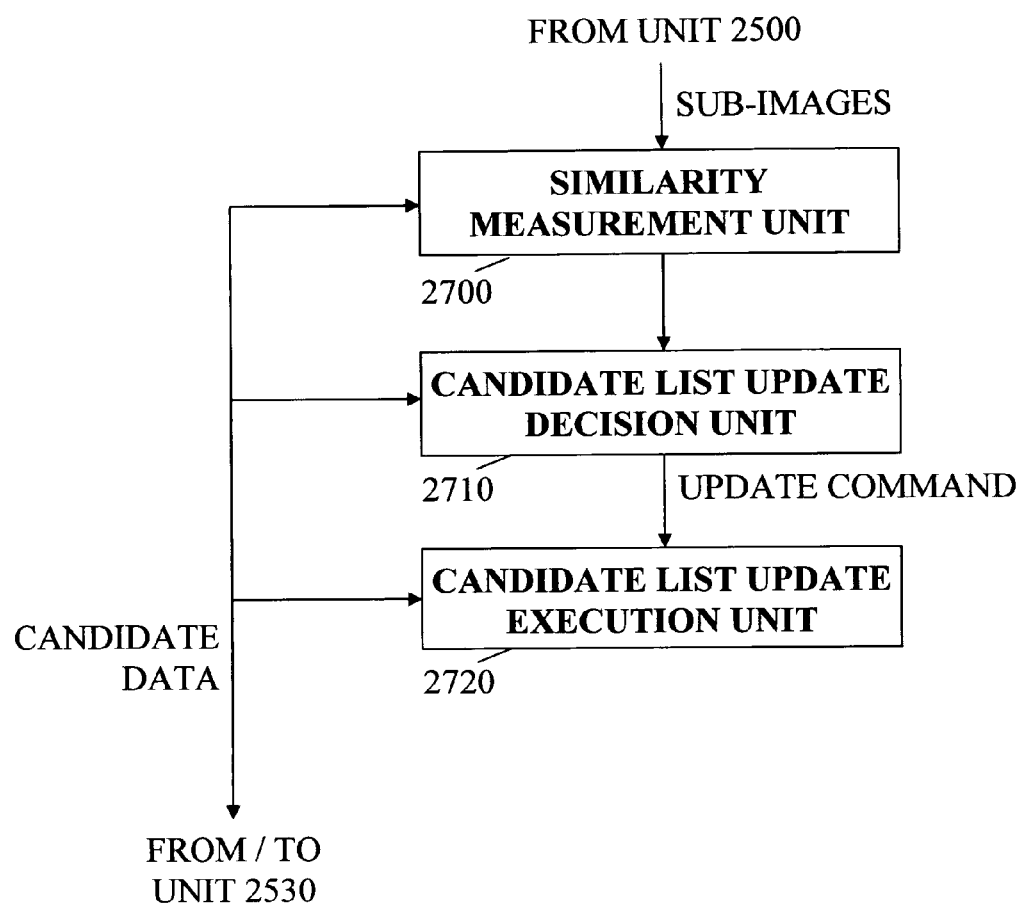
FIG. 27 is a simplified functional block diagram illustration of the candidate list update unit 2510 of FIG. 25, constructed and operative in accordance with a preferred embodiment of the present invention.

FIG. 27 is a simplified functional block diagram illustration of the candidate list update unit 2510 of FIG. 25, constructed and operative in accordance with a preferred embodiment of the present invention.

Figure 28:
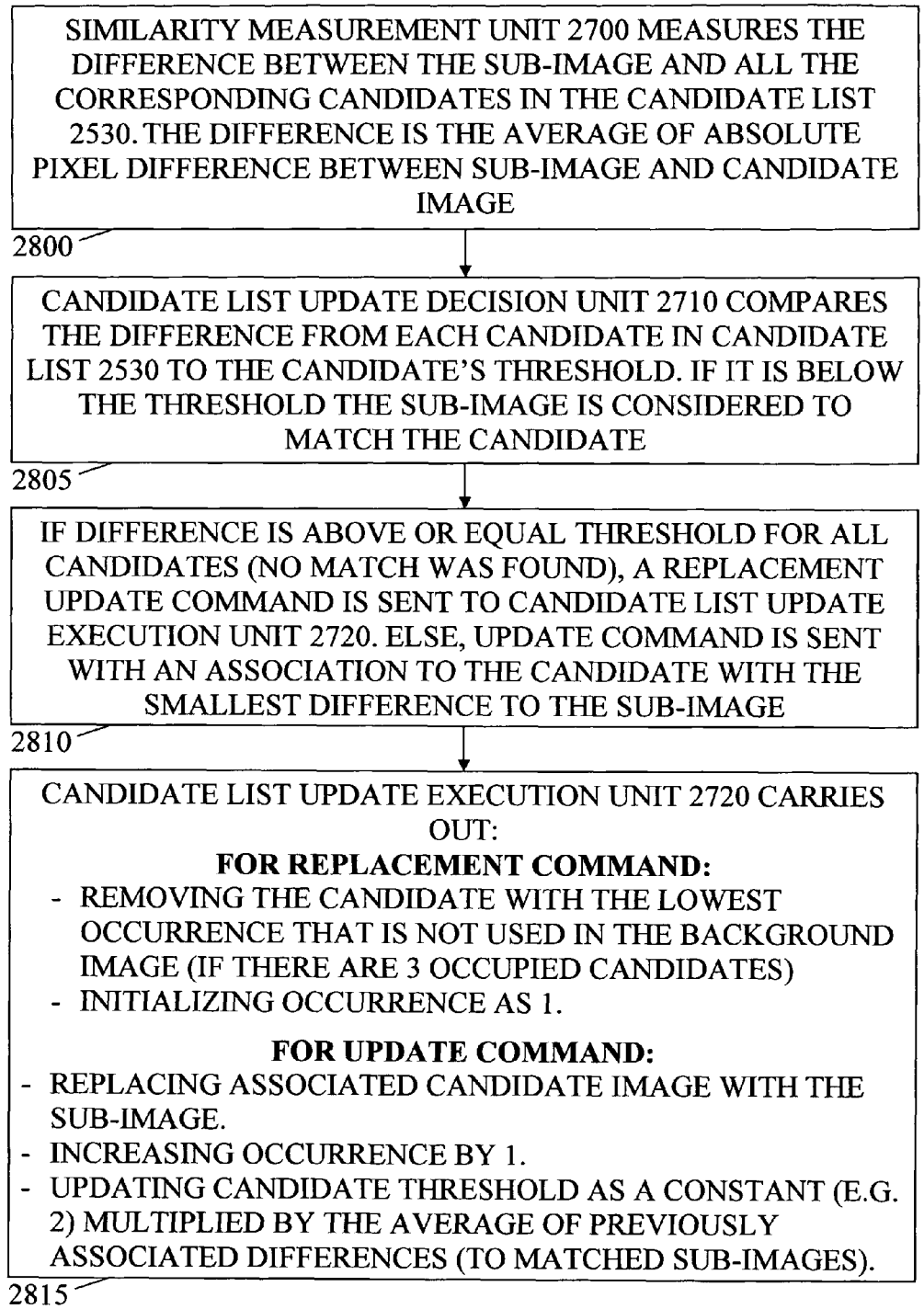
FIG. 28 forms a simplified flowchart illustration of a preferred method of operation for the apparatus of FIG. 27.

FIG. 28 forms a simplified flowchart illustration of a preferred method of operation for the apparatus of FIG. 27. Regarding step 2805, similarity need not be based on image differencing but instead may be based on other methods such as image flow or histogram difference. Regarding step 2805 similarity need not use an operation on the raw data of the images but instead may apply filters, such as a smoothing filter, or transforms, such as a Fourier transform, on the images before computing the similarity. Regarding step 2815, the threshold may not be proportional to the average of difference of previously match sub-images, but instead may be based on other parameters, such as the standard deviation of the difference. Also, the threshold may not be based on the difference of previously matched sub-images, but instead may be based on other methods, such as proportionality to the contrast of the sub-image.

Figure 29:
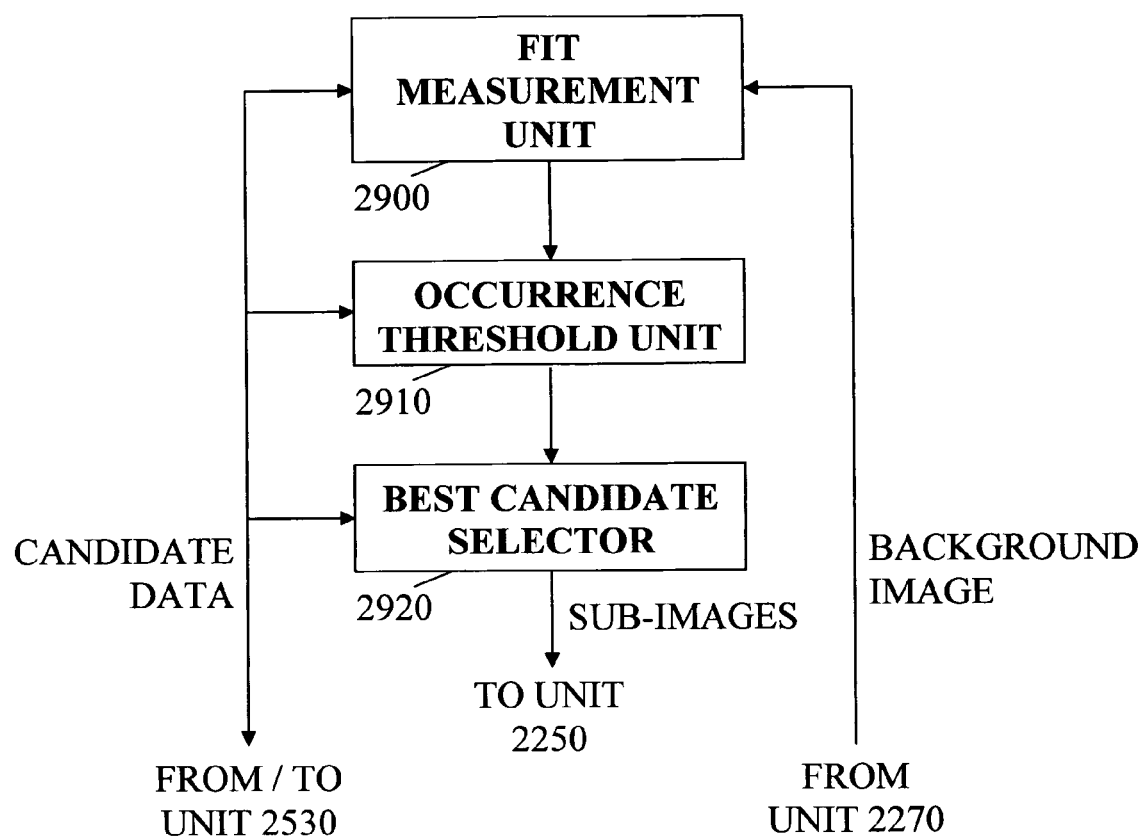
FIG. 29 is a simplified functional block diagram illustration of the candidate list selector 2520 of FIG. 25, constructed and operative in accordance with a preferred embodiment of the present invention.

FIG. 29 is a simplified functional block diagram illustration of the candidate list selector 2520 of FIG. 25, constructed and operative in accordance with a preferred embodiment of the present invention.

Figure 30:
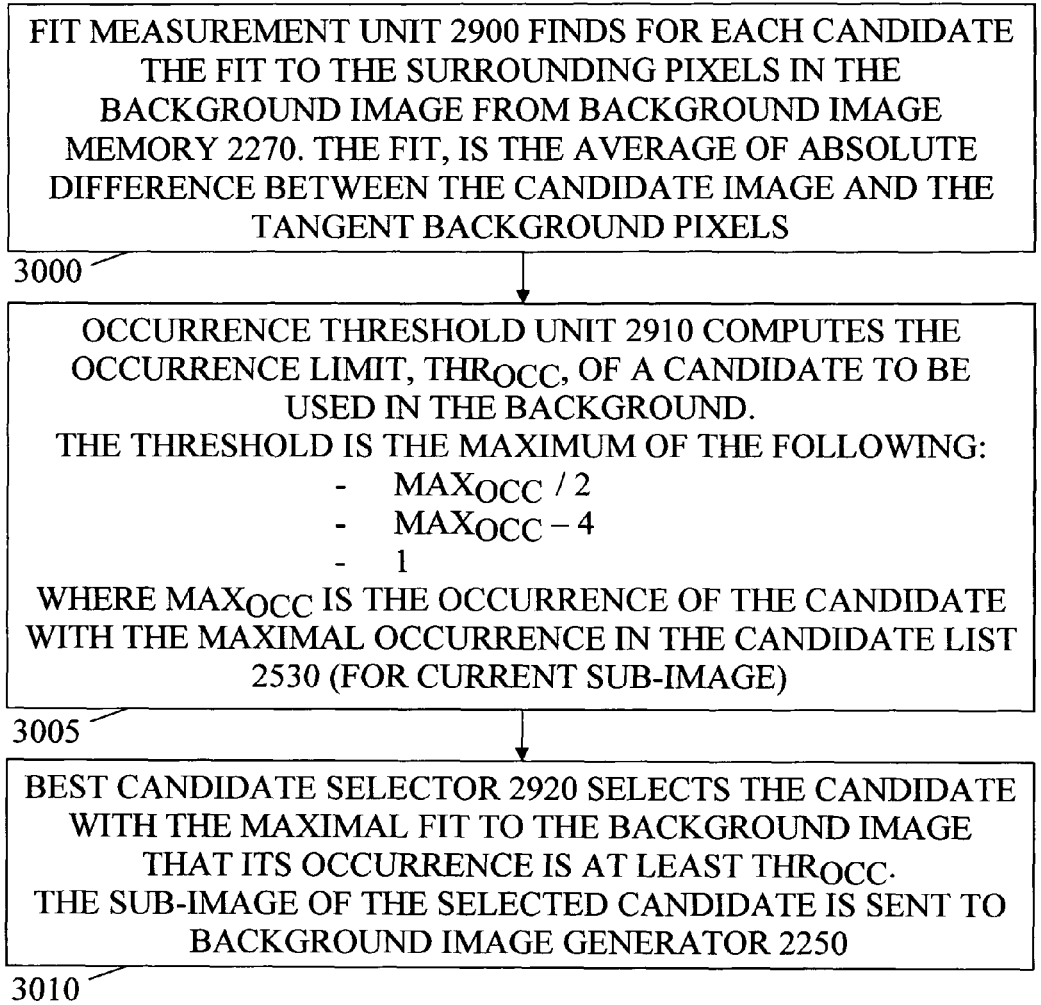
FIG. 30 forms a simplified flowchart illustration of a preferred method of operation for the apparatus of FIG. 29.

FIG. 30 forms a simplified flowchart illustration of a preferred method of operation for the apparatus of FIG. 29. Regarding step 3000, the fit need not use difference between tangent pixels, instead it may be based on other methods such as counting number of almost-same pixels between tangent pixels. In addition, a logical operation on the fit for the sub-image sides may be applied, such as computing the fit for each side separately, and taking the median of the fit values. Also, the fit may need not use only tangent pixels, instead it may use wider area, such as 3 pixels wide. Regarding step 3010, candidate selection may alternatively be based on other methods, such as taking the candidate with the maximal occurrence with a minimal fit, or scoring each candidate using its occurrence and its fit and selecting the candidate with the best score.

Figure 31:
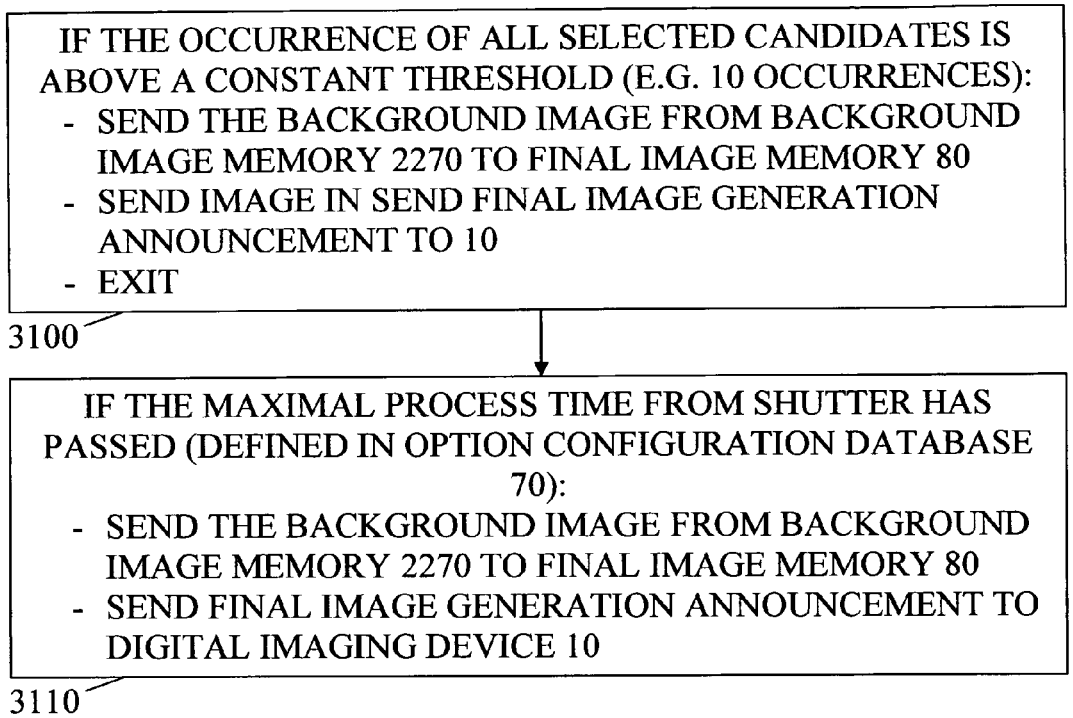
FIG. 31 is a simplified flowchart illustration of a preferred method of operation for the apparatus of the background image analyzer 2260 of FIG. 22.

FIG. 31 is a simplified flowchart illustration of a preferred method of operation for the apparatus of the background image analyzer 2260 of FIG. 22. Regarding step 3100, testing if the image is adequate need not be based on adequacy of all selected candidates. Instead, the criterion for image adequacy may be that a predetermined percentage, e.g. 95%, of its portions are adequate. Regarding step 3100, testing if the image is adequate need not use occurrence only, instead it may be based on the candidate fit in addition to or instead the occurrence.

Figure 32:
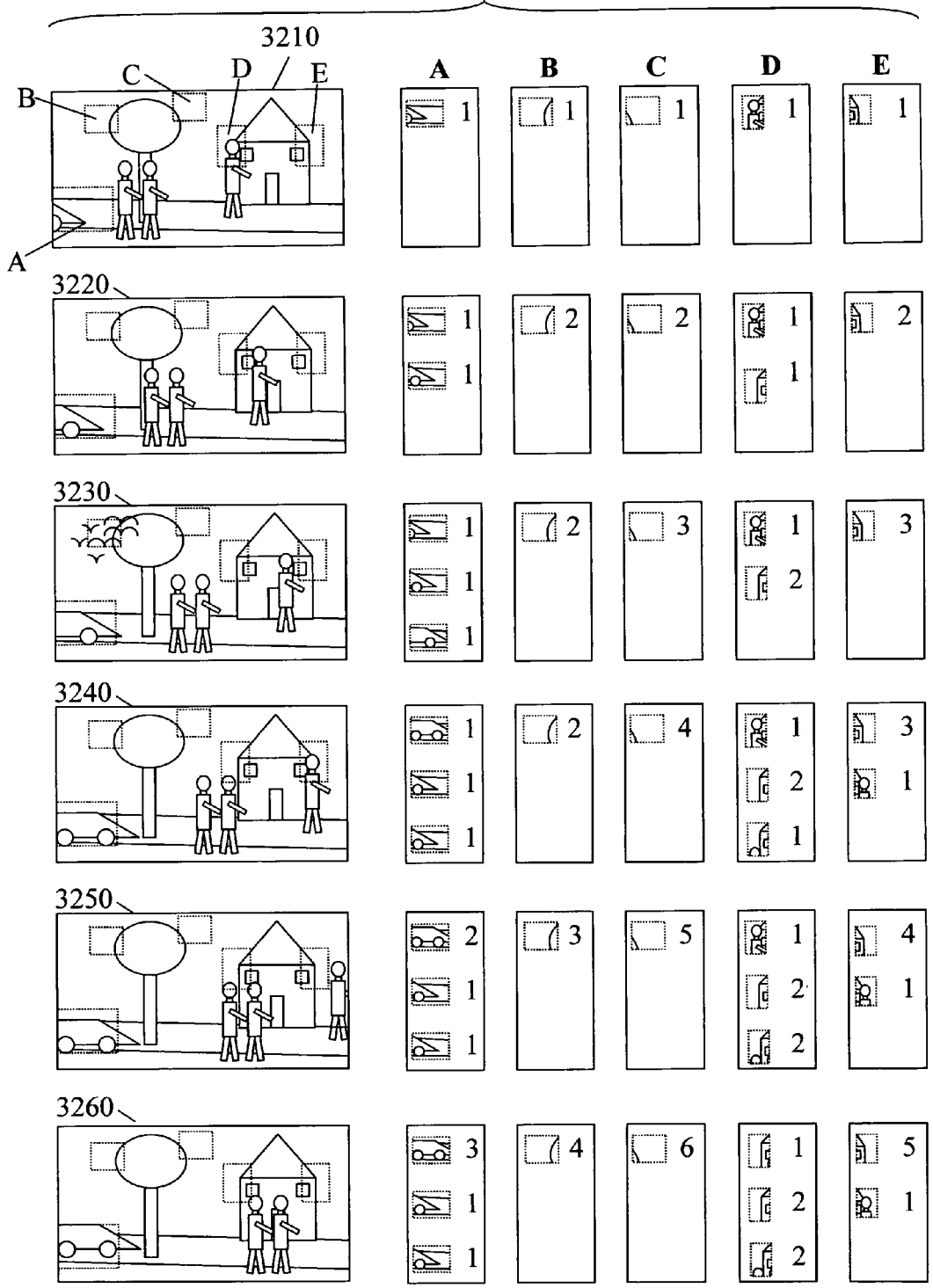
FIG. 32 is a cartoon illustration of an example of an urban scene in which three persons are strolling by, obstructing the scenic background.

FIG. 32 is a cartoon illustration of an example of an urban scene in which three persons are strolling by, obstructing the scenic background. A moving vehicle and a passing flock of birds also obstruct the background. In this cartoon image, an example computation of the extent of occurrence of various portions of the scene is demonstrated. Dotted lines delimit five example portions A, B, C, D and E from among a grid or other plurality of such portions or sub-images, which covers the image.

The column labeled A, in FIG. 32, depicts a portion of the candidate list associated with sub-image A and comprising candidates occurring within sub-image A. Similarly, the columns labeled B-E depict portions of the candidate list associated with sub-images B-E respectively.

Portions A-E are characterized as follows:

Portion A: In this portion a car enters the scene. The car brakes in image 3240 and then remains stationary.

In the first image, 3210, the sub-image enters the candidate list, since the candidate list is empty. The occurrence of the candidate is 1, since it appeared only one time (current time).

In the next image, 3220, the sub-image is different than the candidate (difference is larger than threshold in step 2805). Therefore, the new candidate is initialized at step 2815.

The same is carried out for the next image 3230. Now there are 3 candidates.

At the next image, 3240, one more candidate needs to be initialized. However, since there are already 3 candidates, one of them is removed to allow the new candidate. Once a sub-image has been placed in the background image it is typically not removed, even if it has the lowest occurrence.

At image 3250, the sub-image A' of the scene is same as the top candidate. Therefore, the occurrence is incremented by 1.

At image 3260, the same is carried out as in image 3250. The occurrence for the top candidate is incremented to 3.

Portion B: In this portion there is a part of a tree, whereas in image 3230, there is a flock of birds.

Image 3210: At the first image, 3210, the sub-image enters the candidate list, since the candidate list is empty. The occurrence of the candidate is 1, since it appeared only one time (current time).

Image 3220: Occurrence is incremented to 2 since the sub-image is similar to the first candidate.

Image 3230: Since there is a large variability (step 2610), the sub-image does not update the candidate list. The occurrence remains 2.

Image 3240: same as 3230.

Image 3250 and 3260. Same as 3220, the occurrence being incremented to 3 and 4, respectively.

Portion C: In this portion there is always a top-left part of the tree. For all images the occurrence is incremented by 1.

Portion D: In this portion there is part of the house, which people sometimes pass by and obscure.

Image 3210: At the first image, 3210, the sub-image enters the candidate list, since the candidate list is empty. The occurrence of the candidate is 1, since it appeared only one time (current time).

At the next image, 3220, the sub-image is different than the candidate (difference is larger than threshold in step 2805). Therefore, the new candidate is initialized at step 2815.

At the next sub-image, 3230, the sub-image is same as the second candidate, therefore, its occurrence is increased by 1.

At the next image, 3240, the sub-image is different than all the candidates (difference is larger than threshold in step 2805). Therefore, the new candidate (third one) is initialized at step 2815.

At the next sub-image, 3250, the sub-image is same as the third candidate, therefore, its occurrence is increased by 1. Now there are 2 candidates with 2 occurrences.

At the next image, 3260, the sub-image is different than all the candidates (difference is larger than threshold in step 2805). Therefore, the top candidate (with the lowest occurrence) is removed, and new candidate (top) is initialized at step 2815.

Portion E: In this portion there is another part of the house where one people passed in front of. The occurrence is incremented by 1 each image, except for image 3240. In this image the sub-image is different than the candidate, and a new candidate is initialized.

FIG. 33 is a pictorial and time-line diagram illustrating an example of the operation of the noise reduction analysis and control unit 350 of FIG. 3, according to a preferred embodiment of the present invention. In a conventional photography process using a long shutter, the noise is reduced but the image is smeared due to camera motion and subject motion. A preferred embodiment of the present invention resolves this problem.

Figure 34:
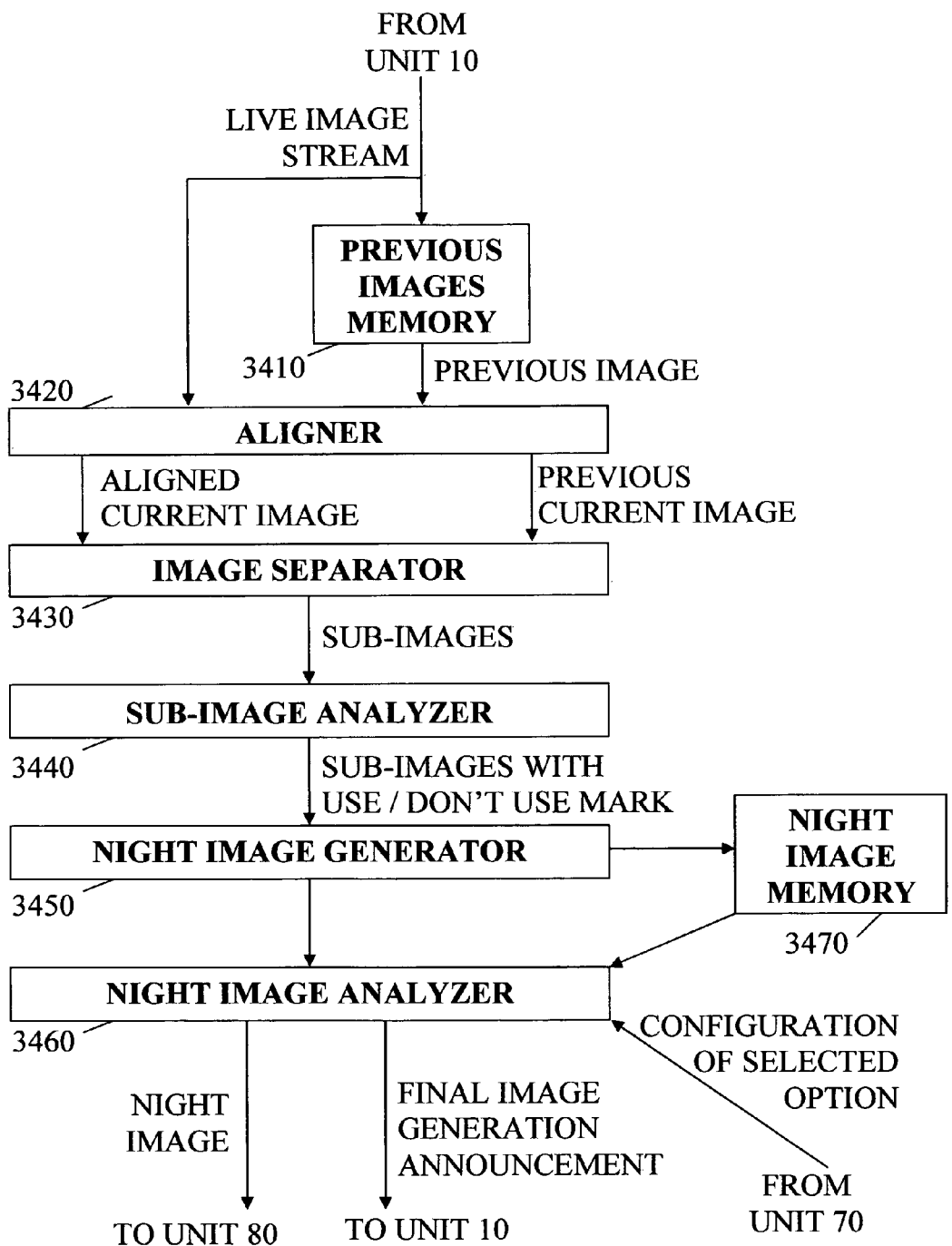
FIG. 34 is a simplified functional block diagram illustration of the noise reduction analysis and control unit 350 of FIG. 3, constructed and operative in accordance with a preferred embodiment of the present invention.

FIG. 34 is a simplified functional block diagram illustration of the noise reduction analysis and control unit 350 of FIG. 3, constructed and operative in accordance with a preferred embodiment of the present invention;

Regarding the aligner (unit 3420), the methods described above with reference to FIG. 9 may be employed.

Figure 35A:
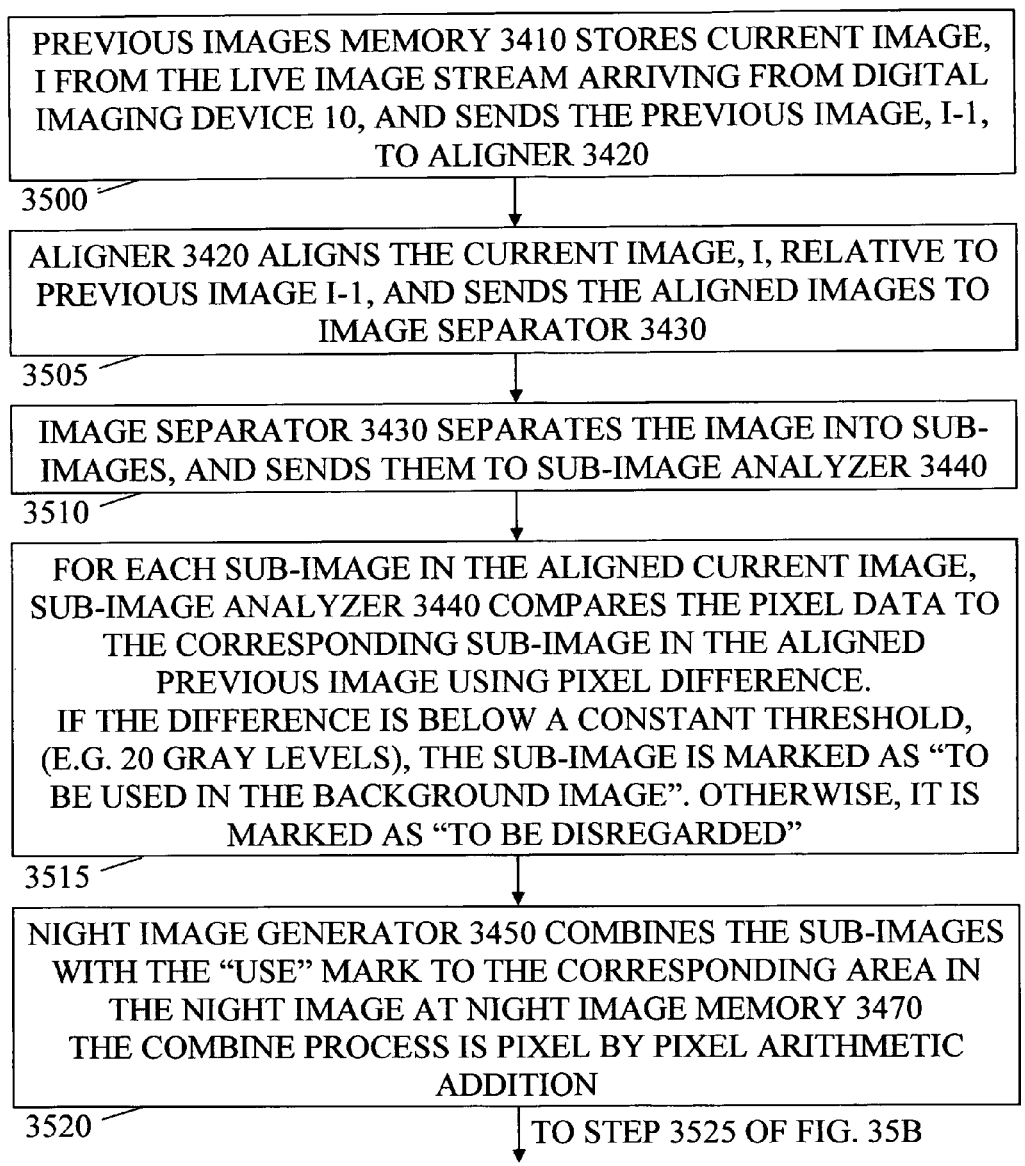
FIGS. 35A and 35B, taken together, form a simplified flowchart illustration of a preferred method of operation for the apparatus of FIG. 34.
Figure 35B:
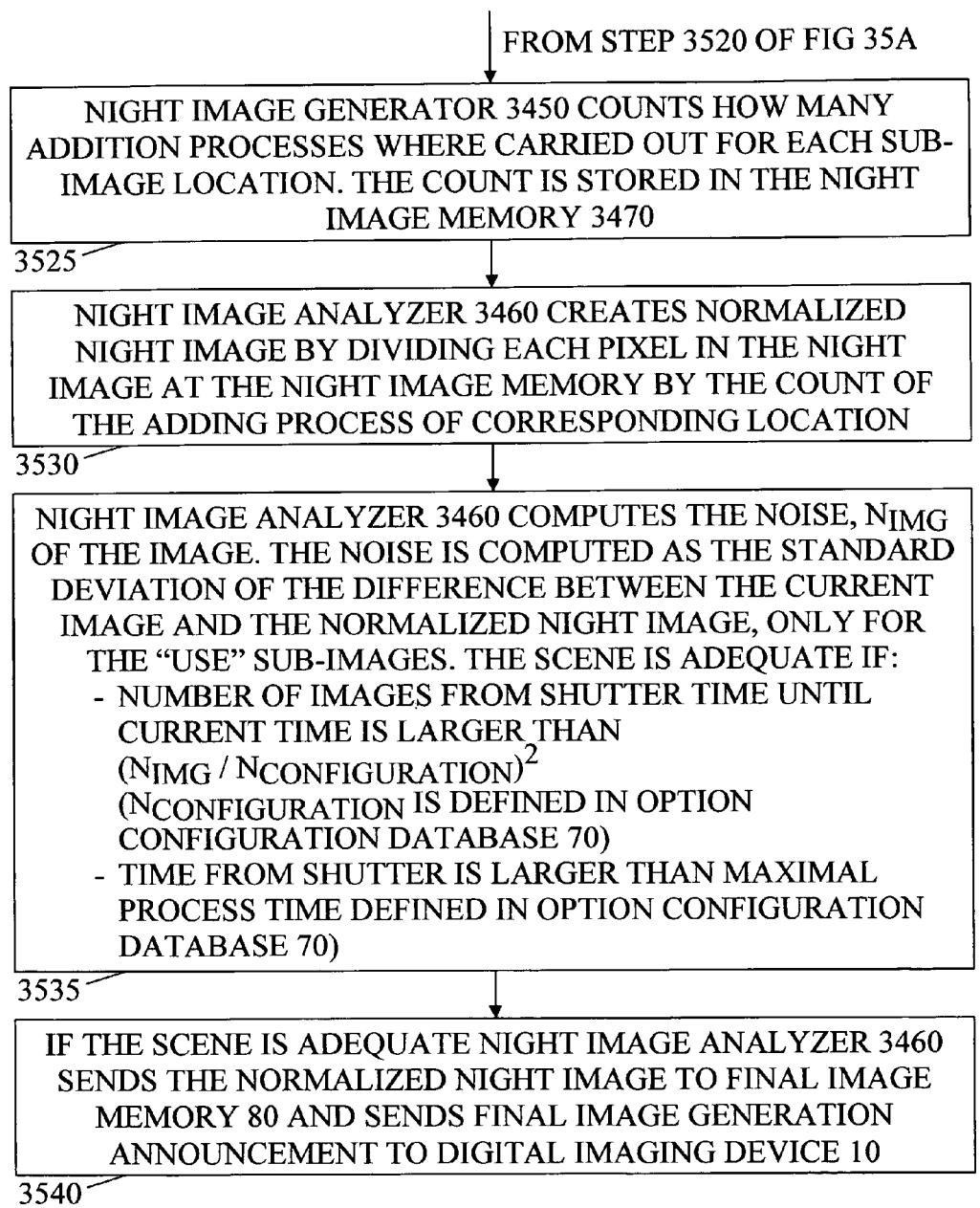

FIGS. 35A and 35B, taken together, form a simplified flowchart illustration of a preferred method of operation for the apparatus of FIG. 34.

Regarding step 3505, this step may perform alignment which may be based on the registration methods described in "Image Registration Methods: A Survey", Barbara Zitova, Jan Flusser, Imaging and Vision Computing 21 (2003), pp. 977-1000 and publications referenced therein. All of the above publications are hereby incorporated by reference.

Regarding separation step 3510, the methods described above with reference to FIG. 23 are one suitable implementation for this step.

Regarding step 3515, it is appreciated that the "used" or "disregarded" marks need not be assigned using difference between image and previous image and instead may use other methods such as image flow or histogram difference, "Used" or "disregarded" marks need not be assigned using the raw data of the images but instead may apply filters, such as smoothing filter, or transforms, such as Fourier transform, on the images before comparing. It is appreciated also that the "Used" or "disregarded" marks need not be assigned using the difference image but instead it may use the current night image in the night image memory 3470.

Regarding step 3515, the threshold may not be constant but instead may be user configured or adaptive based on image content, such as proportional to the average of the difference for all sub-images. Regarding step 3535, testing if the scene is adequate need not be as above but instead may be based on any other desired criteria.

Figure 36:
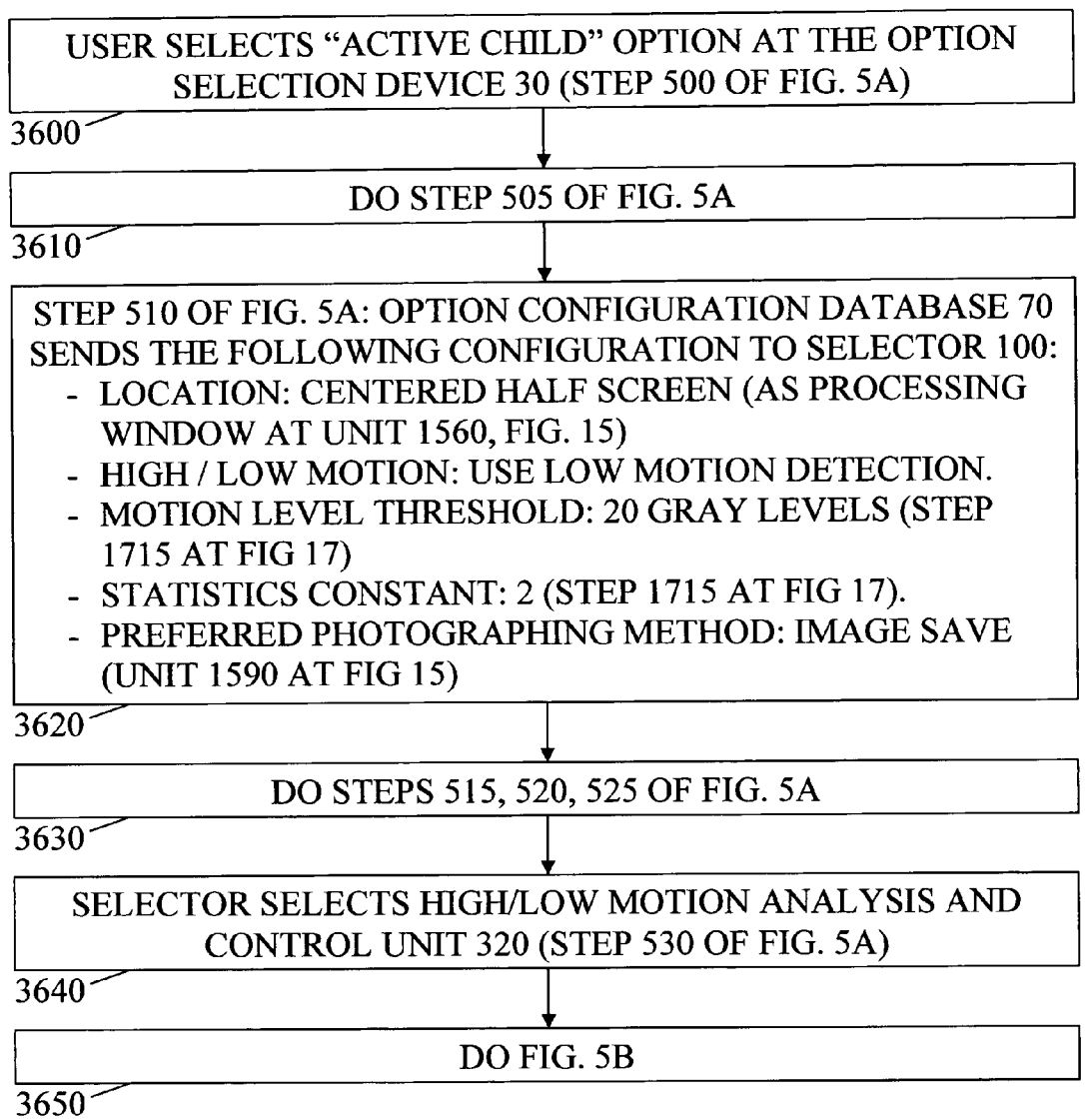
FIG. 36 is a simplified flowchart illustration of a preferred method of operation for the apparatus of FIG. 3 when photographing in "active child" mode.

FIG. 36 is a simplified flowchart illustration of a preferred method of operation for the apparatus of FIG. 3 when photographing in "active child" mode.

Figure 37:
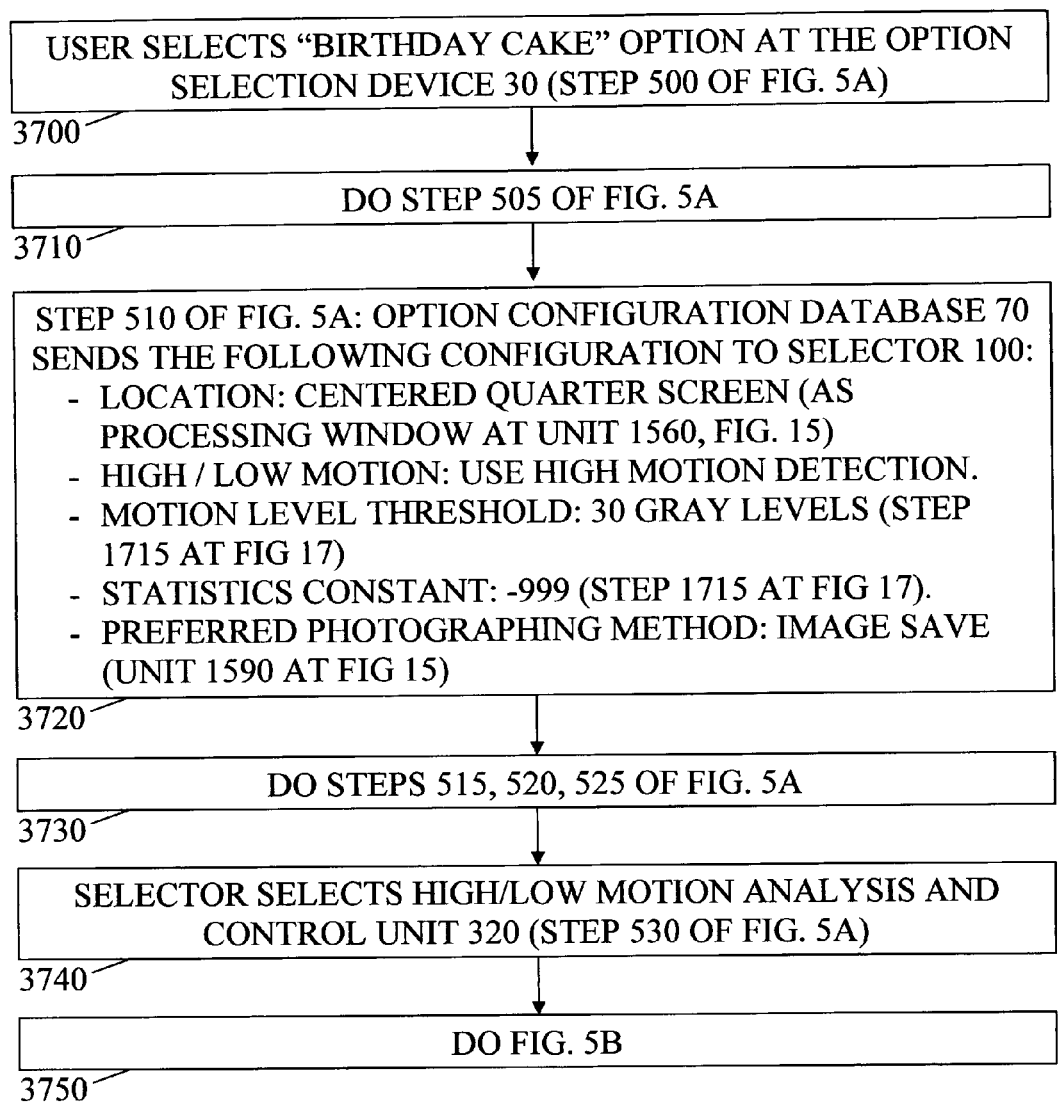
FIG. 37 is a simplified flowchart illustration of a preferred method of operation for the apparatus of FIG. 3 when photographing in "birthday cake" mode.

FIG. 37 is a simplified flowchart illustration of a preferred method of operation for the apparatus of FIG. 3 when photographing in "birthday cake" mode.

Figure 38:
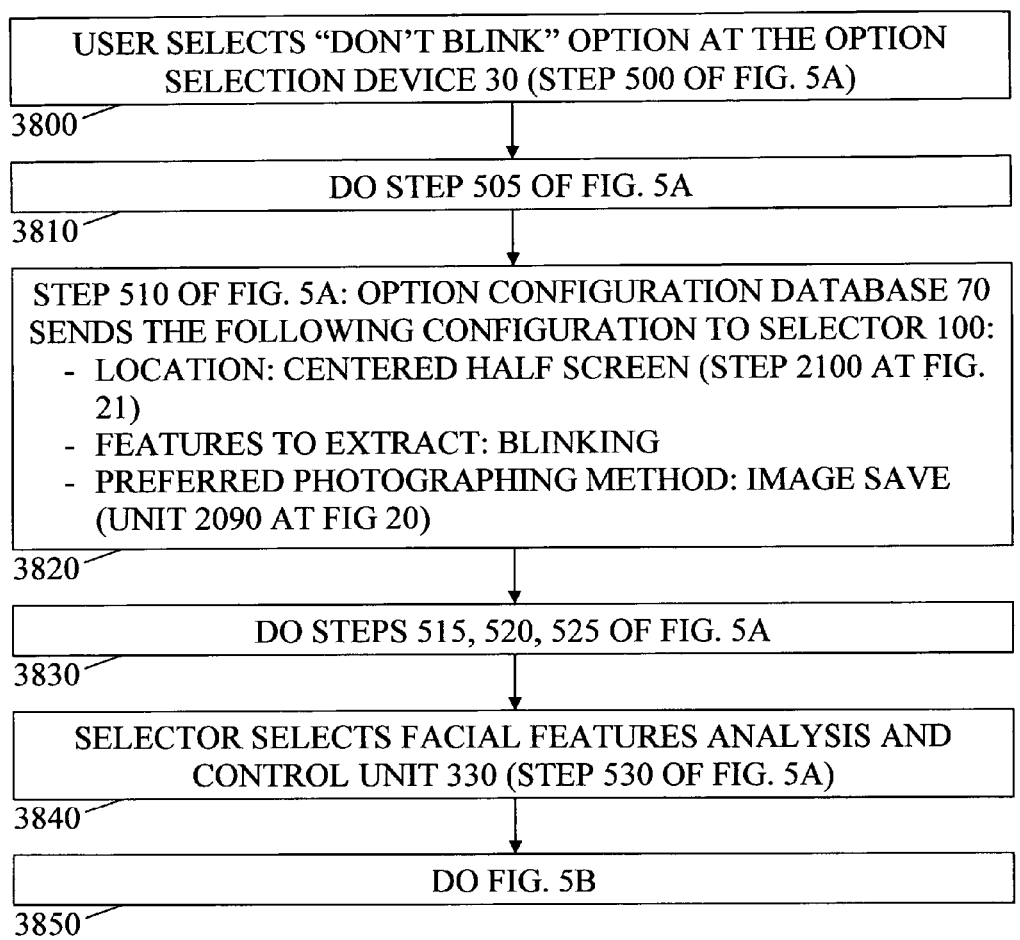
FIG. 38 is a simplified flowchart illustration of a preferred method of operation for the apparatus of FIG. 3 when photographing in "don't blink" mode.

FIG. 38 is a simplified flowchart illustration of a preferred method of operation for the apparatus of FIG. 3 when photographing in "don't blink" mode.

Figure 39:
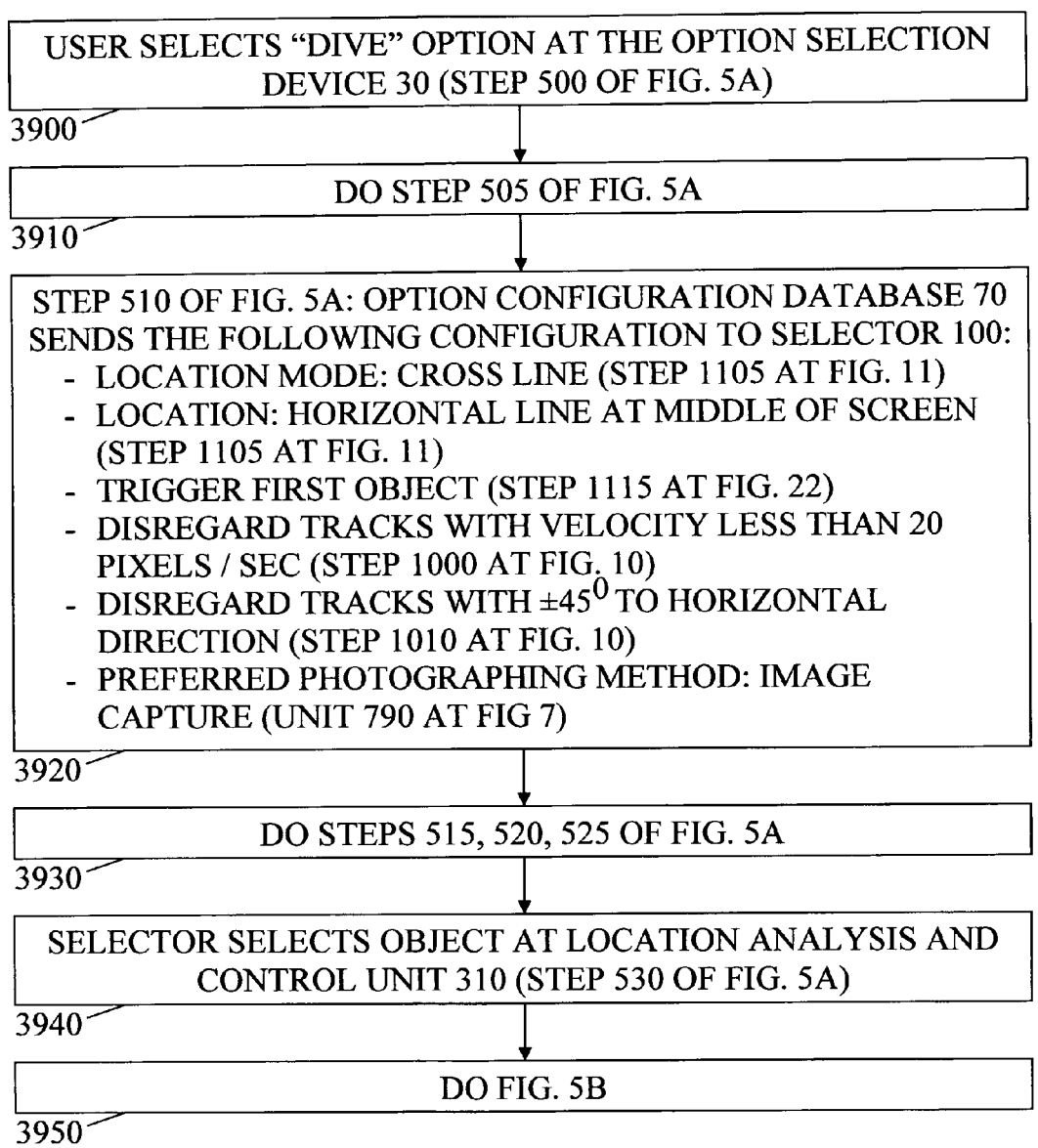
FIG. 39 is a simplified flowchart illustration of a preferred method of operation for the apparatus of FIG. 3 when photographing in "dive" mode.

FIG. 39 is a simplified flowchart illustration of a preferred method of operation for the apparatus of FIG. 3 when photographing in "dive" mode.

Figure 40:
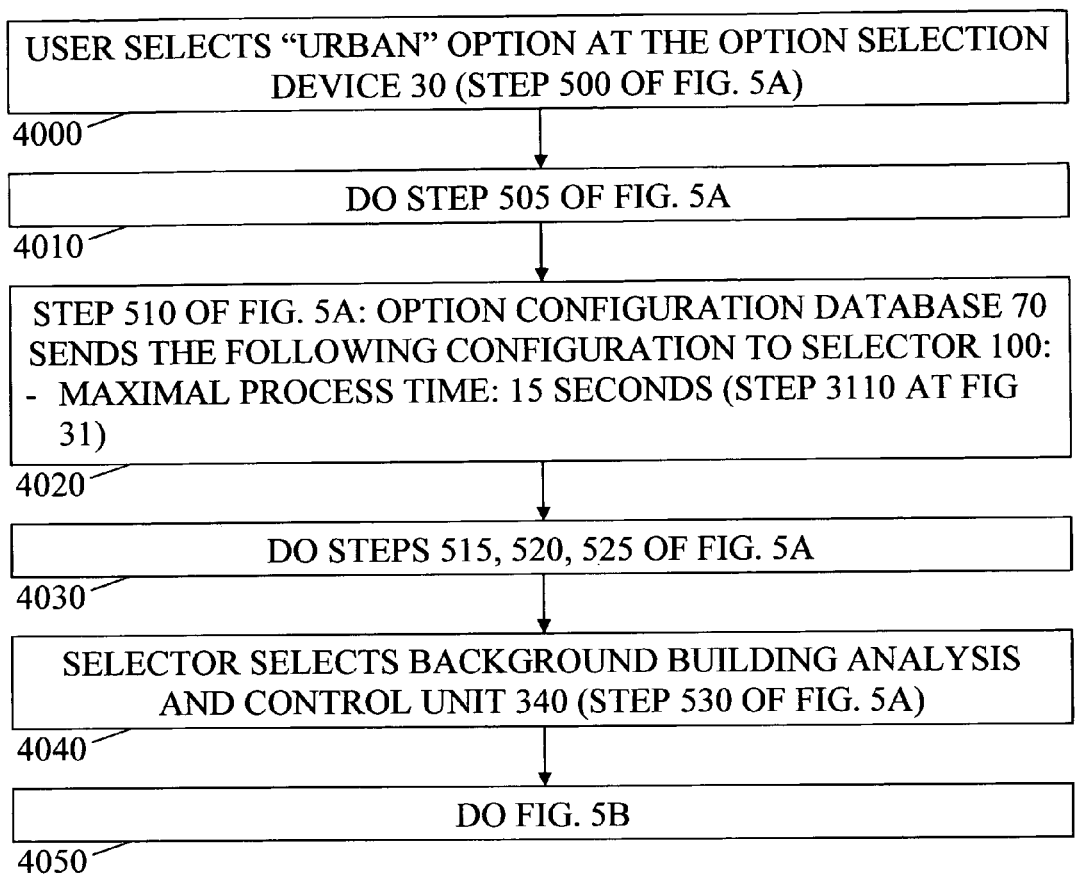
FIG. 40 is a simplified flowchart illustration of a preferred method of operation for the apparatus of FIG. 3 when photographing in "urban" mode.

FIG. 40 is a simplified flowchart illustration of a preferred method of operation for the apparatus of FIG. 3 when photographing in "urban" mode.

Figure 41:
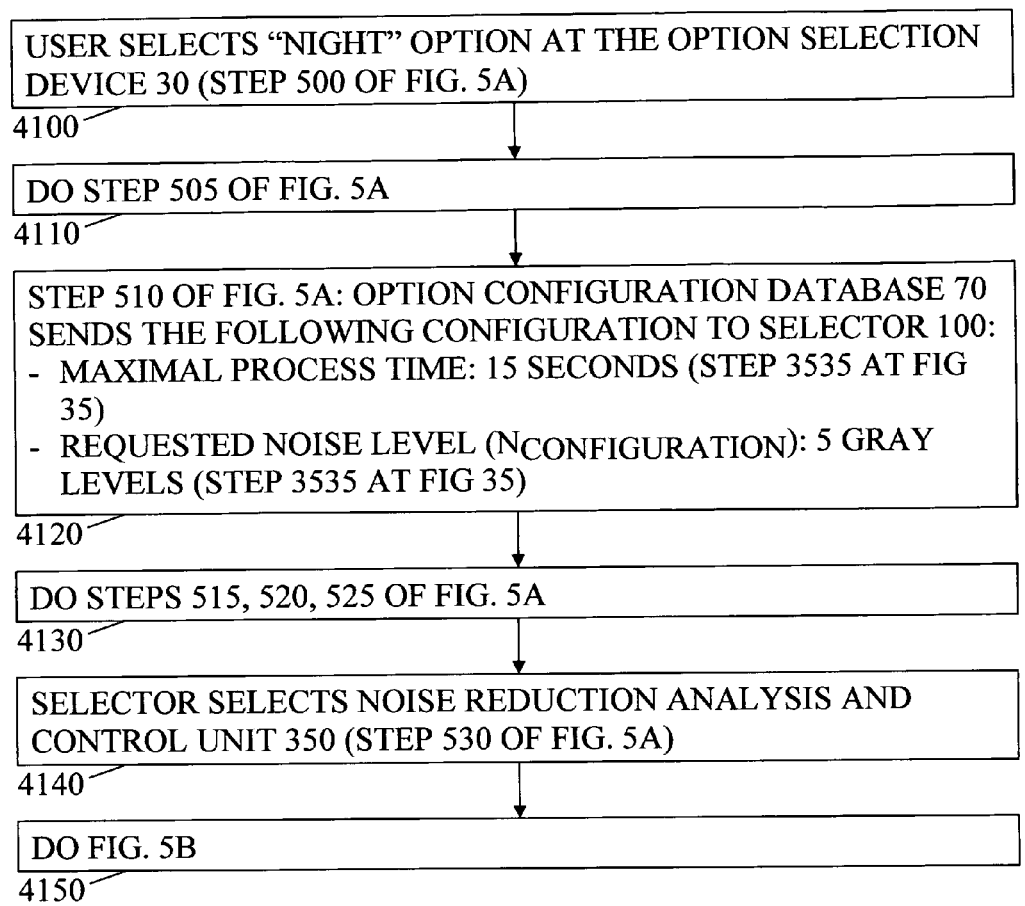
FIG. 41 is a simplified flowchart illustration of a preferred method of operation for the apparatus of FIG. 3 when photographing in "night" mode.

FIG. 41 is a simplified flowchart illustration of a preferred method of operation for the apparatus of FIG. 3 when photographing in "night" mode.

Figure 42:
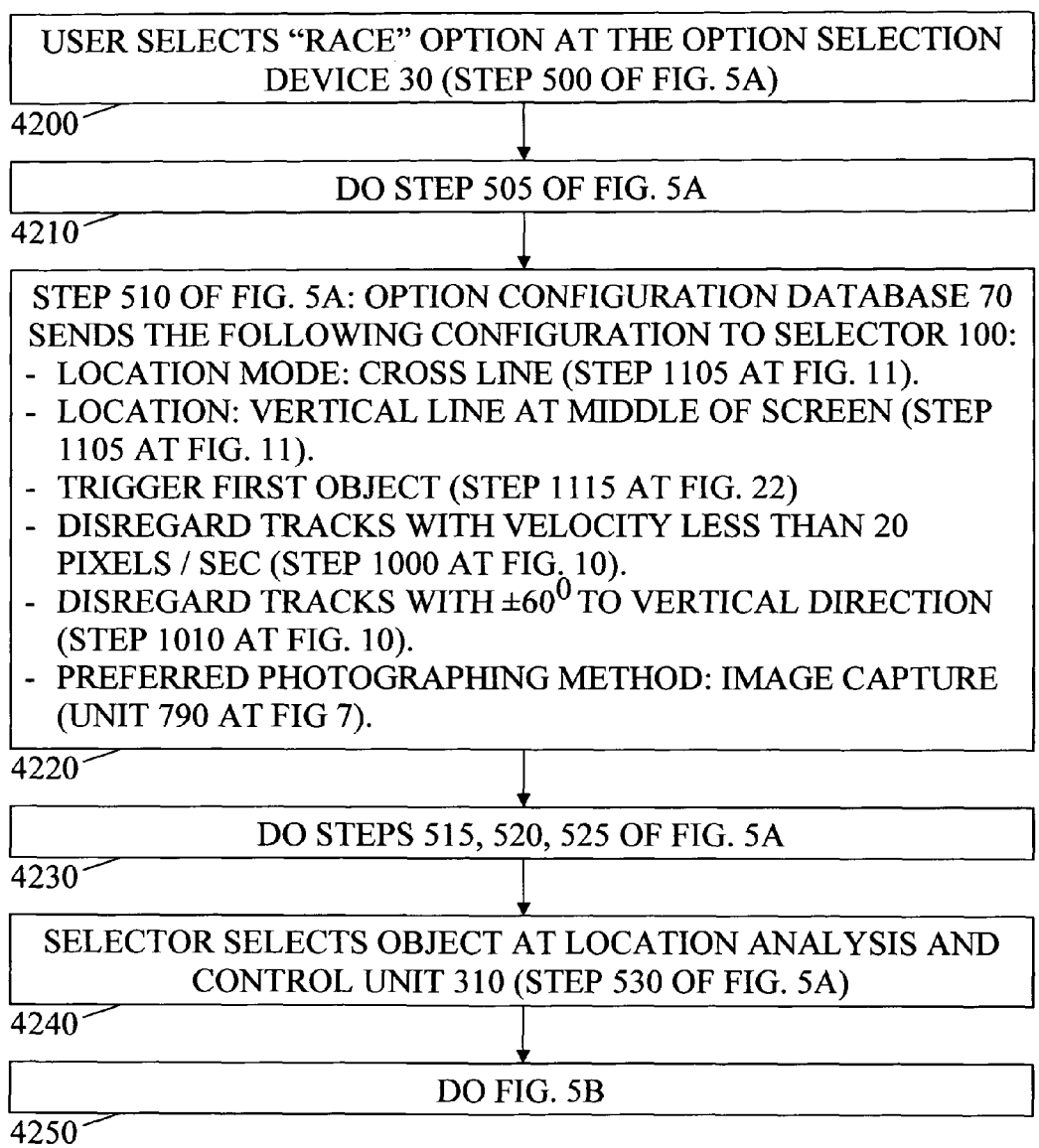
FIG. 42 is a simplified flowchart illustration of a preferred method of operation for the apparatus of FIG. 3 when photographing in "race" mode.

FIG. 42 is a simplified flowchart illustration of a preferred method of operation for the apparatus of FIG. 3 when photographing in "race" mode.

Figure 43:
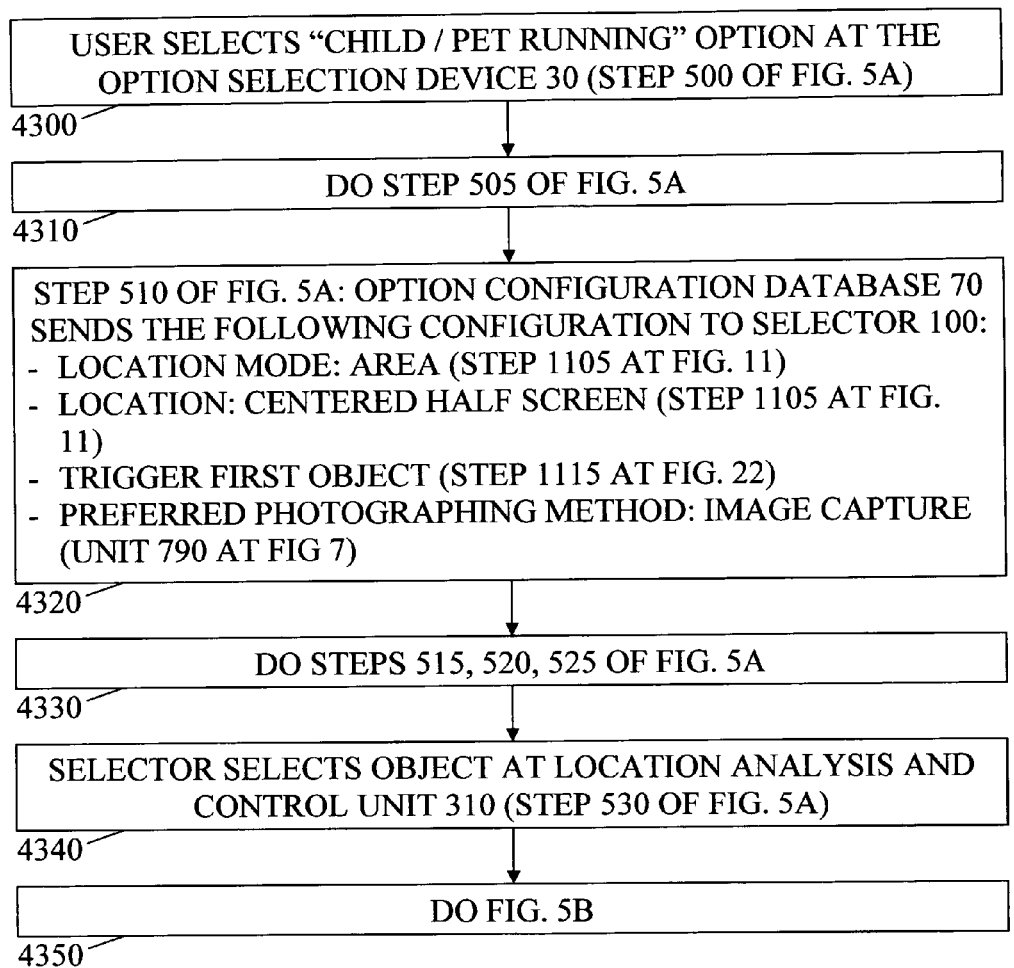
FIG. 43 is a simplified flowchart illustration of a preferred method of operation for the apparatus of FIG. 3 when photographing in "child/pet running" mode.

FIG. 43 is a simplified flowchart illustration of a preferred method of operation for the apparatus of FIG. 3 when photographing in "child/pet running" mode.

Figure 44:
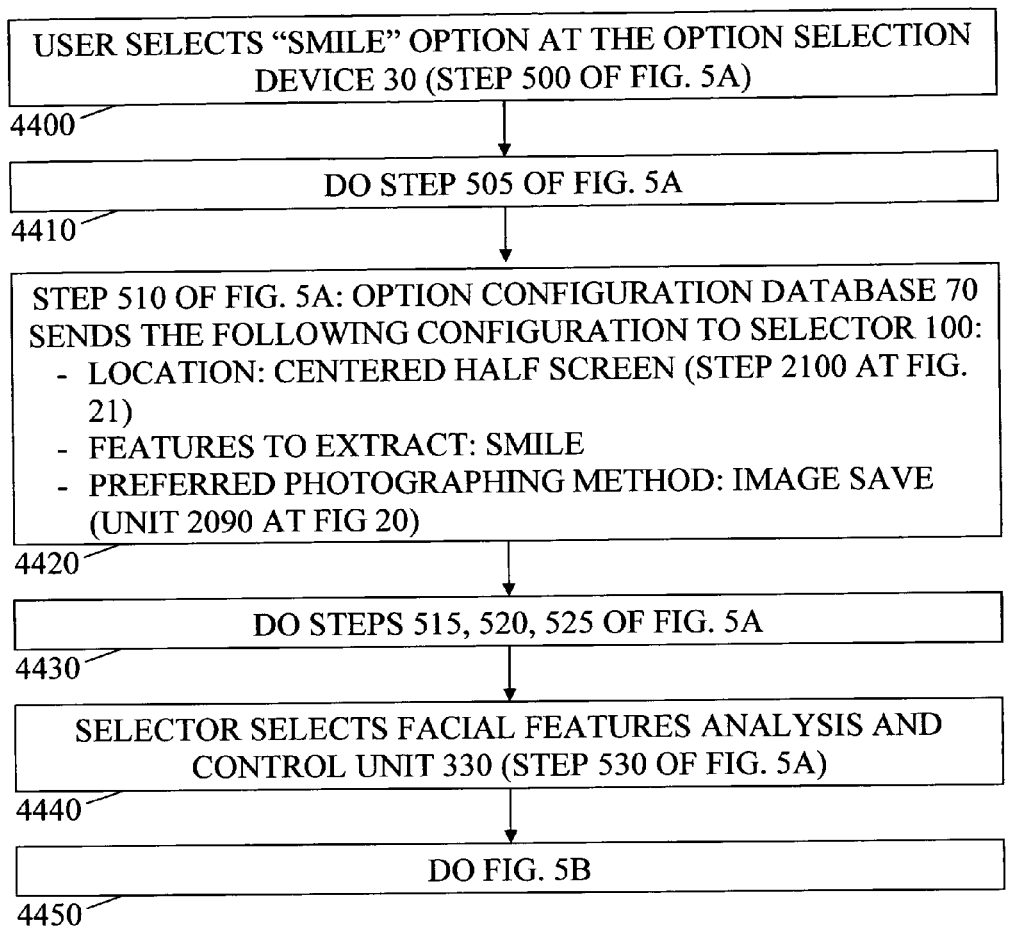
FIG. 44 is a simplified flowchart illustration of a preferred method of operation for the apparatus of FIG. 3 when photographing in "smile" mode.

FIG. 44 is a simplified flowchart illustration of a preferred method of operation for the apparatus of FIG. 3 when photographing in "smile" mode.

Figure 45:
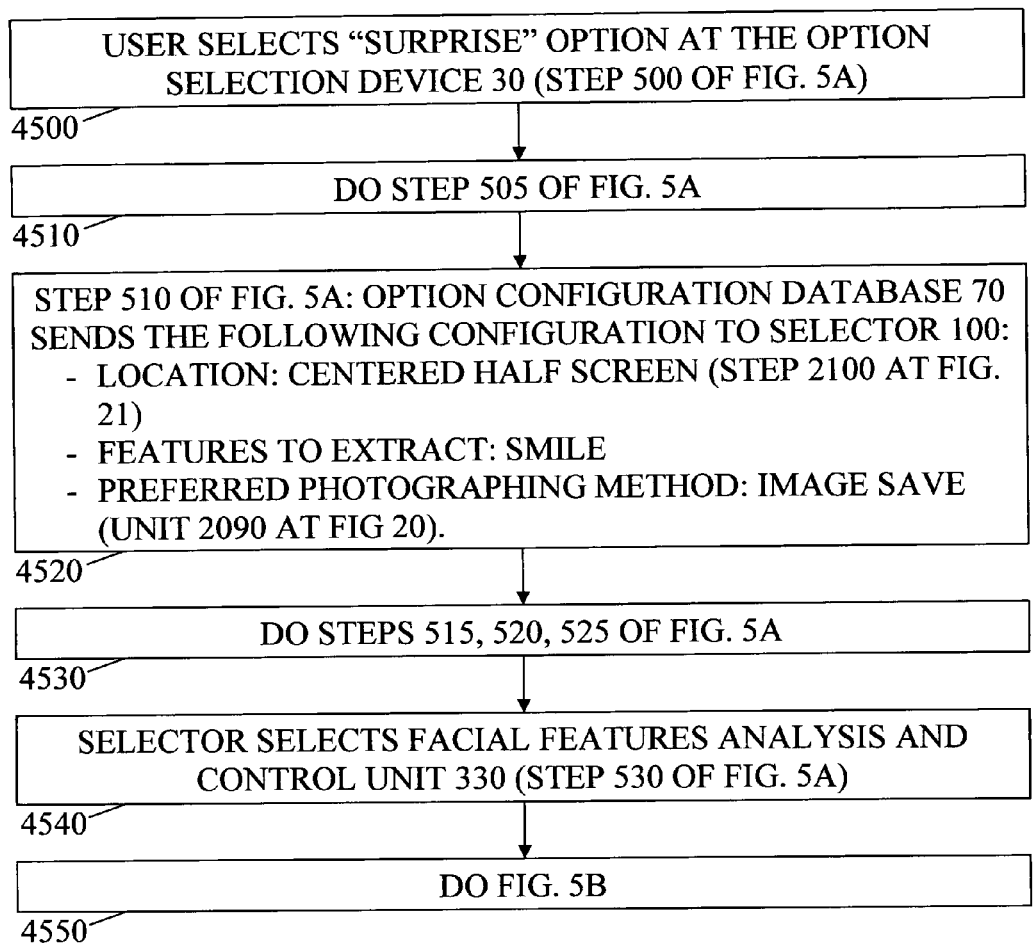
FIG. 45 is a simplified flowchart illustration of a preferred method of operation for the apparatus of FIG. 3 when photographing in "surprise" mode.

FIG. 45 is a simplified flowchart illustration of a preferred method of operation for the apparatus of FIG. 3 when photographing in "surprise" mode.

Figure 46A:
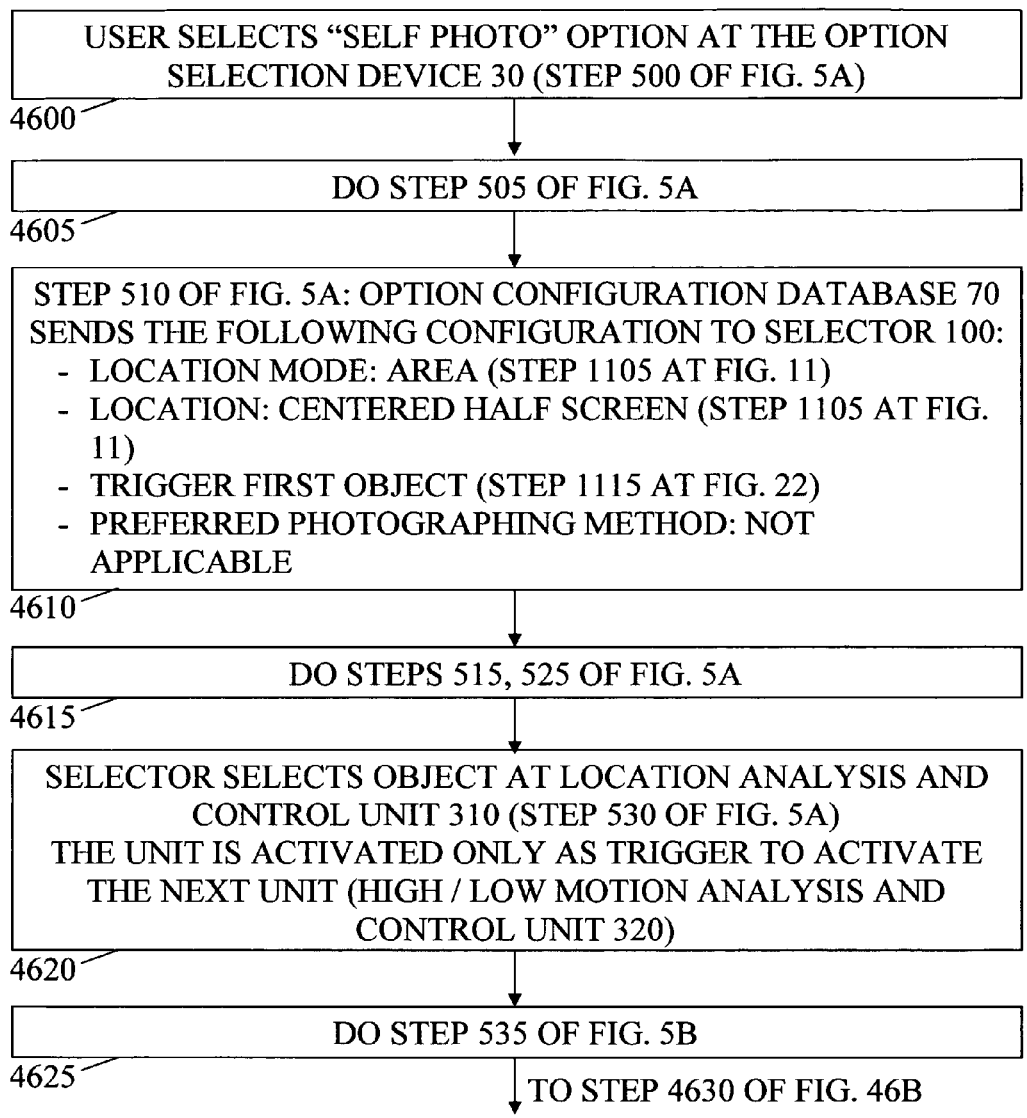
FIGS. 46A-46B, taken together, form a simplified flowchart illustration of a preferred method of operation for the apparatus of FIG. 3 when photographing in "self-photo" mode.
Figure 46B:
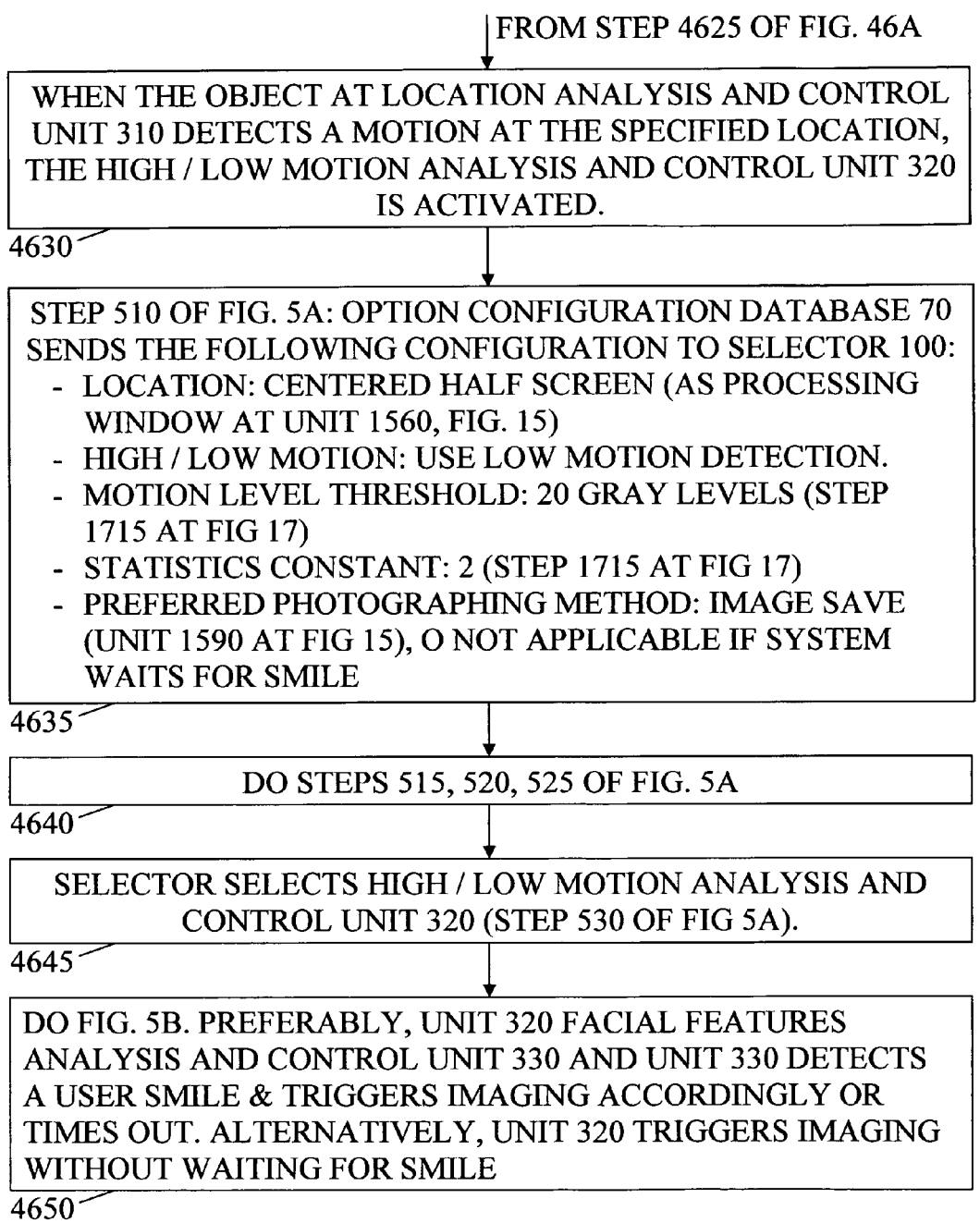

FIG. 46 is a simplified flowchart illustration of a preferred method of operation for the apparatus of FIG. 3 when photographing in "self-photo" mode.

It is appreciated that the present invention is not limited to the specifics of the methods particularly shown and described hereinabove e.g. in the flowchart illustrations. The present invention relates generally to providing at least one and preferably many functionalities for effecting a corresponding set of one or many selectable photography tasks. It is appreciated that each photography task may be implemented in many ways It is appreciated that the selectable photography applications provided by a preferred embodiment of the present invention may be either general or specific. An "object at location" application and a "high motion image at rest" application are both examples of relative general application. A "birthday cake" application, a "smile" application and a "self photo" application are examples of more specific applications. It is appreciated that the apparatus shown and described herein may be appropriately modified or expanded in order to obtain apparatus particularly suited to an essentially number and variety of other applications of any level of generality or specificity.

For example, it may be desired to provide a special mode for photographing handshakes, which is triggered upon detection of contact between two moving hands on which the camera is focused, wherein detection and tracking of the hands takes into account known characteristics of hands such as characteristic color or colors, shape, and direction and velocity of motion in the handshake situation. It may be desired to provide a special mode for photographing graduation ceremonies. It may be desired to customize a particular mode for each type of sport. So for example, in the tennis-customized mode, the digital camera system of the present invention might be operative to detect contact between a ball and a racket e.g. by detecting the known shape and size of a tennis ball and then detecting the deformation of the ball object characteristic of its moment of impact with the racket. Imaging would be triggered at that moment of contact. In a pool-jump application, the system of the present invention would preferably take into account the information known in this application, namely that a child of generally known dimensions, shape and color is about to jump, from a generally known direction, into a body of water of generally known location, shape and color.

Similarly, it may be desired to customize a mode operative to recognize a shower or confetti or a display of exploding fireworks or other effects, using known image processing based on known attributes of these effects, and trigger imaging of those effects at the moment of their occurrence. It is appreciated that a sophisticated digital camera system of the type shown and described herein may provide a user with many dozens of photography options, analogous to conventional electric organs and synthesizers which provide amateur and other musicians with a plethora of selectable musical options.

Similarly, it may be desired to customize various modes for recognizing various facial expressions and imaging these at the right time, e.g. as the target facial expression forms or after it has dissipated. U.S. Pat. No. 5,774,591 to Black et al discusses various publications which describe methods for recognizing facial expressions and applications therefor. Many other such methods are known in the field of image processing or can be developed as a direct application of known image processing techniques.

It is appreciated that the methods and apparatus shown and described herein are particularly suited to applications in which a generally stationary scene, other than one major instance of motion, is to be imaged. For example, the scene might be of a race scene including a group of generally stationary spectators and one major instance of motion namely the running motion of a plurality of athletes. It is appreciated that the apparatus shown and described herein may be modified to allow the processors to differentiate the major instance of motion from other artifactual instances of motion e.g. by known characteristics of the moving object of interest such as but not limited to color, shape, direction of motion, size and any combination thereof.

It is appreciated that various system-selected and system-computed parameters or settings described herein may be replaced by a user's selection of the same parameters or settings, typically within the framework of an "advanced user" GUI.

The specific methods and algorithms described herein to implement each of the analysis and control units of FIG. 3 are only examples of how the various selectable photography options shown herein, and other such options, may be implemented. For example, each photography option may be implemented separately rather than having grouped functionalities which pertain to a group of several photography options such as the "object at location", "high/low motion", "facial features", background building" and "noise reduction" functionalities. Alternatively, different functionalities may be identified. Generally, any system which uses image processing coupled with a knowledge base characterizing one or more selectable photography tasks or options, in order to trigger imaging at an appropriate time, as appropriate for the specific photography task and/or in order to perform photography task-specific image processing operations to enhance the final photographic product, falls within the scope of the present invention.

It is appreciated that the software components of the present invention may, if desired, be implemented in ROM (read-only memory) form. The software components may, generally, be implemented in hardware if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. A digital photography method comprising:
    receiving a definition of a moment at which an anticipated event is to be photographed, said moment comprising a moment at which a moving object arrives at a location;
    using a digital imaging device residing in a digital camera to generate a stream of digital images of a location at which said event is anticipated to occur; and
    inspecting said stream of digital images, to anticipate said moment in said stream by predicting the time at which an application-specific change will occur in the scene, and to generate a trigger timed and constructed to trigger generation of an additional image of said location at said moment,
    said generation of an additional image being effected by an imaging process;
    said inspecting comprising inspecting said stream of digital images, to anticipate said moment at which imaging should take place, long enough before said moment at which imaging should take place to enable activation of said imaging process, by estimating said moving object's time of arrival at the location using said moving object's current and previous locations and using standard deviation of a difference image histogram between a reference image in said stream and a current image.

2. A digital photography system operative in conjunction with a digital imaging device, the system comprising:
    a moment definition input device defining a moment at which an anticipated event is to be photographed, said moment comprising a moment at which a moving object arrives at a location;
    a stream of digital images, generated by the digital imaging device, of a location at which said event is anticipated to occur; and
    a moment anticipator operative to inspect said stream of digital images, to anticipate said moment in said stream by predicting the time at which an application-specific change will occur in the scene, and to trigger generation of an additional image of said location at said moment,
    said generation of an additional image being effected by an imaging process;
    said moment anticipator being operative to anticipate said moment at which imaging should take place, long enough before that moment to enable activation of said imaging process, by estimating said moving object's time of arrival at the location using said moving object's current and previous locations and using standard deviation of a difference image histogram between a reference image in said stream and a current image.

3. A digital photography method comprising:
    receiving a definition of a moment at which an anticipated event is to be photographed;
    using a digital imaging device residing in a digital camera to generate a stream of digital images of a location at which said event is anticipated to occur; and
    inspecting said stream of digital images, to anticipate said moment in said stream by predicting the time at which an application-specific change will occur in the scene, and to generate a trigger timed and constructed to trigger generation of an additional image of said location at said moment,
    said predicting the time comprising:
        defining a camera response time, said camera response time being a time interval between sending a trigger to the camera to capture an image and an actual image capture by the camera;
        calculating data relating to said stream of digital images; and
        estimating said time at which an application-specific change will occur in the scene based on said data relating to said stream of digital images; and
    said generating a trigger comprising generating a trigger preceding said time at which an application-specific change will occur in the scene by at least said camera response time.

4. A digital photography method according to claim 3 and also comprising defining a time interval between consecutive images in said stream of digital images and wherein said generating a trigger also comprises generating said trigger based on said time interval between consecutive images.

5. A digital photography method according to claim 4 and wherein said generating a trigger also comprises:
    receiving an image from said stream of images at an image receipt time;
    defining a time period, beginning at said camera response time after said image receipt time and continuing for said time interval between consecutive images;
    generating said trigger if said application-specific change occurs in said time period.

6. A digital photography method according to claim 5 and also comprising generating projected data relating to said time period by extrapolating said data relating to said stream of digital images into said time period.

7. A digital photography method according to claim 3 wherein:
    said definition of said moment comprises a definition of at least one target state of at least one corresponding target object; and
    said moment comprises a moment at which at least one target object is in said at least one target state.

8. A digital photography method according to claim 7 wherein:
    said target state comprises a target location; and
    said moment comprises a moment at which said target object has reached said target location.

9. A digital photography method according to claim 8 and also comprising:
    defining objects of non-interest; and
    filtering said objects of non-interest from said stream of digital images.

10. A digital photography method according to claim 8 wherein said target object comprises a target object reaching said target location after a predetermined number of other objects have reached said target location.

11. A digital photography method according to claim 7 and also comprising measuring a velocity of said target object and wherein said target state comprises a moment when said velocity of said target object is at a maximum value.

12. A digital photography method comprising:
    receiving a definition of a moment at which an anticipated event is to be photographed;

using a digital imaging device residing in a digital camera to generate a stream of digital images of a location at which said event is anticipated to occur; and inspecting said stream of digital images by an image processor residing in said digital camera, to detect, in said stream, a digital image which has captured said moment and selectively storing said digital image which has captured said moment, said selectively storing comprising:
  automatically storing a first image from said stream of digital images of said location at which said event is anticipated to occur; and
  for each subsequent image in said stream of images:
    comparing said subsequent image to at least one previously stored image; and
    automatically storing said subsequent image when said subsequent image is a better representation of said anticipated event than said at least one previously stored image and automatically discarding said at least one previously stored image.

13. A digital photography method according to claim 12 wherein said storing said subsequent image comprises overriding a previously stored image.

14. A digital photography method according to claim 12 wherein a user terminates said selectively storing.

15. A digital photography method according to claim 12 wherein:
  said moment comprises a moment at which a target object has reached said location;
  said comparing comprises comparing a time said target object will take to reach said location in said subsequent image with a time said target object will take to reach said location in said at least one previously stored image; and
  said storing said subsequent image comprises storing said subsequent image when said time said target object will take to reach said location in said subsequent image is less than said time said target object will take to reach said location in said at least one previously stored image.

16. A digital photography method according to claim 12 wherein:
  said moment comprises a moment at which a target object has reached said location;
  said comparing comprises comparing a the distance between said target object and said location in said subsequent image with a distance between said target object and said location in said at least one previously stored image; and
  said storing said subsequent image comprises storing said subsequent image when said distance between said target object and said location in said subsequent image is less than said distance between said target object and said location in said at least one previously stored image.

17. A digital photography system operative in conjunction with a digital imaging device, the system comprising:
  a moment definition input device defining a moment at which an anticipated event is to be photographed;
  a stream of digital images, generated by the digital imaging device, of a location at which said event is anticipated to occur; and
  a moment anticipator operative to inspect said stream of digital images, to anticipate said moment in said stream by predicting the time at which an application-specific change will occur in the scene, and to trigger generation of an additional image of said location at said moment,
  said predicting the time comprising:
    defining a camera response time, said camera response time being a time interval between sending a trigger to the camera to capture an image and an actual image capture by the camera;
    calculating data relating to said stream of digital images; and
    estimating said time at which an application-specific change will occur in the scene based on said data relating to said stream of digital images; and
  said trigger generation preceding said time at which an application-specific change will occur in the scene by at least said camera response time.

18. A digital photography system operative in conjunction with a digital imaging device, the system comprising:
  a moment definition input device defining a moment at which an anticipated event is to be photographed;
  a stream of digital images, generated by the digital imaging device, of a location at which said event is anticipated to occur; and
  an image selector operative to:
    automatically store a first image in said stream of digital images of said location at which said event is anticipated to occur; and
    for each subsequent image in said stream of images:
      compare said subsequent image to at least one previously stored image; and
      automatically store said subsequent image when said subsequent image is a better representation of said anticipated event than said at least one previously stored image,
  and automatically discard said at least one previously stored image.

* * * * *